United States Patent
Meichle

(10) Patent No.: US 10,063,110 B2
(45) Date of Patent: Aug. 28, 2018

(54) FOREIGN OBJECT DETECTION IN WIRELESS ENERGY TRANSFER SYSTEMS

(71) Applicant: WiTricity Corporation, Watertown, MA (US)

(72) Inventor: David Paul Meichle, Somerville, MA (US)

(73) Assignee: WiTricity Corporation, Watertown, MA (US)

( * ) Notice: Subject to any disclaimer, the term of this patent is extended or adjusted under 35 U.S.C. 154(b) by 143 days.

(21) Appl. No.: 15/297,783

(22) Filed: Oct. 19, 2016

(65) Prior Publication Data

US 2017/0141622 A1    May 18, 2017

Related U.S. Application Data

(60) Provisional application No. 62/376,497, filed on Aug. 18, 2016, provisional application No. 62/309,840, (Continued)

(51) Int. Cl.
*H02J 50/60* (2016.01)
*H01F 38/14* (2006.01)
(Continued)

(52) U.S. Cl.
CPC .......... *H02J 50/60* (2016.02); *B60L 11/1829* (2013.01); *H01F 38/14* (2013.01); *H02J 50/90* (2016.02)

(58) Field of Classification Search
CPC ...................................................... H02J 50/60
(Continued)

(56) References Cited

U.S. PATENT DOCUMENTS 645,576 A    3/1900 Tesla
649,621 A    5/1900 Tesla
(Continued)

FOREIGN PATENT DOCUMENTS

CA    142352      8/1912
CN    102239633   11/2011
(Continued)

OTHER PUBLICATIONS

International Search Report and Written Opinion of the International Search Authority for International Application No. PCT/US2016/057736 dated Feb. 3, 2017.
(Continued)

*Primary Examiner* — Joseph Chang
(74) *Attorney, Agent, or Firm* — Fish & Richardson P.C.

(57) ABSTRACT

The disclosure features wireless energy transfer systems that include a plurality of sensors coupled to a controller, wherein the controller is configured to: obtain a system calibration state including a set of basis vectors derived from a first set of electrical signals generated by the plurality of sensors with no foreign object debris in proximity to the system; measure a second set of electrical signals from the sensors; calculate a projection of the second set of electrical signals onto the set of basis vectors; calculate a detection signal based on the projection; determine whether foreign object debris is present in proximity to the system by comparing the calculated detection signal to a detection threshold value; and adjust the system calibration state based on the presence or absence of foreign object debris in proximity to the system to generate an updated system calibration state.

20 Claims, 40 Drawing Sheets

Related U.S. Application Data filed on Mar. 17, 2016, provisional application No. 62/267,009, filed on Dec. 14, 2015, provisional application No. 62/261,077, filed on Nov. 30, 2015, provisional application No. 62/243,469, filed on Oct. 19, 2015.

(51) Int. Cl.
*H02J 50/90* (2016.01)
*B60L 11/18* (2006.01)

(58) Field of Classification Search
USPC .......................................................... 307/104
See application file for complete search history.

(56) References Cited

U.S. PATENT DOCUMENTS

| | | |
|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hiering et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |

(56) References Cited

U.S. PATENT DOCUMENTS

| | | |
|---|---|---|
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |

(56) References Cited

U.S. PATENT DOCUMENTS

| | | |
|---|---|---|
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |

(56) References Cited

U.S. PATENT DOCUMENTS

| | | |
|---|---|---|
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |

(56) References Cited

U.S. PATENT DOCUMENTS

| | | |
|---|---|---|
| 2012/0068549 A1 | 3/2012 | Karalis et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070764 A1 | 3/2014 | Keeling |
| 2014/0111019 A1 | 4/2014 | Roy et al. |
| 2014/0167704 A1 | 6/2014 | Lafontaine et al. |
| 2015/0109000 A1 | 4/2015 | Sieber et al. |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |

(56) References Cited

FOREIGN PATENT DOCUMENTS

| | | |
|---|---|---|
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

"Intel CTO Says Gap between Humans, Machines Will Close by 2050", *Intel News Release*, (See intel.com/ .../20080821comp.htm?iid=S . . . ) (Printed Nov. 6, 2009).
"Physics Update, Unwired Energy", *Physics Today*, pp. 26, (Jan. 2007) (See http://arxiv.org/abs/physics/0611063.).
"In pictures: A year in technology", *BBC News*, (Dec. 28, 2007).
"Next Little Thing 2010 Electricity without wires", CNN Money (See money.cnn.com/galleries/2009/smallbusiness/0911/gallery.next_little_thing_2010.smb/) (dated Nov. 30, 2009).
Abe et al. "A Noncontact Charger Using a Resonant Converter with Parallel Capacitor of the Secondary Coil". IEEE, 36(2):444-451, Mar./Apr. 2000.
Ahmadian, M. et al., "Miniature Transmitter for Implantable Micro Systems", *Proceedings of the 25th Annual International Conference of the IEEE EMBS* Cancun, Mexico, pp. 3028-3031 (Sep. 17-21, 2003).
Aoki, T. et al., "Observation of strong coupling between one atom and a monolithic microresonator", Nature, vol. 443:671-674 (2006).
Apneseth et al. "Introducing wireless proximity switches" ABB Review Apr. 2002.
Aristeidis Karalis et al., "Efficient Wireless non-radiative mid-range energy transfer", *Annals of Physics*, vol. 323, pp. 34-48 (2008).

Baker et al., "Feedback Analysis and Design of RF Power Links for Low-Power Bionic Systems," *IEEE Transactions on Biomedical Circuits and Systems*, vol. 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).
Berardelli, P., "Outlets Are Out", ScienceNOW Daily News, Science Now, http://sciencenow.sciencemag.org/ cgi/content/full/2006/1114/2, (Nov. 14, 2006) 2 pages.
Biever, C., "Evanescent coupling' could power gadgets wirelessly", NewScientistsTech.com, http://www. newscientisttech.com/article.ns?id=dnl 0575&print=true, (Nov. 15, 2006) 2 pages.
Borenstein, S., "Man tries wirelessly boosting batteries", (The Associated Press), USA Today, (Nov. 16, 2006) 1 page.
Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).
Boyle, A., "Electro-nirvana? Not so fast", MSNBC, http://lcosmiclog.msnbc.msn.com/_news/2007/06/08/4350760-electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", *IEEE Transactions on Industrial Electronics*, vol. 60:318-328 (Jan. 2013).
Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.
Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, A., "Recharging the Wireless Way—Even physicists forget to recharge their cell phones sometimes.", PC Magazine, ABS News Internet Ventures, (Dec. 12, 2006) 1 page.
Chinaview, ,"Scientists light bulb with 'wireless electricity' ",www.Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.
Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", *IEEE*, pp. 1965-1970 (2003).
Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).

(56) References Cited

OTHER PUBLICATIONS

Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line* No. 9, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires- MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs",(Science Editor), Telegraph.co.uk, http://www.telegraph.co.uk/news/main.jhtml?xml=/news/2007/06/07/nwirelessl 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jacob, M. V. et al., "Lithium Tantalate—A High Permittivity Dielectric Material for Microwave Communication Systems", Proceedings of *IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).

Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires! —Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages. (2003).
Lee, "RFID Coil Design," Microchip Technology Inc., AN678, 21 pages (1998).
Liang et al., "Silicon waveguide two-photon absorption detector at 1.5 µm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Median, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, "The world's first sheet-type wireless power transmission system: Will a socket be replaced by e-wall?",Public Relations Office, School of Engineering, University of Tokyo, Japan,Dec. 12, 2006,4 pages.
PressTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discoverry_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).

(56) References Cited

OTHER PUBLICATIONS

Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).
International Preliminary Report on Patentability and Written Opinion of the International Searching Authority for International Application No. PCT/US2016/057736 dated May 3, 2018 (8 pages).

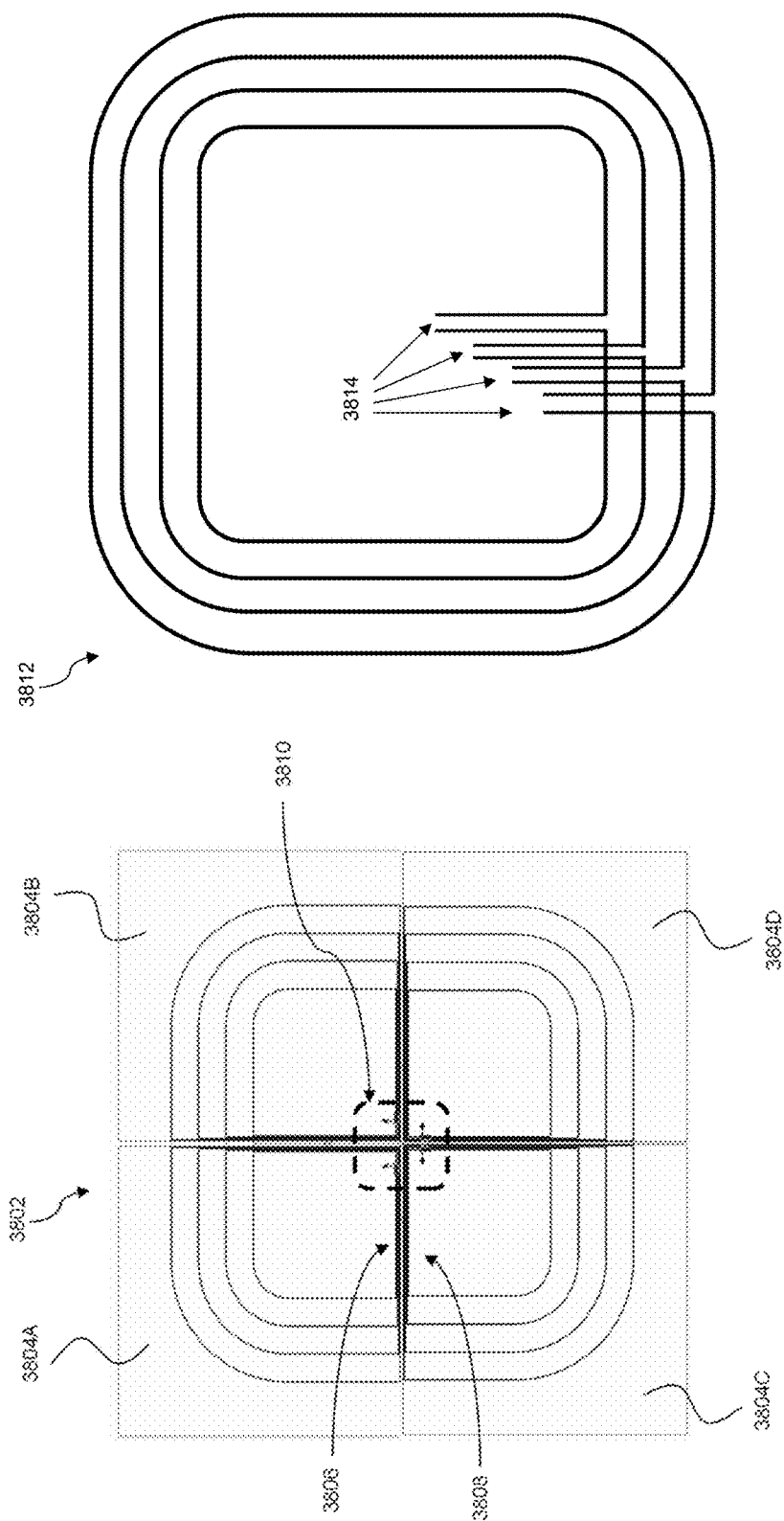

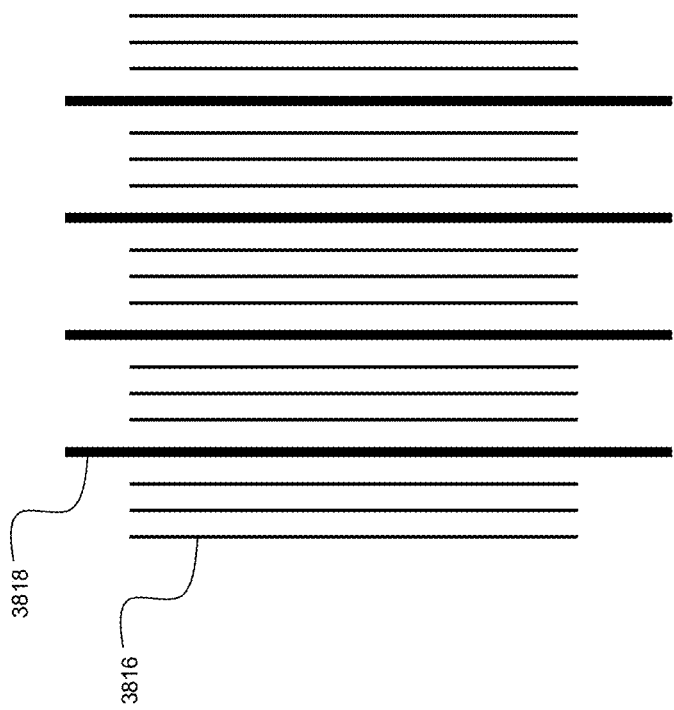

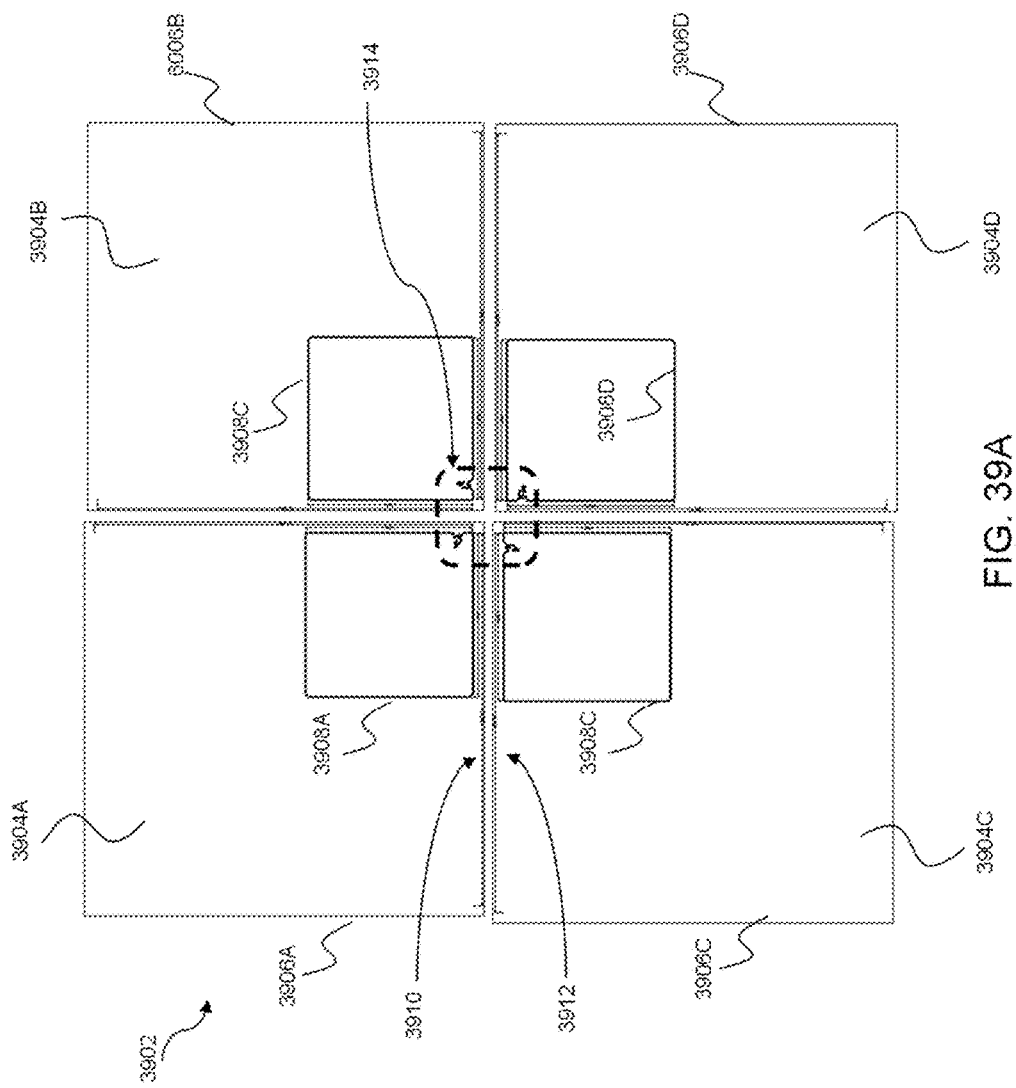

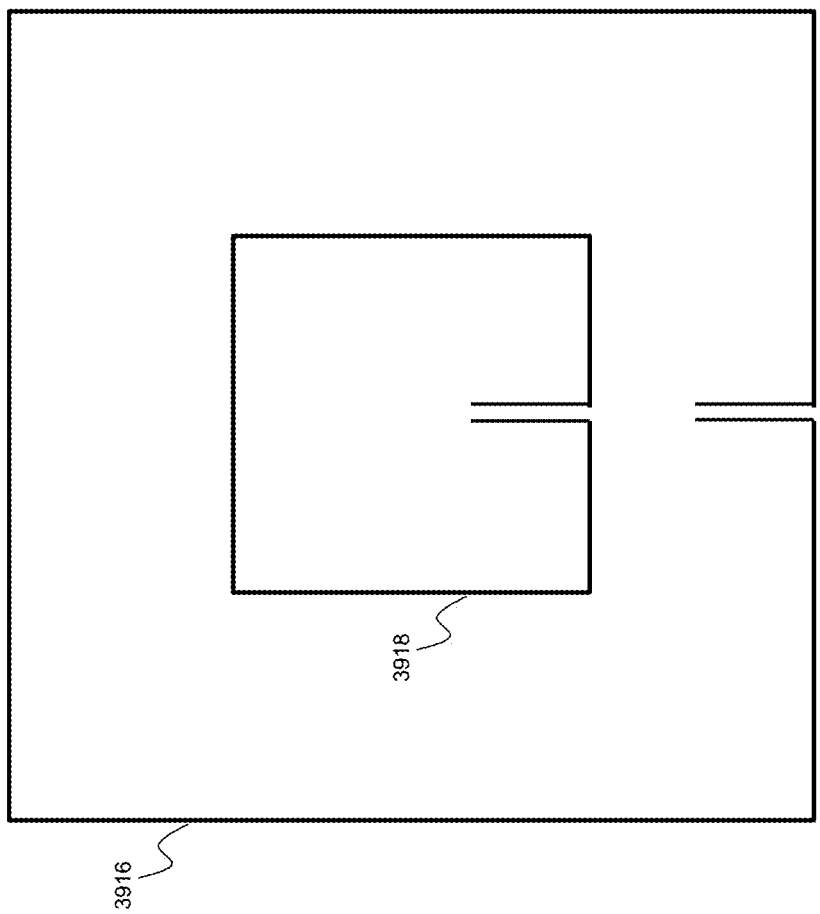

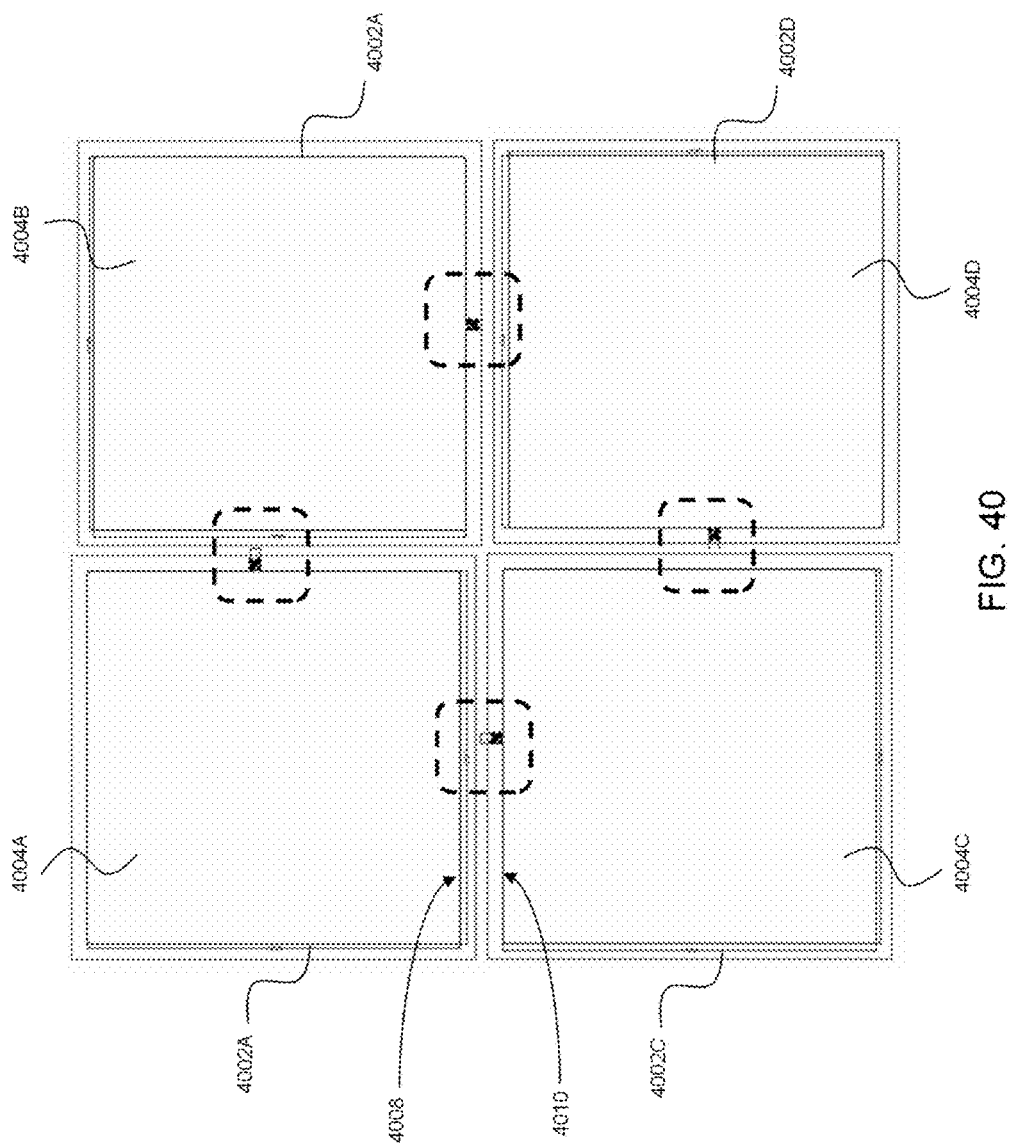

FOREIGN OBJECT DETECTION IN WIRELESS ENERGY TRANSFER SYSTEMS

CROSS-REFERENCE TO RELATED APPLICATIONS

This application claims priority to the following U.S. Provisional patent applications, the entire contents of each of which are incorporated herein by reference: 62/243,469, filed on Oct. 19, 2015; 62/267,009, filed on Dec. 14, 2015; 62/309,840, filed on Mar. 17, 2016; 62/261,077, filed on Nov. 30, 2015; and 62/376,497, filed on Aug. 18, 2016.

TECHNICAL FIELD

This disclosure relates wireless energy transfer systems and detection of foreign object debris (FOD) in the vicinity of such systems.

BACKGROUND

Energy or power may be transferred wirelessly using a variety of known radiative, or far-field, and non-radiative, or near-field, techniques as detailed, for example, in commonly owned U.S. Patent Application Publication Nos. 2010/01099445, 2010/0308939, 2012/0062345, and 2012/0248981, the entire contents of each of which are incorporated herein by reference.

SUMMARY

This disclosure features methods and systems for detecting FOD in proximity to wireless energy transfer systems. In particular, the methods and systems can be used with wireless energy transfer systems that use magnetic resonators to transfer power via oscillating magnetic fields. Such systems can transfer large quantities of power, and the presence of FOD can represent a particular hazard during operation. The methods and systems disclosed herein can also be used with other types of wireless energy transfer systems as well, including resonant and non-resonant systems, and systems that transfer power via electromagnetic fields.

The systems and methods disclosed herein use a principal components-based analysis to identify FOD and to update calibration settings to correct for drift due to a variety of sources. Measurements from one or more FOD sensors are transformed into a principal components basis derived from an inverse covariance matrix describing a system calibration state, in such a way that the first principal component represents a multi-dimensional direction corresponding to the largest variance, with succeeding principal components representing directions of successively smaller variance. The principal components therefore represent the data in an uncorrelated, orthogonal basis vector set. When a foreign object is present in proximity to the system, the basis-projected sensor measurements are scattered most strongly in the direction of the first principal component. This has the advantage of increasing the sensitivity of the system to small FOD, and FOD located at relatively large vertical distances from the wireless energy source.

Principal components (PC) analysis of the FOD sensor measurements can provide a number of additional advantages. For example, fast calibration routines can be used to generate an initial system calibration and ongoing updates to the calibration, so that the system is ready for use shortly after initialization. FOD detection signals can be calculated rapidly, allowing for fast signaling by the system when potential FOD is identified. Projection of sensor measurements into the PC basis also allows the measured signals to be used for alignment of the source and receiver in a wireless energy transfer system. For example, for vehicle-based charging, the sensor measurements can be used during vehicle parking to ensure alignment of a vehicle mounted receiver and a ground-based source so that vehicle charging occurs efficiently after parking is complete.

In a first aspect, the disclosure features wireless energy transfer systems that include: a source resonator configured to generate an oscillating magnetic field to transfer energy to a receiver resonator, a plurality of sensors, where each of the sensors is configured to generate an electrical signal in response to a magnetic field, and a controller coupled to each of the sensors, where during operation of the system, the controller is configured to: obtain a system calibration state comprising a set of basis vectors derived from a first set of electrical signals generated by the plurality of sensors with no foreign object debris in proximity to the system; measure a second set of electrical signals generated by the plurality of sensors; calculate a projection of the second set of electrical signals onto the set of basis vectors; calculate a detection signal based on the projection of the second set of electrical signals; determine whether foreign object debris is present in proximity to the system by comparing the calculated detection signal to a detection threshold value; and adjust the system calibration state based on the presence or absence of foreign object debris in proximity to the system to generate an updated system calibration state.

Embodiments of the systems can include any one or more of the following features.

The controller can be configured to obtain the system calibration state by: determining an inverse covariance matrix for the first set of electrical signals; and determining the set of basis vectors by determining a set of eigenvectors of the inverse covariance matrix. The controller can be configured to determine the inverse covariance matrix based on mean-subtracted values derived from the first set of electrical signals. The values can include at least one of amplitudes of the first set of electrical signals and phases of the first set of electrical signals.

The plurality of sensors can include n sensors, and each of the basis vectors can include n elements. For each basis vector, each of the n elements can correspond to a contribution from a different one of the n sensors. The projection can include a vector of length $p<n$, and each element of the projection can correspond to a contribution of a different one of the basis vectors to a representation of the second set of electrical signals. The controller can be configured to calculate the detection signal as a norm of the projection, e.g., as a scaled norm of the projection in which each element of the projection is scaled according an eigenvalue associated with a corresponding one of the basis vectors.

The controller can be configured to adjust the system calibration state when foreign object debris is not in proximity to the system, e.g., by generating an updated inverse covariance matrix based on the second set of electrical signals. The controller can be configured to generate the updated inverse covariance matrix using an infinite impulse response filter.

Prior to obtaining the system calibration state, the controller can be configured to determine whether foreign object debris is present in proximity to the system. The controller can be configured to determine whether foreign object debris is present in proximity to the system prior to obtaining the system calibration state by: measuring a plurality of sets of electrical signals generated by the plurality of sensors, where each set of electrical signals corresponds to a different relative position of the source and receiver resonators; generating a position covariance matrix based on the plurality of sets of electrical signals; determining a set of position basis vectors corresponding to eigenvectors of an inverse of the position covariance matrix; measuring a third set of electrical signals generated by the plurality of sensors; calculating a projection of the third set of electrical signals onto the set of position basis vectors; and determining whether foreign object debris is present in proximity to the system based on a magnitude of the projection of the third set of electrical signals. The set of position basis vectors can correspond to a set of m eigenvectors of the inverse of the position covariance matrix that correspond to m largest eigenvalues of the inverse of the position covariance matrix.

Each of the plurality of sensors can include one or more loops of conducting material. At least some of the sensors can include a first loop of conducting material coupled to a second loop of conducting material. The first and second loops may not overlap. The first and second loops can be configured so that when a magnetic field flux density through the first and second loops is the same, the first and second loops generate electrical signals of approximately equal magnitude.

At least one of the sensors can include a first loop of conducting material featuring two terminals and a second loop of conducting material featuring two terminals, where a second terminal of the first loop is directly connected to a first terminal of the second loop, and a second terminal of the second loop is not connected to either terminal of the first loop. When magnetic field flux extends through the first and second loops, the controller can be configured to measure a reference electrical signal by measuring an electrical signal between the terminals of the first loop, and the controller can be configured to measure an electrical signal featuring contributions from both the first and second loops by measuring an electrical signal between a first terminal of the first loop and the second terminal of the second loop.

The plurality of sensors can be positioned so that when the source resonator generates the oscillating magnetic field, the sensors generate the electrical signals based on a portion of the oscillating magnetic field that extends through the sensors.

The systems can include an auxiliary coil connected to the controller and configured to generate a measurement magnetic field in a spatial region in proximity to at least one of the source and receiver resonators. The plurality of sensors can be positioned so that when the auxiliary coil generates the measurement magnetic field, the sensors generate the electrical signals based on a portion of the measurement magnetic field that extends through the sensors.

The plurality of sensors comprises an array of loops of conductive material in which each loop of the array is coupled to another loop of the array.

The first and second loops can be coupled through a direct electrical connection between the loops. The first and second loops can be coupled through a hardware or software processor, and the processor can be configured to invert an electrical signal generated by one of the first and second loops.

Obtaining the system calibration state can include retrieving the system calibration state from an electronic storage medium. Obtaining the system calibration state can include: determining an inverse covariance matrix for the first set of electrical signals; determining a set of eigenvectors of the inverse covariance matrix; and determining the set of basis vectors from the eigenvectors of the inverse covariance matrix.

Embodiments of the systems can also include any of the other features disclosed herein, including features disclosed in connection with different embodiments, in any combination as appropriate.

In another aspect, the disclosure features methods that include: determining a system calibration state featuring an inverse covariance matrix for a first set of electrical signals generated by a plurality of sensors in proximity to a wireless energy transfer system when no foreign object debris is in proximity to the wireless energy transfer system; determining a set of basis vectors from eigenvectors of the inverse covariance matrix; measuring a second set of electrical signals generated by the plurality of sensors; calculating a detection signal based on a projection of the second set of electrical signals onto the set of basis vectors; determining whether foreign object debris is present in proximity to the wireless energy transfer system by comparing the calculated detection signal to a detection threshold value; and adjusting the system calibration state based on the presence or absence of foreign object debris in proximity to the system to generate an updated system calibration state.

Embodiments of the methods can include any one or more of the following features.

The methods can include determining the inverse covariance matrix based on values derived from the first set of electrical signals, where the values include at least one of amplitudes of the first set of electrical signals and phases of the first set of electrical signals. The plurality of sensors can include n sensors, and each of the basis vectors can include n elements each corresponding to a contribution from a different one of the n sensors.

The projection can include a vector of length p<n, and each element of the projection can correspond to a contribution of a different one of the basis vectors to a representation of the second set of electrical signals. Calculating the detection signal can include determining a norm of the projection.

The methods can include adjusting the system calibration state when foreign object debris is not in proximity to the system. The methods can include adjusting the system calibration state by generating an updated inverse covariance matrix based on the second set of electrical signals. The methods can include generating the updated inverse covariance matrix using an infinite impulse response filter. The methods can include, prior to determining the system calibration state, determining whether foreign object debris is present in proximity to the wireless energy transfer system.

Embodiments of the methods can also include any of the other features disclosed herein, including features disclosed in connection with different embodiments, in any combination as appropriate.

As used herein, "foreign object debris" (FOD) refers to objects formed of materials that, when exposed to a field used for wireless energy transfer, undergo significant heating and/or interaction with the field. For example, for resonant wireless energy transfer systems that use oscillating magnetic fields to transfer energy, FOD formed of materials such as metals can interact strongly with the energy transfer fields. In particular, the magnetic fields can induce eddy currents in metallic objects; if the fields are sufficiently large, the amount of heat generated in the metallic objects due to the induced currents can cause the objects to ignite. As such, for high energy wireless transfer systems in particular, the presence of nearby FOD can represent a significant operating hazard. In addition, coupling between the energy transfer field and the FOD reduces the amount of energy that is transferred to the system's receiver. Thus, in addition to posing a potential safety hazard, FOD also reduces the energy transfer efficiency of the system.

As used herein, "wireless energy transfer" from one resonator to another refers to transferring energy to do useful work (e.g., mechanical work) such as powering electronic devices, vehicles, lighting a light bulb or charging batteries. Similarly, "wireless power transmission" from one resonator to another refers to transmitting power to do useful work (e.g., mechanical work) such as powering electronic devices, vehicles, lighting a light bulb or charging batteries. Both wireless energy transfer and wireless power transmission refer to the transfer of energy (or the transmission of power) to provide operating power that would otherwise be provided through a connection to a power source, such as a connection to a mains voltage source. Accordingly, with the above understanding, the expressions "wireless energy transfer" and "wireless power transmission" are used interchangeably in this disclosure. It should also be understood that "wireless power transmission" and "wireless energy transfer" can be accompanied by the transfer of information; that is, information can be transferred via an electromagnetic signal along with the energy or power to do useful work.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

FIG. 38A is a schematic diagram of an example of an auxiliary coil for FOD detection.

FIG. 38B is a schematic diagram showing an effective representation of the auxiliary coil of FIG. 38A.

FIG. 38C is a schematic diagram showing a portion of an auxiliary coil and a portion of a source resonator coil.

FIG. 39A is a schematic diagram showing an example of an auxiliary coil for FOD detection.

FIG. 39B is a schematic diagram showing an effective representation of the auxiliary coil of FIG. 39A.

FIG. 40 is a schematic diagram showing an example of a set of auxiliary coils for FOD detection.

Like reference symbols in the various drawings indicate like elements.

DETAILED DESCRIPTION

Introduction

Wireless energy transfer systems that generate an oscillating magnetic field to transfer energy between two coupled resonators (i.e., a source resonator and a receiver resonator) can be efficient, non-radiative, and safe. Certain non-magnetic and/or non-metallic objects that are inserted between the resonators may not substantially interact with the magnetic field used for wireless energy transfer. However, certain objects—such as some metallic objects, for example—inserted between the resonators may interact with the magnetic field of the wireless power transfer system in a way that causes the objects to perturb the wireless energy transfer and/or to heat up substantially. Detection of the presence of such objects in proximity to wireless energy transfer systems is therefore desirable, as detection can be followed by actions such as reducing the amount of energy that is transferred (or even discontinuing energy transfer entirely), and alerting a user of the system that such objects are present.

Objects that perturb the wireless energy transfer are referred to herein as foreign object debris (FOD). As noted above, some FOD may interact with the energy transfer magnetic field in a way that may perturb the characteristics of the resonators used for energy transfer, may block or reduce the magnetic fields used for energy transfer, or may create a fire and/or burning hazard. In some applications, special precautions may be necessary to avoid combustible metallic objects becoming hot enough to ignite during high power energy transfer. Some metallic objects can heat up and have enough heat capacity to burn or cause discomfort to a person who might pick them up while they are still hot. Examples include tools, coils, metal pieces, soda cans, steel wool, food packaging, and tobacco packaging.

Figure 1:
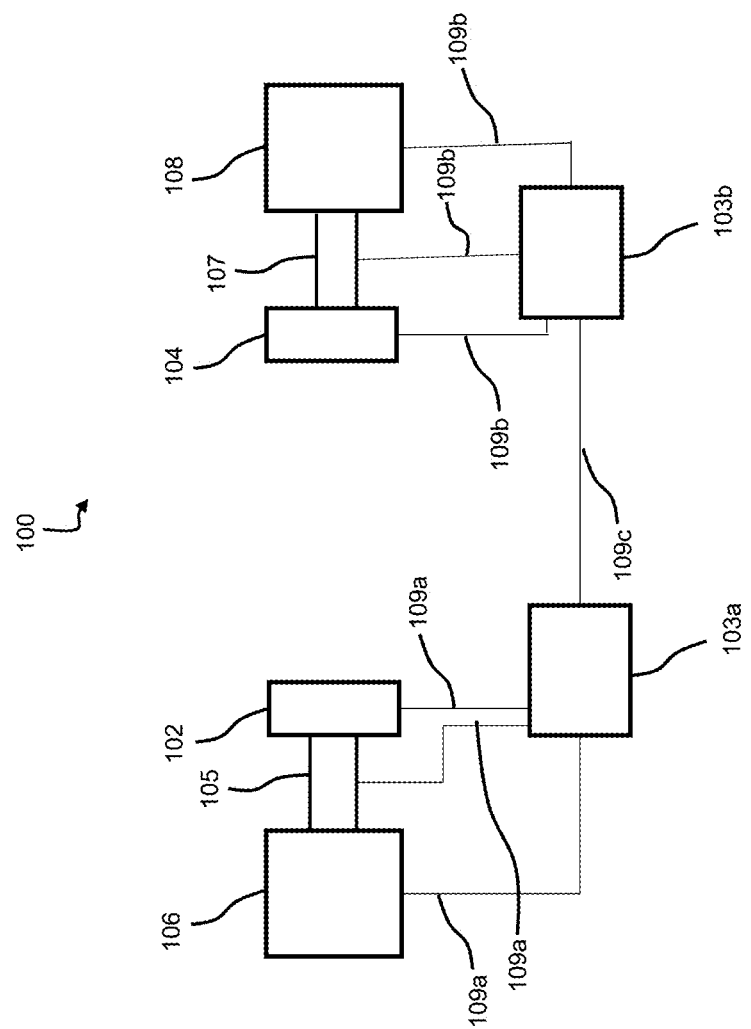
FIG. 1 is a schematic diagram of a wireless energy transfer system.

FIG. 1 is a schematic diagram of a wireless power transfer system 100. System 100 includes a source resonator 102 and a receiver resonator 104. Source resonator 102 is coupled to power supply 106 through a coupling 105. In some embodiments, coupling 105 is a direct electrical connection. In certain embodiments, coupling 105 is a non-contact inductive coupling. In some embodiments, coupling 105 can include an impedance matching network (not shown in FIG. 1). Impedance matching networks and methods for impedance matching are disclosed, for example, in commonly owned U.S. Patent Application Publication No. 2012/0242225, the entire contents of which are incorporated herein by reference.

In similar fashion, receiver resonator 104 is coupled to a load 108 through a coupling 107. Coupling 107 can be a direct electrical connection or a non-contact inductive coupling. In some embodiments, coupling 107 can include an impedance matching network, as described above.

In general, load 108 receives power from receiver resonator 104. Device 108 then uses the power to do useful work. In some embodiments, for example, load 108 is a battery charger or manager that charges one or more batteries of a vehicle (e.g., car, truck, etc.) In some embodiments, load 108 can be a battery of the vehicle.

During operation, source resonator 102 is configured to wirelessly transmit power to receiver resonator 104. In some embodiments, source resonator 102 can generate oscillating fields (e.g., electric, magnetic fields) when supplied with electrical power from power supply 106. The oscillating fields couple to receiver resonator 104 and provide power to the receiver resonator 104 through the coupling. More specifically, the oscillating fields generated by source resonator 102 can induce oscillating currents within receiver resonator 104. In some embodiments, either or both of the source and receiver coils can be configured to be resonant. In certain embodiments, either or both of the source and receiver coils can be non-resonant so that the power transfer is achieved through non-resonant coupling.

In certain embodiments, the system 100 can include a power repeating apparatus (not shown in FIG. 1). The power repeating apparatus can be configured to wirelessly receive power from the source resonator 102 and wirelessly transmit the power to the receiver resonator 104. The power repeating apparatus can include similar elements described in relation to the source and receiver resonators above.

System 100 includes electronic controllers 103a and 103b (which together form a control system) configured to control power transfer in system 100, for example, by directing power supply 106 to drive source resonator 102 with an oscillating electrical current. In general, electronic controller 103a (the source-side controller) is connected to source resonator 102 and power supply 106 via connections 109a. Where coupling 105 includes components such as an impedance matching network, electronic controller 103a can also be connected to coupling 105 via a connection 109a.

Electronic controller 103b is connected to receiver resonator 104 and load 108 via connections 109b. Where coupling 107 includes components such as an impedance matching network, electronic controller 103b can also be connected to coupling 107 via a connection 109b. Electronic controller 103a can also be connected to electronic controller 103b via a wired or wireless connection 109c.

In some embodiments, some or all of connections 109a-b are wired connections. In certain embodiments, some or all of connections 109a-b are wireless connections (e.g., radiofrequency, Bluetooth communication). The nature of connections 109a-b can depend on the various components of system 100. For example, electronic controller 103a can be connected to power supply 106 and/or coupling 105 and/or source resonator 102 via wired connections 109a, and connected to electronic controller 103b via a wireless connection 109c. Similar considerations apply to electronic controller 103b.

Electronic controller 103a can configure power supply 106 to provide power to source resonator 102, and to regulate the output of supply 106 to adjust the magnitude of the energy transfer field generated by source resonator 102. The driving current from supply 106 can be at an oscillation frequency that corresponds to a frequency of the energy transfer field generated by source resonator 102.

In some embodiments, electronic controllers 103a and 103b can tune the resonant frequencies of the source resonator 102 and/or the receiver resonator 104 (e.g., by tuning reactive components of impedance matching networks) to regulate energy transfer efficiency, the amount of energy transferred, to mitigate positional offsets between the resonators, and/or for other reasons as well. Adjustments can be based on measurement of a frequency of the energy transfer field generated by source resonator 102, and/or based on measurements of current and/or voltage (and magnitudes and/or phases thereof) in either resonator, for example, by one or more sensors connected to electronic controllers 103a and/or 103b. In certain embodiments, electronic controllers 103a and 103b can tune the resonant frequencies of one or both of source resonator 102 and receiver resonator 104 to be substantially the same (e.g., within 0.5%, within 1%, within 2%).

In certain embodiments, electronic controllers 103a and 103b can adjust impedance matching conditions in system 100 by adjusting one or more resistive, capacitive, and/or inductive elements in an impedance matching network that is part of coupling 105, and/or in an impedance matching network that is part of coupling 107. Adjusting the impedance matching conditions controls the efficiency of energy transfer between resonators 102 and 104, and can be performed iteratively by electronic controller 103 based on measurements of voltage, current, and other performance-related parameters by one or more sensors connected to controllers 103a and/or 103b.

In addition to source resonator 102 and receiver resonator 104, in some embodiments, system 100 can include one or more repeater resonators that function as active or passive relays, receiving power from one resonator and transferring power to another resonator. In resonant energy transfer systems that use oscillating magnetic fields to transfer power, each of the resonators (e.g., source resonator 102, receiver resonator 104, and any repeater resonators) can have a resonant frequency $f=\omega/2\pi$, an intrinsic loss rate $\Gamma$, and a Q-factor $Q=\omega/(2\Lambda)$ (also referred as "intrinsic" Q-factor in this disclosure), where $\omega$ is the angular resonant frequency. A resonant frequency f of a resonator, for example, in a power source or power receiver of the system, can have a capacitance and inductance that defines its resonant frequency f.

To achieve high efficiency wireless energy transfer, which is particularly important for applications such as vehicle charging where large amounts of energy are transferred to charge a vehicle's onboard battery system, some or all of the resonators in system 100 have a relatively high Q-factor. For example, the Q-factor of some or all of the resonators can be greater than 100 (e.g., Q>200, Q>300, Q>500, Q>1000).

Utilizing high Q-factor resonators can lead to large energy coupling between some or all of the resonators in a wireless power transfer system. The high Q factors can lead to strong coupling between resonators such that the "coupling time" between the resonators is shorter than the "loss time" of the resonators. In this approach, energy can be transferred efficiently between resonators at a faster rate than the energy loss rate due to losses (e.g., heating loss, radiative loss) of the resonators. In certain embodiments, a geometric mean $\sqrt{Q_iQ_j}$ can be larger than 100 (e.g., $\sqrt{Q_iQ_j}>200$, $\sqrt{Q_iQ_j}>300$, $\sqrt{Q_iQ_j}>500$, $\sqrt{Q_iQ_j}>1000$) where i and j refer to a source-receiver resonator pair, a source-repeater resonator pair, or a repeater-receiver resonator pair. Additional aspects of high-Q resonators are disclosed, for example, in U.S. Pat. No. 8,461,719, the entire contents of which are incorporated herein by reference.

Figure 2:
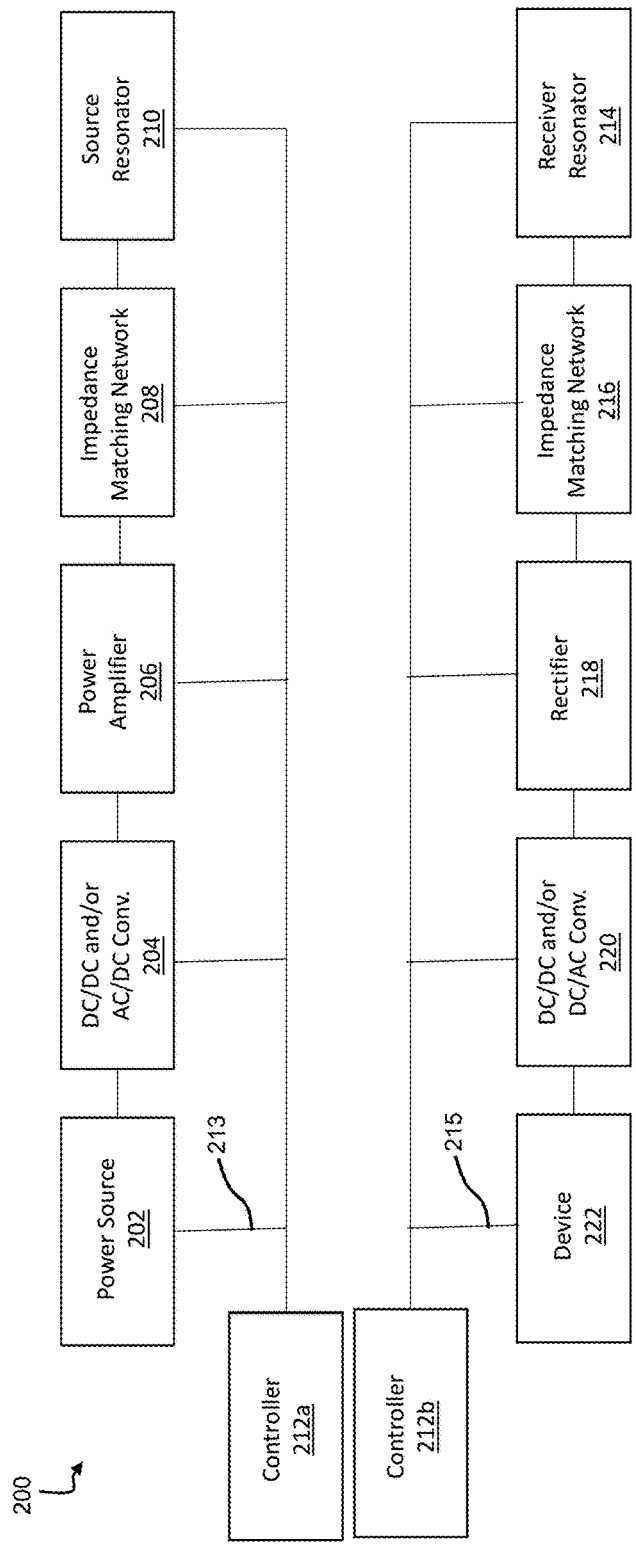
FIG. 2 is a schematic diagram of another wireless energy transfer system.

FIG. 2 shows a schematic diagram of a wireless energy transfer system 200 that uses magnetic resonators to transfer energy. System 200 is an example of the general system 100 shown in FIG. 1. System 200 includes a power supply 202, a DC/DC and/or AD/DC converter 204, a power amplifier 206, an impedance matching network 208, and a source resonator 210. These components are connected to one another via direct wired connections, and are also connected to controller 212a via connections 213.

System 200 also includes a receiver resonator 214, an impedance matching network 216, a rectifier 218, a DC/DC and/or DC/AC converter 220, and a device 222. These components are connected to one another via direct wired connections, and are also connected to controller 212b via connections 215.

Power supply 202 can be an AC voltage source such as a home electrical outlet or a DC voltage source such as a battery. The power supply 202 delivers a current to converter 204, which converts the current to a direct current (i.e., a DC current). The direct current is amplified by power inverter or amplifier 206 to generate a driving current that drives source resonator 210. The oscillation frequency and amplitude of the driving current can be adjusted by power amplifier 206 (under the control of controller 212) to control the magnetic field generated by source resonator 210.

Impedance matching network (IMN) 208 adjusts the impedance of source resonator 210. For example, IMN 208 can be tuned (e.g., by controller 212) to adjust for the perturbation of the quality factor Q of the source resonator 210 due to the presence of FOD in proximity to the resonator. IMN 208 can also be tuned to regulate energy transfer between source and receiver resonators 210 and 214, e.g., based on feedback signals measured by one or more sensors (not shown in FIG. 2) and communicated to controller 212.

IMN 208 can include a capacitor or networks of capacitors, an inductor or networks of inductors, or any combination of capacitors, inductors, diodes, switches, resistors, and similar elements. The components of the impedance matching network may be adjustable and variable and may be controlled to affect the efficiency and operating point of the system. Impedance matching may be performed by controlling the connection point of the resonator, adjusting the permeability of a magnetic material, controlling a bias field, adjusting a frequency of excitation, and similar operations, all of which are carried out by controller 212. Elements of IMN 208 that can be tuned and controlled by controller 212 include any number or combination of varactors, varactor arrays, switched elements, capacitor banks, switched and tunable elements, reverse bias diodes, air gap capacitors, compression capacitors, BZT electrically tuned capacitors, MEMS-tunable capacitors, voltage variable dielectrics, pulse-width modulation (PWM) controlled capacitors, barium strontium titanate (BST) capacitors, and transformer coupled tuning circuits. Variable components can be mechanically tuned, thermally tuned, electrically tuned, and piezo-electrically tuned.

The driving current supplied by power amplifier 206 causes source resonator 210 to generate an oscillating magnetic field at a frequency that matches or nearly matches a resonance frequency of receiver resonator 214. Receiver resonator 214 captures a portion of the field, which induces an oscillating current (i.e., an AC current) in the receiver resonator.

IMN 216 on the receiver side of system 200 functions in a manner similar to IMN 208. The AC current in receiver resonator 214 is rectified by rectifier 218, and then converted into a DC or AC output current by converter 220, and delivered to device 222, where the current is used to perform useful work such as charging a vehicle battery system. Additional aspects and features of the various components of system 200 are disclosed, for example, in the following U.S. Patent Application Publications, the entire contents of each of which are incorporated herein by reference: 2015/0270719; 2013/0069441; 2014/0111019; and 2015/0323694.

Figure 3:
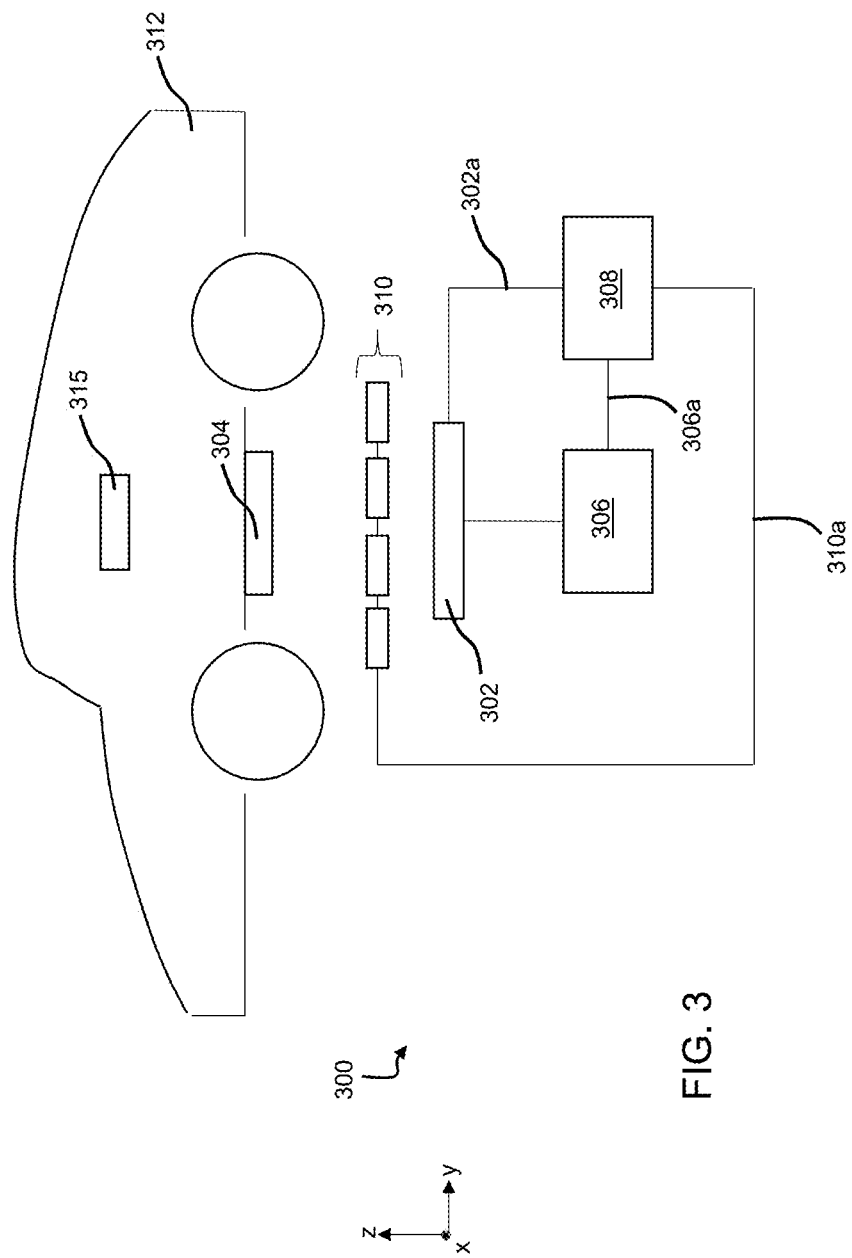
FIG. 3 is a schematic diagram of a wireless energy transfer system that includes foreign object debris (FOD) sensors.

To detect FOD, the wireless energy transfer systems disclosed herein include one or more FOD sensors. FIG. 3 is a schematic diagram of a portion of a wireless energy transfer system 300. System 300 includes a source resonator 302, e.g., positioned in a floor of a garage or other structure, or inset into a road. A receiver resonator 304 is attached to a vehicle 312 such that when the vehicle is stationary, resonators 302 and 304 are aligned in the x- and y-directions, and offset from one another in the z-direction.

System 300 also includes the other source-side components shown in FIGS. 1 and 2—a power source, a converter, a power amplifier, and an impedance matching network—collectively shown as source electronics 306. Source resonator is connected to a controller 308 via connection line 302a, and each of the components of source electronics 306 is connected to controller 308 via connection line 306a.

Also connected to controller 308 via a connection line 310a are one or more FOD sensors 310. In the following discussion, FOD sensors 310 will be referred to as an "array" of FOD sensors. It should be understood that the array can include any number of sensors, including a single sensor. Typically, however, system 300 includes multiple FOD sensors as part of the array.

It should also be understood that the term array, when applied to described sensors 310, does not necessarily mean that sensors 310 are arranged in a regular pattern or geometric shape. FOD sensors 310 can, in some embodiments, be arranged in a regular pattern (e.g., a square, rectangular, or hexagonal pattern). In certain embodiments, however, some or all of FOD sensors 310 are located such that they do not form a regular pattern. In general, individual FOD sensors 310 can be positioned at any x-y location and any elevation z between source resonator 302 and receiver resonator 304. The "array" of FOD sensors 310 can include individual sensors and/or groups of sensors positioned at different elevations, and sensors positioned at any x-y location. Multiple "layers"—each featuring multiple FOD sensors, and each at a different z elevation—can collectively correspond to the array of FOD sensors 310.

Each of the FOD sensors 310 in the array is connected to controller 308 and transmits its measurement signal to controller 308. In turn, controller 308 receives the measurement signals and uses the signals to establish baseline readings and identify the presence of FOD in the vicinity of system 300. For vehicle charging applications, system 300 can operate—at a particular time—in one of several modes, depending upon the positional relationship between the vehicle and the system. A first mode, for example, corresponds to the situation where the vehicle is approaching the wireless energy transfer system but has not yet parked, and power is not yet being transferred to the vehicle's on-board battery system. In this mode, low power diagnostic tests can be conducted without the vehicle present to check the status of the system and to check for FOD prior to the arrival of the vehicle.

A second mode corresponds to the situation where the vehicle has parked in proximity to source resonator 302, such that source resonator 302 and receiver resonator 304 are aligned, or approximately aligned. However, transfer of energy between source resonator 302 and receiver resonator 304, e.g., to charge the vehicle's batteries, is not yet occurring. In this mode, system 300 determines whether the region in proximity to source resonator 302 and/or receiver resonator 304 is free of FOD.

A third mode corresponds to the situation where energy is being transferred from source resonator 302 to receiver resonator 304, e.g., to charge the batteries of vehicle 312. During energy transfer at high power levels, system 300 uses measurements from sensor array 310 to ensure that no new FOD has arrived in the system in proximity to source resonator 302.

A wide variety of different FOD sensors 310 can be used to measure signals for FOD detection. Examples of suitable sensors will be discussed in greater detail in a later section of this disclosure.

FOD Detection by Principal Components Analysis

The systems and methods disclosed herein involve detection of FOD by principal components (PC) analysis. The PC basis provides a convenient space to represent measurements from FOD sensors in a non-local, orthogonal, uncorrelated set of basis vectors, organized according to their relative information content. A relatively small number of basis vectors can be used to represent the sensor environment (e.g., the distribution of magnetic fields within in proximity to the source and receiver resonators). The PC basis representation of the measured FOD sensor signals naturally de-noises the signals and calibration states that are produced from the signals. Furthermore, the projection of the sensor measurements into the PC basis allows the information encoded in the measurements to analyzed using a variety of techniques.

The principal components encode sensor measurements in a global manner; each principal component includes signal contributions from each of the FOD sensors in the system. The components can then be ordered according to their relative information content with respect to FOD detection. Put another way, the transformation from measurement signals to principal components is performed such that the first principal component represents the "direction" in the measurement signal data corresponding to the largest variance. Each successive principal component corresponds to the direction in the signal data corresponding to the next-largest variance. By transforming the measurement signal data in this manner, the set of principal components thus obtained constitutes an uncorrelated and orthogonal basis vector set.

The PC basis set can be updated to follow slow drift in the system calibration due to factors such as drift in the source-side power amplifier, and longer term changes in the electromagnetic environment in proximity to the system. As such, the system calibration can be dynamically updated to reduce the incidence of false-positive FOD detection. When FOD is present in proximity to the system, the electromagnetic environment changes in a way that scatters the FOD sensor measurements, as projected in the PC basis, far from the baseline system calibration. The scattering allows for robust FOD detection, and is typically represented by growth in the vector distance of the perturbed FOD sensor measurements, projected in the PC basis, from the baseline calibration state.

A number of advantages can be realized by using the PC-based anomaly (e.g., FOD) detection methods disclosed herein. The methods typically yield increased sensitivity to small FOD and FOD located at a variety of different z-elevations (including relatively large z-elevations), relative to conventional FOD detection methods. Natural system drift and noise when no FOD is present typically has some correlation. However, the introduction of FOD in proximity to the system causes perturbations to the electromagnetic environment which do not share the same correlation structure as system drift and noise. As such, the perturbations caused by FOD are isotropic in the spaced defined by the PC basis vectors.

Because the PC basis vectors—which are derived from the inverse covariance matrix—are ordered from highest to lowest variance, relatively small perturbations in the electromagnetic environment affect the contributions of first few PC basis vectors (i.e., those that correspond to the highest variance) to the system state the most. Thus, the PC-based detection methods disclosed herein are designed to focus in particular on FOD-induced perturbations, and to be relatively insensitive to significant but relatively constant contributions to the electromagnetic environment arising from other correlated system features, e.g., drift and noise.

The PC-based methods disclosed herein also permit relatively short system startup and calibration times to be realized. Updates to the system's baseline calibration can be performed using fast calibration routines that are performed in real time or near real time. Similarly, after FOD sensor measurements are received by the system controller, calculation of the detection signal by the controller is rapid, allowing for subsequent actions (such as reducing or discontinuing energy transfer, and/or alerting system users) to occur quickly.

The methods can also use FOD sensor measurements, transformed into the PC basis, for localizing the receiver resonator relative to the source resonator. For vehicle charging applications, for example, the system controller can transmit tracking and/or guidance signals to the vehicle on which the receiver resonator is mounted, to assist the vehicle's driver during parking to ensure that once parked, energy can be efficiently transferred from the source resonator to the receiver resonator.

Figure 4:
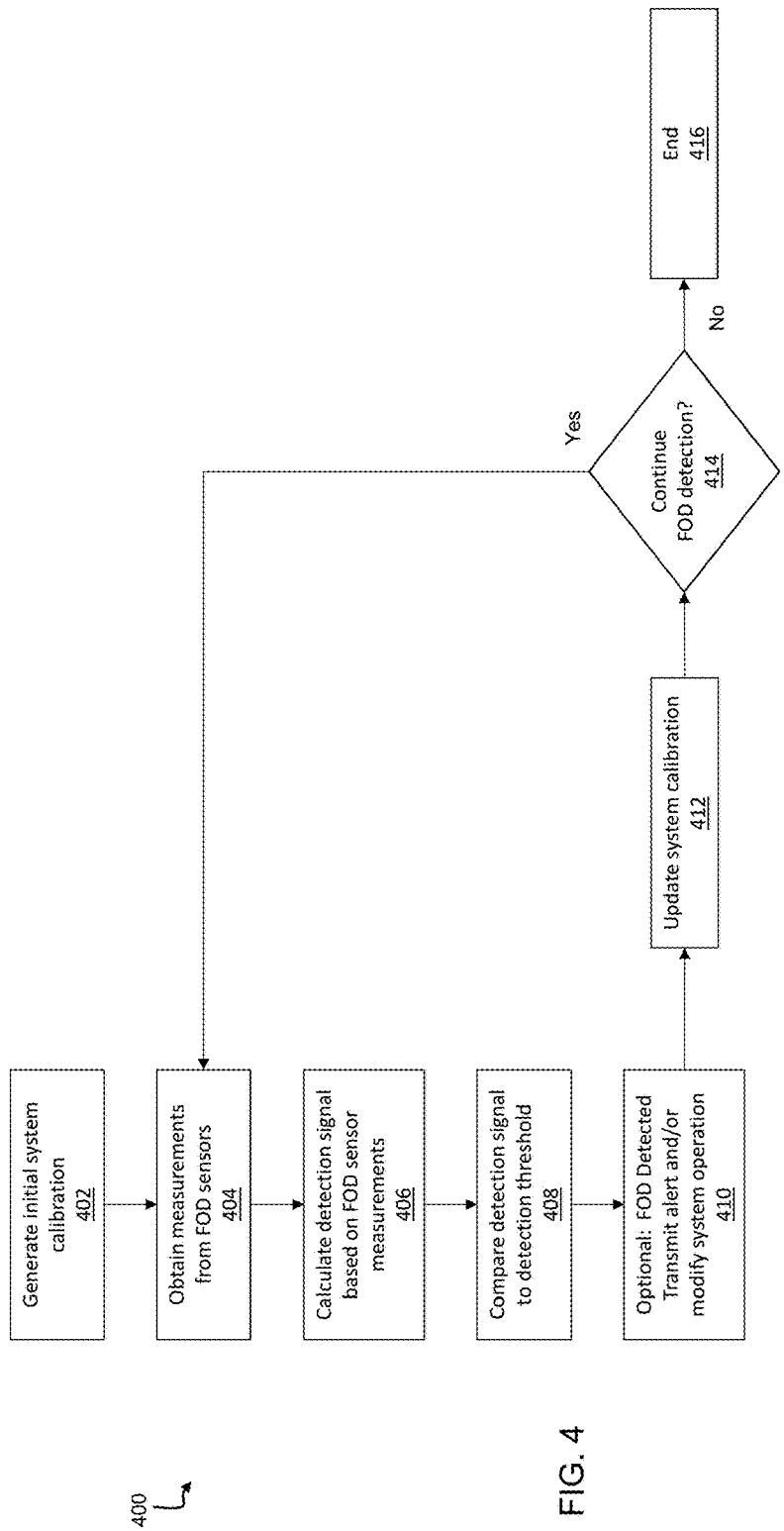
FIG. 4 is a flow chart showing a series of steps for detecting FOD in proximity to a wireless energy transfer system.

FIG. 4 is a flow chart 400 that shows a series of steps that can be performed to detect FOD in proximity to a wireless energy transfer system. In a first step 402, if not already present, the system generates an initial system calibration using measured signals from the system's FOD sensors. After the system calibration has been generated (or if the calibration was previously generated and is still valid), signal measurements are obtained from each of the system's FOD sensors in step 404. Then, in step 406, the FOD detection signal is calculated from the FOD sensor measurements obtained in step 404.

Next, in step 408, the FOD detection signal is compared to a detection threshold to determine whether FOD is present in proximity to the system. If FOD is determined to be present, then in optional step 410, the system can take a variety of actions including modifying system operating parameters (e.g., reducing or discontinuing energy transfer between the source and receiver resonators), and issuing various alerting messages and signals to system users.

In step 412, if no FOD is present, the system calibration is updated based on the latest FOD sensor measurements. Control then passes to decision step 414, where the system determines whether FOD detection should continue. If so, control returns to step 404 and new FOD sensor measurements are obtained. If not, the procedure ends at step 416.

The steps in flow chart 400 will now be individually discussed in greater detail. To facilitate the discussion, Table 1 below lists various parameters that are referred to subsequently.

TABLE 1

Definition of parameters used in PC-based FOD detection.

| Dimensions | Parameter | Description |
| --- | --- | --- |
| 1 | n | Number of system FOD sensors that provide measurement signals |
| 1 | N | Number of measurements for averaging |
| 1 | α | Infinite impulse response (IIR) filter coefficient |
| 1 | $n_\alpha$ | Characteristic number of samples in IIR filter history |
| 1 × n | $\bar{x}_t$ | Vector of FOD sensor measurements at time t (amplitude, phase, or both) |
| 1 × n | $\bar{\mu}_t$ | Vector average of sensor measurements at time t, updated with IIR filter |
| n × n | Σ | Covariance matrix of measurements at time t, updated with IIR filter |
| 1 | p | Number of principal components used in FOD detection, p ∈ [1, n] |
| n × p | $\Phi = eig(\Sigma^{-1})$ | Matrix of principal components |
| 1 × p | $P_t = (\bar{x}_t - \bar{\mu}_t) \cdot \Phi$ | Projection of FOD sensor measurements onto principal components |
| 1 | $f = F(P_t)$ | Foreign object detection signal |
| 1 | $\varepsilon_t$ | Detection signal threshold |

For use in both calibration and FOD detection, measurements from the system's FOD sensors are communicated to the system controller. Each of the system's n sensors typically generates an approximately sinusoidal signal, and the amplitude r and phase θ of the sensor signal is determined by the system controller. The phase of each of the sensor signals can be determined by the controller based on comparison to a reference clock circuit or signal within the controller.

Where signals generated by the system's FOD sensors are not approximately sinusoidal, various signal processing techniques can be used by the system controller to determine a fundamental component and/or at least one harmonic component of each of the signals, and the controller can use any combination of fundamental and harmonic components of the signals to determine an amplitude and phase of each of the sensor signals.

From an initial set of N measurements of amplitude and phase from each of the n FOD sensors (with each set of amplitude and phase measurements represented by a vector $\bar{x}_{0,i}$, an initial mean vector $\bar{\mu}_0$ and an initial covariance matrix $\Sigma_0$ can be calculated as follows:

$$\bar{\mu} = 1/N \sum_{i=1}^{N} \bar{x}_{0,i} \quad [1]$$

$$\Sigma_0 = 1/N \sum_{i=1}^{N} (\bar{x}_{0,i} - \bar{\mu}_0)^T (\bar{x}_{0,i} - \bar{\mu}_0) \quad [2]$$

The initial mean vector and covariance matrix determined as shown in Equations (1) and (2) above can be calculated as part of the initial system calibration in step 402 of flow chart 400. That is, the system's initial calibration state— when no FOD is present in the vicinity of the system—is encoded in the initial mean vector and the initial covariance matrix.

The principal components of the covariance matrix form an orthogonal eigenvector basis set in which all of the FOD sensor measurements can be expressed. Since the covariance matrix represents the variance among FOD sensor measurements, the principal component eigenvectors with the largest associated eigenvalues represent the eigenvector "directions" in the set of FOD measurements along which the variance is highest. Ordering the principal component eigenvectors according to the magnitudes of their associated eigenvalues, the first principal component represents the direction of largest variance in the set of FOD measurements, the second principal component represents the direction of next-largest variance in the set of FOD measurements, and so on. The set of FOD sensor measurements can be represented as a vector projection in the principal component basis with a particular magnitude and direction.

When FOD is introduced in proximity to the system and a new set of FOD sensor measurements are obtained and projected into the principal component basis, the projection representing the new measurements differs from the initial system state described by the original projection. FOD typically perturbs the system away from the initial system state isotropically in all directions because the perturbation represented by the FOD is uncorrelated with other contributions (e.g., global system variations that arise from changes in FOD sensor currents, system noise, environmental changes not caused by FOD such as temperature variations) to variance in the FOD sensor measurements.

Depending upon the nature of the FOD, the perturbation introduced into the measurement signals obtained from the system's FOD sensors may be relatively small. In particular, for FOD of relatively small size, and for FOD located at relatively large distances from the FOD sensors, the contribution of the FOD to the variance in the FOD sensor measurements can be minor.

As noted above, the eigenvectors of the covariance matrix with the largest eigenvalues represent the directions in the FOD sensor measurements of largest variance. However, detection of FOD frequently entails measuring the FOD contribution to the variance against what may be a comparatively larger background of variance due to other components and signal contributions in the system. These FOD contributions may therefore more easily be detected by examining the principal components of the covariance matrix with the smallest associated eigenvalues; that is, the principal components that represent the directions of smallest variance in the FOD sensor measurements. The perturbative signal contributions due to FOD are more easily detected against the initial background represented by these principal components.

Equivalently, rather than using the covariance matrix, the methods and systems disclosed herein instead use the inverse covariance matrix to describe the variance in the FOD sensor measurements. The principal components (or eigenvectors) of the inverse covariance matrix with the largest associated eigenvalues represent the directions in the FOD measurement signals with the smallest variance. That is, the principal component of the inverse covariance matrix with the largest associated eigenvalue corresponds to the direction in the FOD sensor measurements along which the variance is smallest, the principal component of the inverse covariance matrix with the next largest associated eigenvalue corresponds to the direction in the FOD sensor measurements along which the variance is next-smallest, and so on. By projecting FOD sensor measurements into a principal components basis derived from the inverse covariance matrix, the presence of FOD in proximity to the system can more readily be identified.

As discussed above, in step 402, an initial system calibration is obtained. The methods disclosed herein allow for an initial calibration state to be quickly generated, the state offering reasonable sensitivity for FOD detection. The initial system calibration can then be refined as the FOD detection algorithm cycles and the inverse covariance matrix is refined.

To obtain an initial system calibration, note first that the diagonal elements of the inverse covariance matrix are simply reciprocals of the variances. The variances can be found by first estimating the mean vectors with a small number of measurements and an infinite impulse response (IIR) filter, as follows:

$$\mu_t = \bar{x}_t \alpha + \mu_{t-1}(1-\alpha) \qquad [3]$$

The coefficient $\alpha$, the IIR filter coefficient, weights new information against older information in producing updated mean vectors. In Equation (3), the updated mean vector is computed as a weighted linear combination of new FOD sensor measurements and a previous mean vector. The "half life" of the IIR history is approximately $1/\alpha$. For example, a value of $\alpha=0.3$ and a set of about 5 FOD sensor measurements typically provides a reasonable estimate for the mean vectors. It should be noted that in the discussion that follows, IIR filters are used to update various parameters to account for changes in the values of these parameters over time. More generally, various different types of filters can be used for similar purposes, and the methods are not restricted to the use of IIR filters. The use of such filters is merely discussed for illustrative purposes.

Then, an initial estimate is generated for each of the variances using another IIR filter according to:

$$\bar{\sigma}_t^2 = |\bar{\mu}_t^2 - 2\bar{\mu}_t \bar{x}_t + \bar{x}_t^2|\alpha + \sigma_{t-1}^2(1-\alpha) \qquad [4]$$

where $\bar{\sigma}_t^2$ is a vector of signal variances and $\bar{x}_t$ are FOD sensor measurements at time t, without mean subtraction. After a few (e.g., five) measurements, the vector of signal variances is ready for use to approximate the inverse covariance matrix. The initial estimate of the inverse covariance matrix can be made according to the following rules:

$$\Sigma_{ij}^{-1} = 1/\sigma_i^2 \text{ if } i = j \qquad [5]$$

$$\Sigma_{ij}^{-1} = 0 \text{ otherwise} \qquad [6]$$

where $\sigma_i^2$ is the i-th signal variance, and $\Sigma_{ij}^{-1}$ is the i,j-th element of the initial inverse covariance matrix. The initial estimate for the inverse covariance matrix computed according to Equations (3)-(6) functions as an initial system calibration. After the initial system calibration has been determined (typically, for example, within a time period of about 1-2 seconds), the system is ready to begin FOD detection.

Referring again to FIG. 4, after the initial system calibration has been obtained in step 402 as discussed above, the next step 404 involves obtaining a set of FOD sensor measurements that are used to detect FOD in proximity to the system. As discussed previously, the FOD sensors typically generate measurement signals from which a signal amplitude and phase are extracted by the system controller. Signal amplitudes, signal phases, and combinations of measurement signal amplitudes and phases can all be used to detect FOD. The FOD sensor measurements are transmitted to the system controller, which can then perform the subsequent analysis steps shown in flow chart 400.

After the FOD sensor measurements have been obtained in step 404, the next step 404 involves calculation of the FOD detection signal based on the sensor measurements. To calculate the detection signal, the FOD sensor measurements are projected into a principal components basis for the inverse covariance matrix. In general, an orthogonal set of p (where p≤n) principal components are generated from the p eigenvectors of the inverse covariance matrix, sorted in descending order according to the magnitude of the corresponding eigenvalues.

As mentioned above, each principal component encodes the FOD sensor measurements in a global manner, and features contributions from each of the FOD sensor signals. The first step is therefore to find the eigenvectors of the inverse covariance matrix. Specifically, a p×n matrix Φ is constructed, where each column corresponds to a different principal component (e.g., eigenvector) of the inverse covariance matrix, with the eigenvectors ordered in the columns of Φ according to the magnitudes of their respective eigenvectors. To obtain Φ, the system controller performs a partial or complete eigenvector decomposition of the inverse covariance matrix as follows:

$$\Phi = \mathrm{eig}(\Sigma_0^{-1}) \quad [7]$$

Eigenvector decomposition is a well-known mathematical operation and the system controller can use any one of a variety of conventional methods for performing the operation in Equation (7). In practice, it is generally sufficient for FOD detection purposes to obtain only the first few eigenvectors of the inverse covariance matrix (i.e., p=1-6). Thus, Equation (7) can be performed as a partial eigenvector decomposition, reducing the computational load on the system controller. Through experimentation, it has been discovered that determining and using only the first few eigenvectors (i.e., the eigenvectors corresponding to the largest eigenvalues) of the inverse covariance matrix, such that p<<n, generally allows detection of FOD with higher sensitivity than using all eigenvectors as the PC basis, as most of the relevant signal information is contained in the first few eigenvectors.

After the principal components matrix Φ has been obtained, the new FOD sensor measurements—represented by the vector $\bar{x}_t$—are mean-subtracted and projected into the principal components basis of the inverse covariance matrix as follows:

$$P_t = (\bar{x}_t - \bar{\mu}_t) \cdot \Phi \quad [8]$$

Principal components analysis generally requires that the data set being analyzed has a zero mean value, which is accomplished by the mean-subtraction in Equation (8). The 1×p matrix $P_t$ now contains the projection or "loading" at time t of the FOD sensor measurements in the principal components basis. The mean vectors $\bar{\mu}_t$ are updated with an N-point running window according to:

$$\bar{\mu}_t = 1/N \sum_{t'=t-N}^{t-1} \bar{x}_{t'} \quad [9]$$

Alternatively, updated mean vectors can also be generated using an IIR filter according to Equation (3), as discussed above.

Figure 5:
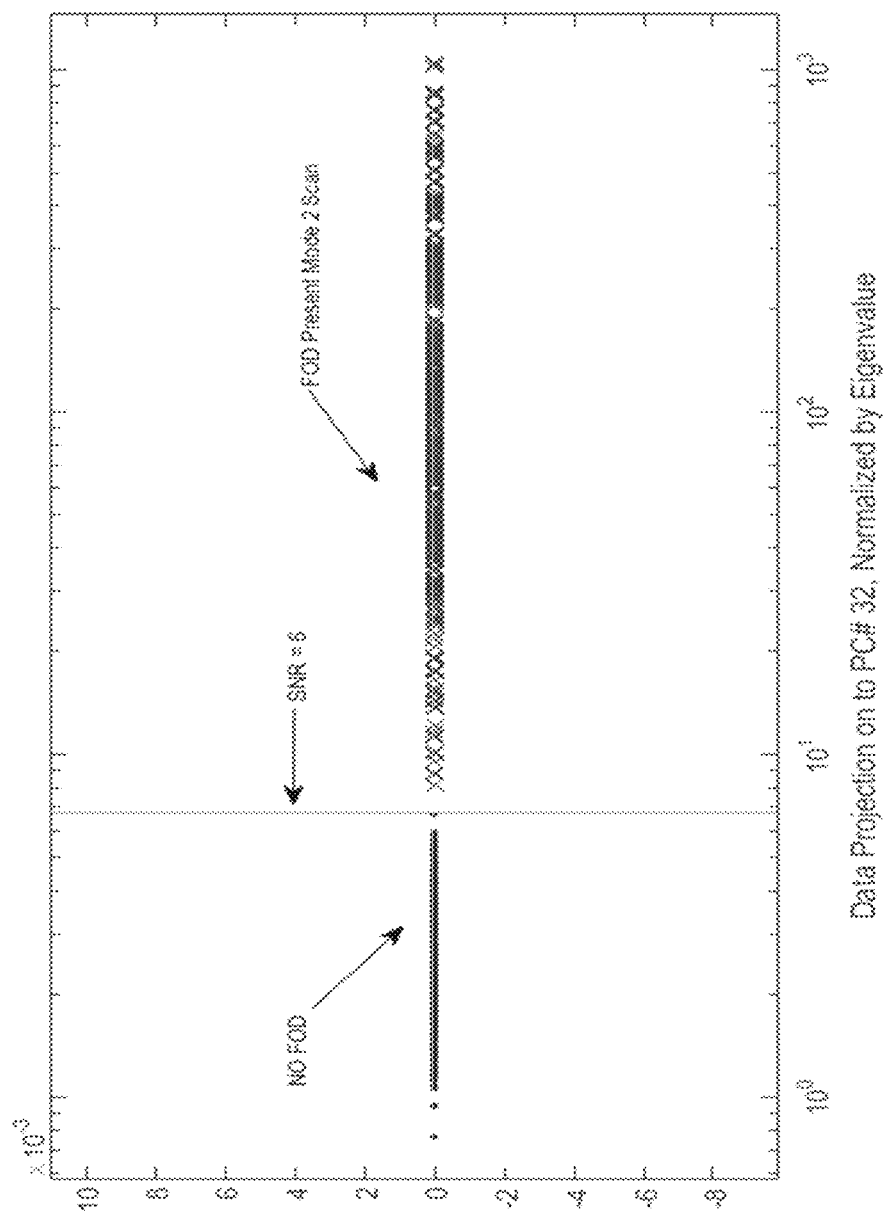
FIG. 5 is a plot showing projections of FOD sensor measurements onto an eigenvector of a covariance matrix describing a system calibration state.

FIG. 5 is a plot showing the projection of a set of 32 FOD sensor signals onto an eigenvector of the covariance matrix with the smallest magnitude eigenvalue. With no FOD present in proximity to the system, as shown on the left side of the plot, the projection clusters tightly about the origin (zero). However, with FOD present, as shown on the right side of the plot, the projection is spread far away from the origin. A signal-to-noise ratio of 6 for the FOD sensor measurements completely separated the projections with and without FOD present. Furthermore, as shown in the plot, only a single eigenvector was needed to detect the presence of FOD, which significantly reduces the computational load and memory requirements for the system controller.

Figure 6:
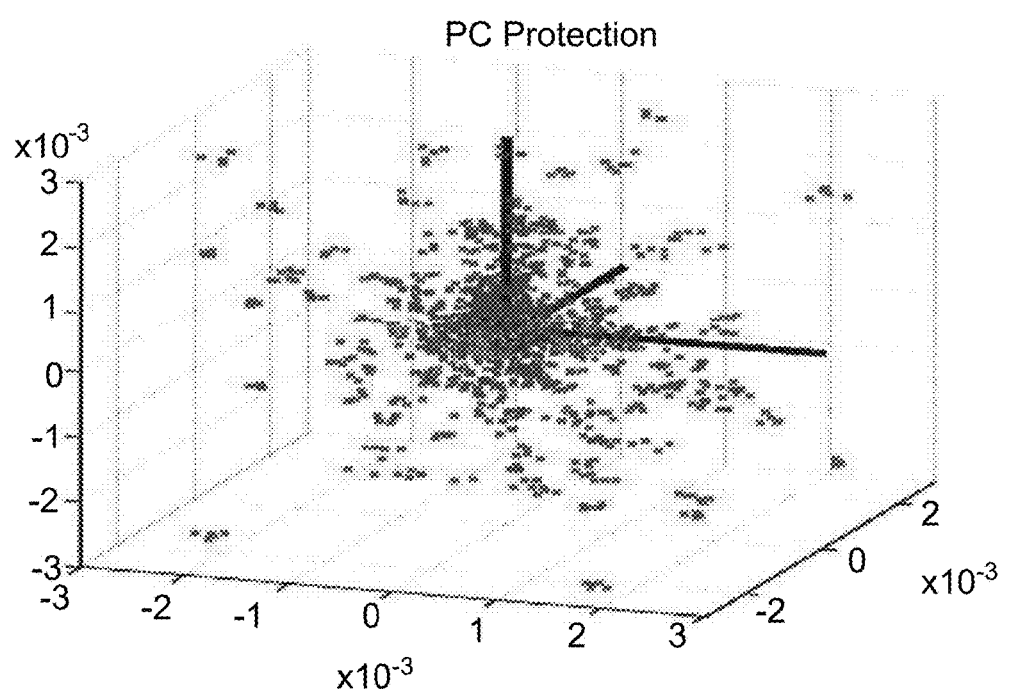
FIG. 6 is a plot showing amplitudes of FOD sensor measurements projected onto eigenvectors of an inverse covariance matrix describing a system calibration state.
Figure 7:
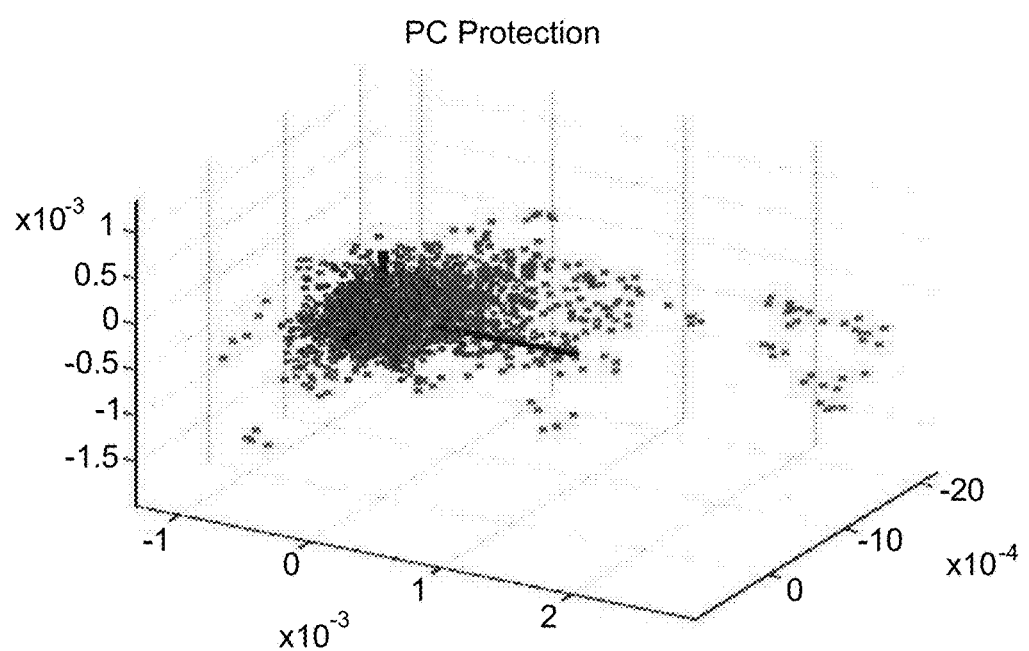
FIG. 7 is a plot showing phases of FOD sensor measurements projected onto eigenvectors of an inverse covariance matrix describing a system calibration state.

FIGS. 6 and 7 are plots showing amplitudes and phases, respectively, of FOD sensor measurements projected onto the first three principal components of an inverse covariance matrix for a wireless energy transfer system. With no FOD present (circles), the projection clusters tightly around the origin, but with FOD present (a 2-inch square piece of copper), the projection scatters significantly away from the origin (crosses).

Figure 8:
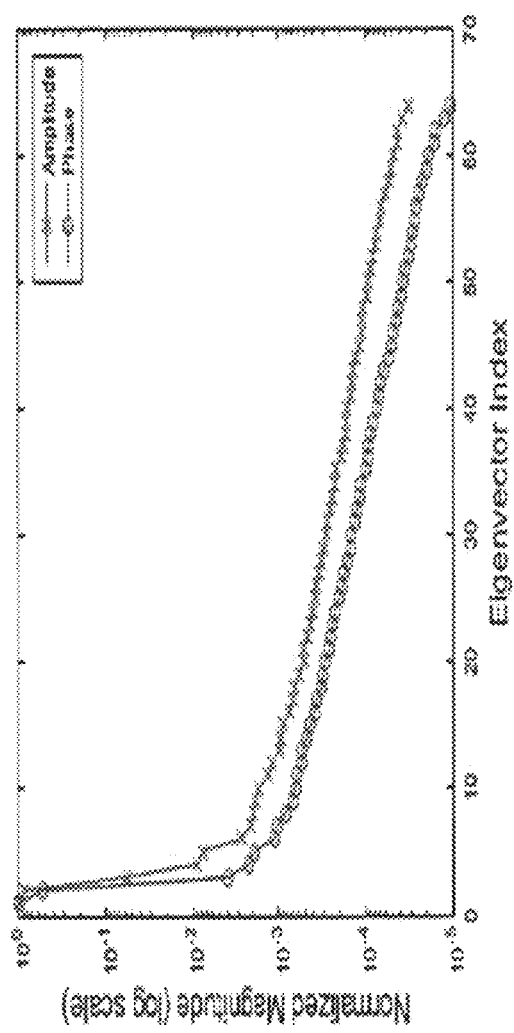
FIG. 8 is a plot showing normalized magnitudes of eigenvalues for the principal components of inverse covariance matrices derived from amplitudes and phases of FOD sensor measurements and describing a system calibration state.

FIG. 8 is a plot showing the normalized magnitudes of the eigenvalues for the principal components of the inverse covariance matrix, for both amplitudes and phases of FOD sensor measurements. Notably, the magnitudes of the first few eigenvalues are significantly larger than the others. The first three principal components contain 97.8% and 98.8% of the information in the amplitude and phase measurements, respectively, based on the combined relative magnitudes of the respective eigenvalues, demonstrating that FOD can be detected by considering a relatively small number of the principal components.

With the projection $P_t$ of the FOD sensor measurements obtained, detection of FOD can be achieved by processing the FOD sensor measurements directly in the principal components basis. To detect FOD, a scalar detection signal $f = F(P_t)$ is calculated as a function of the principal component loadings.

Various forms of f can be used, and the methods disclosed herein do not require a particular functional form. Several examples of suitable FOD detection signals are described below, but it should be understood that other detection signals can also be used.

One type of FOD detection signal that can be used is the L2 norm of $P_t$, which can be calculated according to:

$$f = \sqrt{\sum_{i=1}^{p}(P_t^i)^2} \quad [10]$$

where p≤n principal components are used. This detection signal is effective at detecting FOD because signal measurements that are similar to the calibration and updated signal mean vector will cluster very close to the origin, whereas a perturbation to the magnetic environment caused by FOD will scatter the projection far from the origin.

Figure 9:
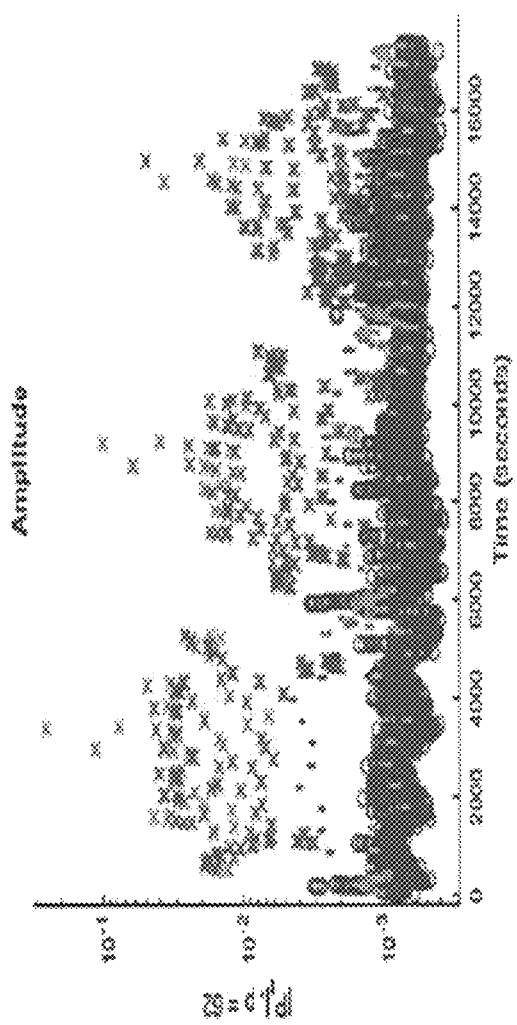
FIG. 9 is a plot showing a FOD detection signal as a function of time, calculated from an inverse covariance matrix based on amplitudes of FOD sensor measurements.

FIGS. 9-12 are plots showing examples of the detection signal in Equation (10), for amplitudes and phases of the FOD sensor measurements, and for p=62 or p=8 principal components of the inverse covariance matrix, as a function of time. In FIG. 9, 62 principal components were used and the detection signal was calculated based on amplitudes of the FOD sensor measurements. Detection of FOD is robust when the measurements taken with FOD present (crosses) are well separated from measurements taken with no FOD present (circles). The FOD sensor measurements were obtained at three increasing z heights relative to the FOD sensors over time. That is, the measurements obtained at the smallest z height are represented by the first, early-time cluster of detection signal points, while measurements obtained at the two larger z heights are represented by the second and third clusters of detection signal points, also separated in time in the plot.

Figure 10:
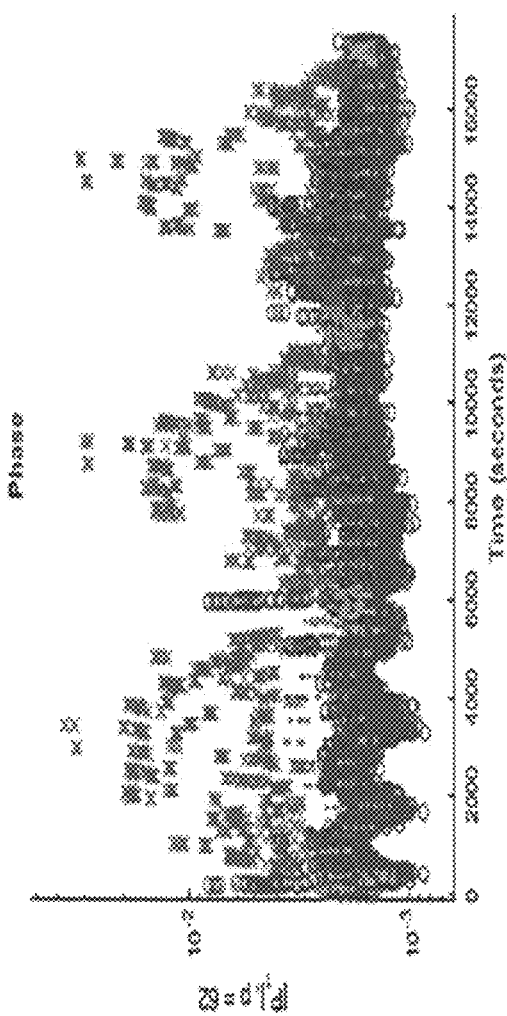
FIG. 10 is a plot showing a FOD detection signal as a function of time, calculated from an inverse covariance matrix based on phases of FOD sensor measurements.

FIG. 10 shows detection signals calculated based on the phases of the FOD sensor measurements, with 62 principal components used. As in FIG. 9, three clusters of detection signal points, representing FOD sensor measurements for three different z heights of the FOD relative to the FOD sensors, are shown.

Figure 11:
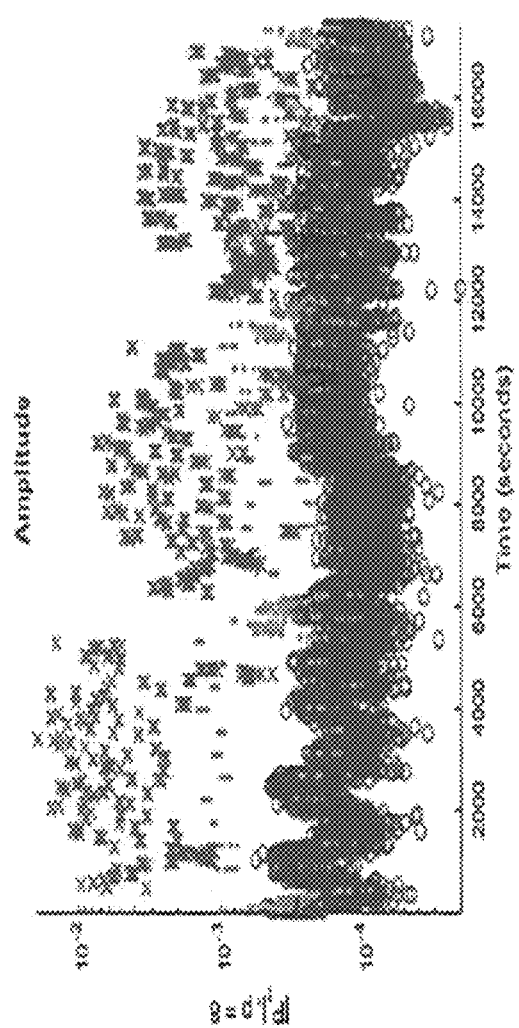
FIG. 11 is a plot showing a FOD detection signal as a function of time, calculated from an inverse covariance matrix based on amplitudes of FOD sensor measurements.
Figure 12:
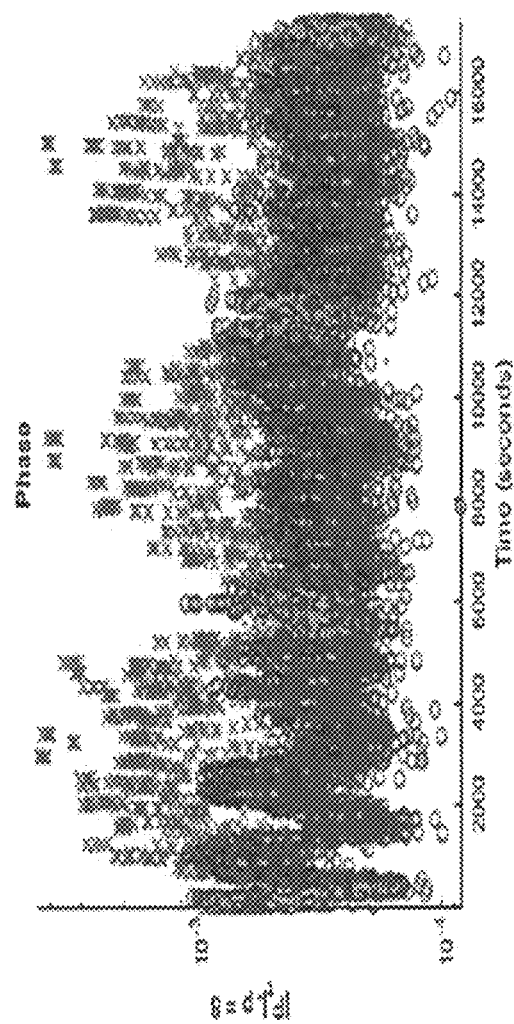
FIG. 12 is a plot showing a FOD detection signal as a function of time, calculated from an inverse covariance matrix based on phases of FOD sensor measurements.

FIGS. 11 and 12 are similar to FIGS. 9 and 10, respectively, but use only 8 principal components. The variance of the measurements was reduced when no FOD was present in these sparser representations of the FOD sensor measurements, which may make FOD detection easier.

Another type of FOD detection signal that can be used is a scaled L2 norm of the projection $P_t$. That is, the projections can be scaled by the eigenvalues of each principal component, effectively normalizing the principal components basis. Scaling the projections in this manner ensures that deviations from the system calibration in each direction along the principal components is weighted equally. In the principal components basis, projections along the principal components are orthogonal and uncorrelated, so weighing them equally can assist in detecting relatively small perturbations that may arise from FOD. The scaled L2 norm can be calculated according to:

$$f = \sqrt{\sum_{i=1}^{i=p} (P_t^i/\lambda_i)^2} \quad [11]$$

where $\lambda_i$ is the eigenvalue corresponding to the i-th principal component.

A variety of other FOD detection signals can also be used. In particular, conventional machine learning approaches such as support vector machines, Fisher's linear discriminant, and multidimensional decision surfaces in the PC basis can be used to calculate suitable FOD detection signals.

Returning to FIG. 4, after the FOD detection signal has been calculated, the signal is compared in step 408 to a detection threshold to determine whether FOD is present in proximity to the system. Many different thresholds can be used to perform this comparison. In some embodiments, for example, the binary detection threshold can be calculated as:

$$\varepsilon = a \cdot \text{std}(|P_t|) \quad [12]$$

where a is a scalar constant, and "std" represents the standard deviation. For example, for a positive detection decision when $f > \varepsilon$ and with a=5, a correct foreign object detection rate of 95.7% was obtained, with a false positive rate of 1.9% for p=8. For a=3, a correct foreign object detection rate of 98.7% was obtained, but the false positive detection rate increased to 19.6%.

In some embodiments, to minimize false FOD detections and eliminate outlier measurements, a majority-based decision scheme can be used in place of the binary decision discussed above. For example, a buffer containing the most recent m FOD detection signal values f can be maintained by the system controller, and FOD is affirmatively detected only if a majority h of the m values off exceed the detection threshold $\varepsilon$. The probability that a particular value off exceeds $\varepsilon$ is given by $u=\exp(-\varepsilon)$, and thus the false detection rate is given by:

$$\Gamma = \frac{m!}{h!(m-h)!}[u^h(1-u^h)^{m-h}] \quad [13]$$

Table 2 shows calculated values of the false detection rate for various majority decision rules corresponding to different buffer lengths m and majority definitions h.

TABLE 2

FOD false detection rate for majority decision rules.

| m | h | ε | Γ |
|---|---|---|---|
| 5 | 3 | 3.0 | 1.1 × 10⁻³ |
| 5 | 4 | 3.0 | 4.7 × 10⁻⁴ |
| 5 | 4 | 3.5 | 8.3 × 10⁻⁷ |
| 7 | 5 | 3.0 | 4.9 × 10⁻⁷ |
| 7 | 6 | 4.0 | 2.5 × 10⁻¹⁰ |

If FOD is detected in step 408, then in step 410, the system controller can optionally take one or more actions. In some embodiments, for example, the system controller can modify one or more system operating parameters. This can include reducing the amount of energy that is transferred between the source and receiver resonators, and even discontinuing energy transfer altogether. In certain embodiments, the system controller can transmit one or more warning messages to users of the wireless energy transfer system. Various optional actions that can be taken will be discussed in greater detail subsequently.

When FOD is not detected in proximity to the system, in step 412, the system calibration is updated before the next FOD detection cycle occurs. Over time, changes in the electromagnetic environment of the system due to factors such as variations in the operating parameters of the source-side power amplifier, local heating, and perturbations due to non-FOD external objects, can lead to significant "drift" from the initial system calibration established at step 402. If the system calibration is not updated to take account of this drift, the FOD false positive detection rate and/or the false negative detection rate can increase.

For vehicle charging applications, significant overall drift has been observed in each of operational modes 1, 2, and 3. The drift may be due to thermal changes in the source-side amplifier, which changes the amplitude of the driving current supplied to the source resonator, leading to drift in the energy transfer magnetic field and induced EMF in the FOD sensors.

Figure 13:
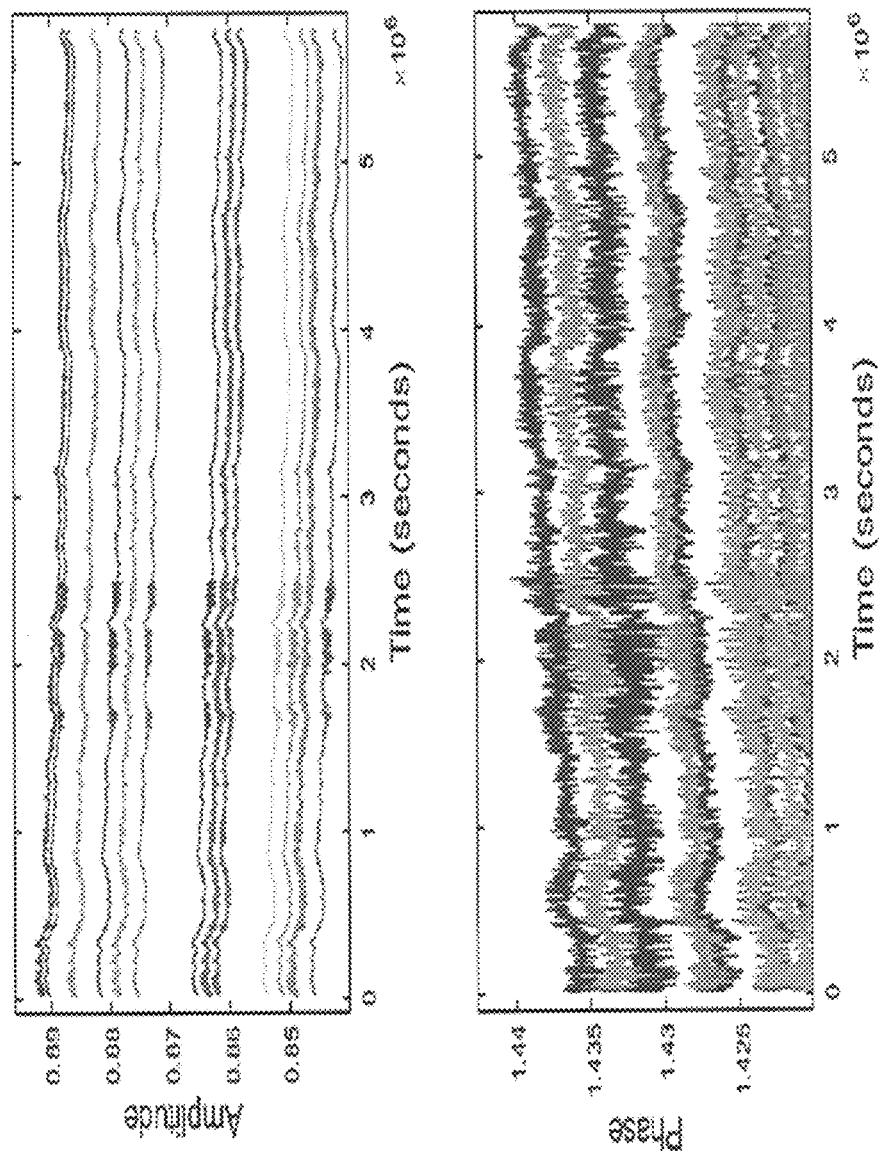
FIG. 13 is a set of plots showing time-series measurements of the amplitude and phase of FOD sensor signals in operational mode 2 with no FOD present.
Figure 14:
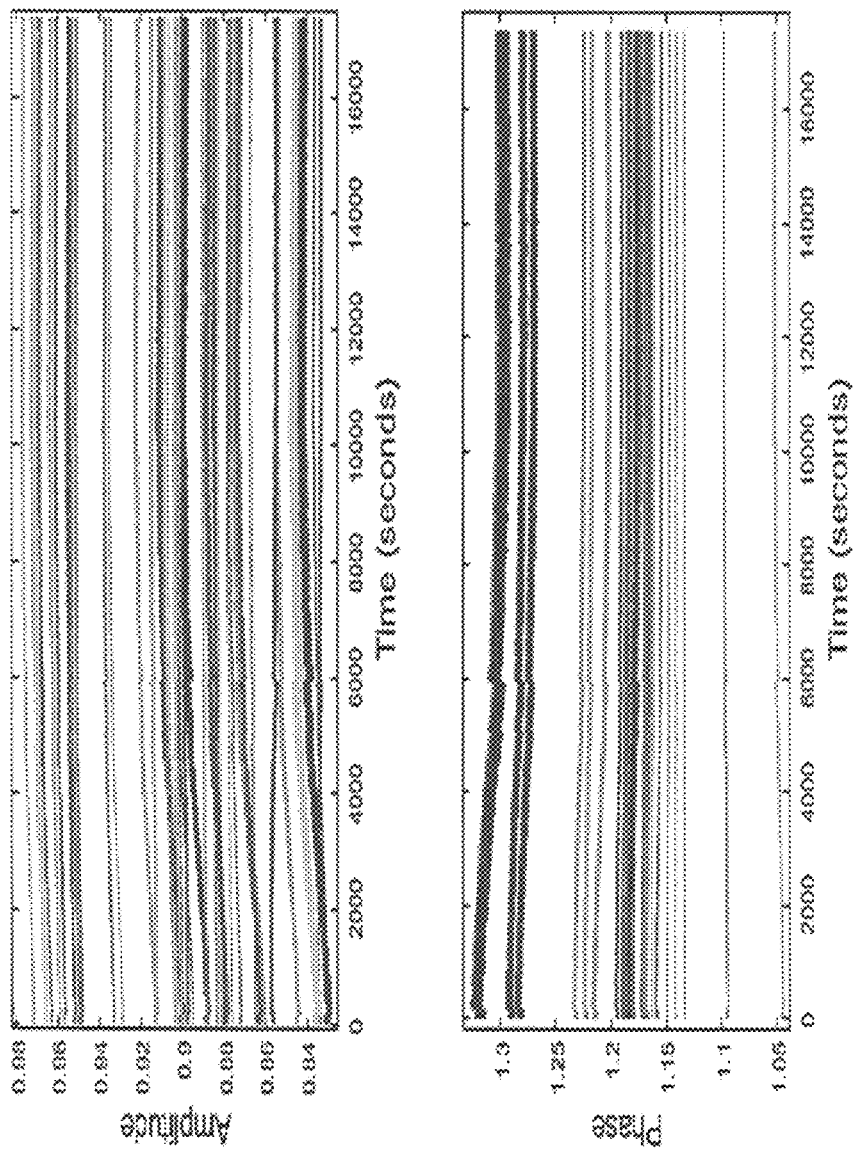
FIG. 14 is a set of plots showing time-series measurements of the amplitude and phase of FOD sensor signals in operational mode 3 with no FOD present.
Figure 15:
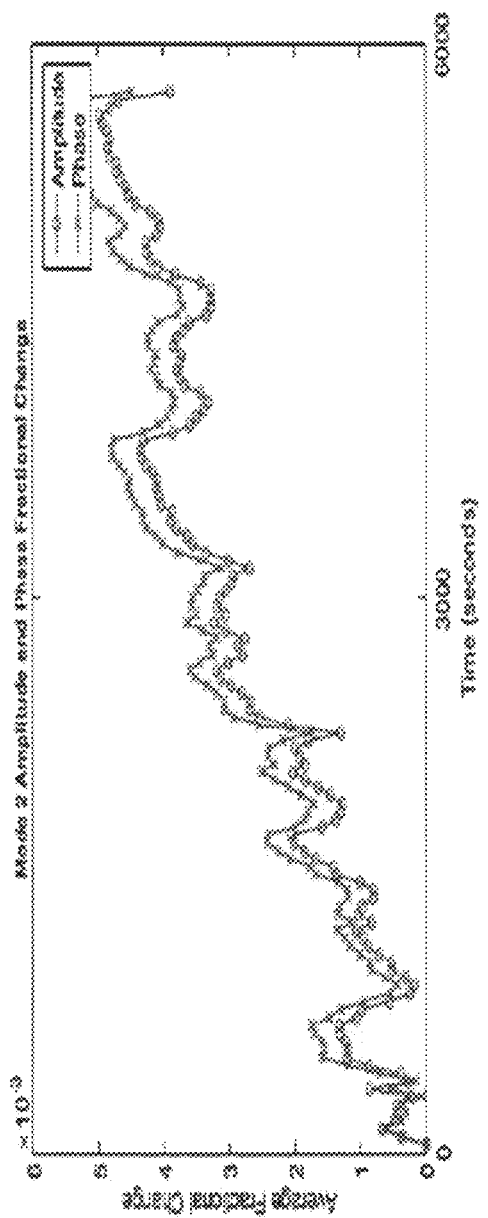
FIG. 15 is a plot showing the average fractional drift per FOD sensor as a function of time for amplitudes and phases of FOD sensor signals in operational mode 2.
Figure 16:
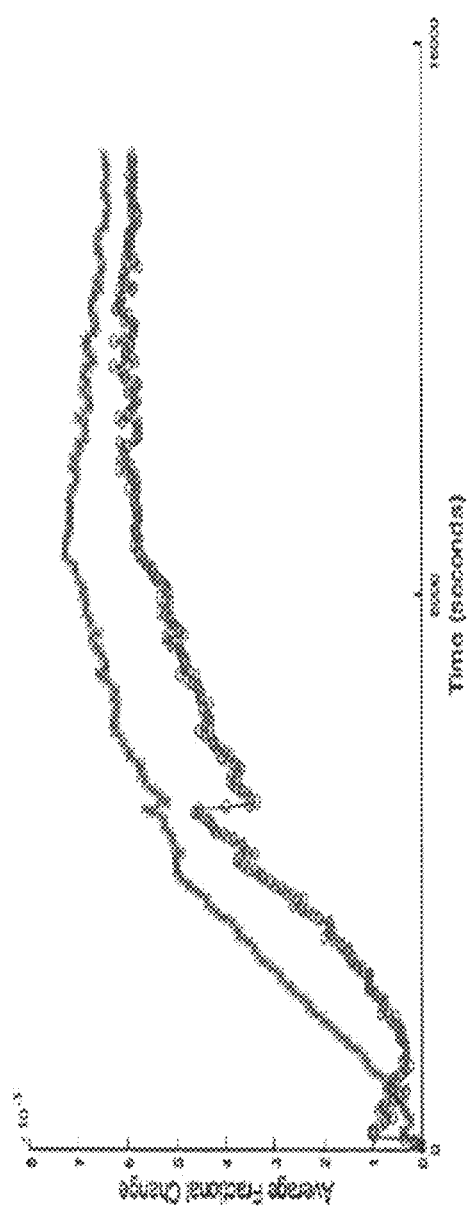
FIG. 16 is a plot showing the average fractional drift per FOD sensor as a function of time for amplitudes and phases of FOD sensor signals in operational mode 3.

FIGS. 13 and 14 are plots showing time-series measurements of the amplitude and phase of FOD sensor signals in operational modes 2 and 3, respectively, with no FOD present. FIGS. 15 and 16 are plots showing the average fractional drift per FOD sensor as a function of time for both the amplitudes and phases. At each time step, 25 measurements were obtained, averaged together, and compared to the initial system calibration in a Euclidean L2 norm. In FIG. 15, overall drift from the initial system calibration of about 0.5% per sensor was observed after about 1.5 hours. The amplitude and phase followed a similar evolution away from the initial calibration, suggesting that the drift is common to all FOD sensors in the system. In FIG. 16, an overall drift from the initial system calibration of about 0.75% per sensor was observed after about 2.25 hours. These drift measurements suggest that in some circumstances, the observed system drift away from the initial calibration can be significant enough that the system calibration should be updated during FOD detection to account for drift.

In step 412, a variety of different updates to the system calibration and other parameters to account for drift. The mean vector can be updated using an IIR filter as shown in Equation (3) above. The covariance matrix can also be updated in a similar manner using an IIR filter as follows:

$$\Sigma_t = \alpha[(\bar{x}_t - \bar{\mu}_{t-1})] + (1-\alpha)\Sigma_{t-1} \quad [14]$$

As discussed briefly above, the IIR filter parameter $\alpha$ governs how quickly the mean vector and covariance matrix are updated. The exponential "half-life" is given by $n_\alpha$, which is related to $\alpha$ as follows:

$$\alpha = 1 - e^{-1/n_\alpha} \quad [15]$$

$$n_\alpha \approx 1/\alpha - 1/2\alpha^2 + O(1/\alpha^3) \quad [16]$$

The rate at which the system updates is generally selected based on two time scales. The first is the characteristic time scale of system drift, which typically occurs at time scales of minutes to hours. The system calibration is generally updated at a rate that is faster than the time scale of drift. The second time scale is the rate at which FOD is introduced in proximity to the system, which generally occurs on the order of a few seconds. The system calibration is generally updated at a rate that is slower than this time scale so that perturbations due to the incoming FOD are not incorporated into the system calibration.

Thus, for a FOD sensing rate of 2 Hz, the product of the sensing rate and $n_\alpha$ is 50, which corresponds to a half-life of about 25 seconds. In general, it has been found experimentally that a half-life of about 25-100 seconds for a sensing rate of 2 Hz is appropriate. If the FOD sensing rate is higher (e.g., 10 Hz up to 100 Hz), then the product of the sensing rate and $n_\alpha$ can be between 1000 and 10000 (e.g., about 5000), with a relatively small value of $\alpha$ (e.g., $\alpha=0.0002$).

In general, smaller values of $n_\alpha$ are more sensitive to a rapid introduction of FOD, but less sensitive to slow introduction of FOD. To provide sensitivity across a broad range of FOD introduction rates, in some embodiments, the system can obtain FOD sensor measurements corresponding to different $\alpha$ values, so that FOD introduced at virtually any rate in proximity to the system can be detected with high reproducibility.

As discussed above, the methods and systems disclosed herein typically represent FOD sensor measurements in a PC basis derived from the eigenvectors of the inverse covariance matrix. To update the inverse covariance matrix, an updated covariance matrix can first be calculated as shown in Equation (14), and then the updated inverse covariance matrix can be obtained from the updated covariance matrix.

However, other methods can also be used to update the inverse covariance matrix that do not involve performing a matrix inversion operation, which can be time consuming and involve a relatively heavy computational load on the system controller. In particular, when the covariance matrix is updated, if every change to the covariance matrix is an update of rank 1, the Sherman-Morrison-Woodbury formula can be used to calculate an updated inverse covariance matrix. This formula is an exact expression for the inverse of a matrix that is perturbed by a rank 1 update.

For example, suppose matrix M and its inverse $M^{-1}$ are known at time t-1. If M is perturbed by a rank 1 update corresponding to $v_t v_t'$, such that $$M_t = M_{t-1} + v_t v_t' \quad [17]$$

then an updated inverse, $M^{-1}$, can be calculated quickly as:

$$M_t^{-1} = [M_{t-1} + v_t v_t']^{-1} = M_{t-1}^{-1} - \left(\frac{M_{t-1}^{-1} v_t v_t' M_{t-1}^{-1}}{1 + v_t' M_{t-1}^{-1} v_t}\right) \quad [18]$$

The new inverse matrix can be calculated quickly using Equation (18) because the operations involved are of order $O(n^2)$, due to the symmetry of the covariance matrix and the rank 1 outer product update only has n unique entries. As a result, calculation of the inverse matrix is typically faster and more stable numerically than a conventional matrix inversion of order $O(n^3)$. Furthermore, because the covariance matrix is symmetric, execution time and storage memory in the system controller can be optimized for performing the update.

To populate the off-diagonal elements in the inverse covariance matrix following the initial calibration and to account for system drift, the covariance matrix can be updated as FOD sensor measurements are acquired. This can be accomplishing by combining the rank 1 update technique of Equation (18) with the IIR filter technique of Equation (14). The IIR filter-based update to can be incorporated directly into Equation (18) as follows:

$$\sum_t^{-1} = \left[(1-\alpha)\sum_{t-1} + \alpha v_t v_t'\right]^{-1} \quad [19]$$

$$= \left(\frac{1}{1-\alpha}\right)\sum_{t-1}^{-1} - \frac{\left(\frac{\sum_{t-1}^{-1}}{1-\alpha}\right)\alpha v_t v_t' \left(\frac{\sum_{t-1}^{-1}}{1-\alpha}\right)}{1 + \left(\frac{\alpha}{1+\alpha}\right) v_t' \sum_{t-1}^{-1} v_t}$$

$$= \left(\frac{1}{1-\alpha}\right)\sum_{t-1}^{-1} - \frac{\alpha}{(1-\alpha)^2} \frac{\sum_{t-1}^{-1} v_t v_t' \sum_{t-1}^{-1}}{\left[1 + \left(\frac{1}{1-\alpha}\right) v_t' \sum_{t-1}^{-1} v_t\right]}$$

where $v_t = \bar{x}_t - \bar{\mu}_{t-1}$. Every term in Equation (19) is known at time t either from initiation, or after development of the initially diagonal inverse covariance matrix as part of the initial calibration.

To update the inverse covariance matrix, a value for $\alpha$ is selected. As the covariance matrix is not full rank without N>n and is best approximated when N»n, a history of several times n measurements is typically used. For n=32, $\alpha=0.01\approx 1/3n$ records a history with a half-life of about 3n measurements. For faster updates and system tracking (i.e., for tracking power level changes), faster update rates have been observed to be stable to about $\alpha=1/n$ 0.03125.

Figure 17:
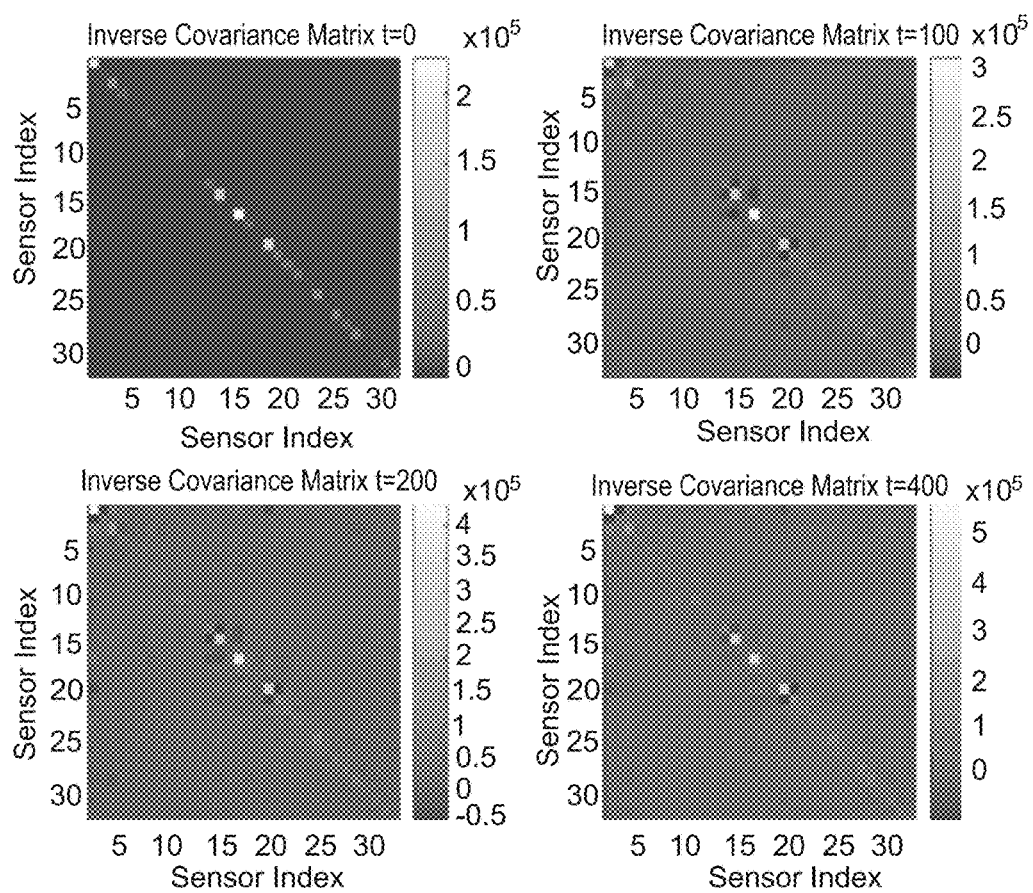
FIG. 17 is a set of plots showing the inverse covariance matrix formed from the amplitudes of FOD sensor measurements at different times.

FIG. 17 is a set of plots that show the inverse covariance matrix formed from the amplitudes of FOD sensor measurements as it evolves in time following updates. At t=0, as shown in the upper left plot, the inverse covariance matrix is quickly approximated as the reciprocal of the variances on the diagonal only. At later times t=100, 200, and 300 as shown in the other plots, the off-diagonal elements are populated and converge. The elements in the inverse covariance matrix evolve to track system and environmental changes, collectively referred to as "drift". Higher magnitude values in the matrix correspond to more precise (less noisy) correlated measurements. At later times, as the magnitudes of matrix values increase, the system is capable of detecting FOD with higher sensitivity.

Figure 18:
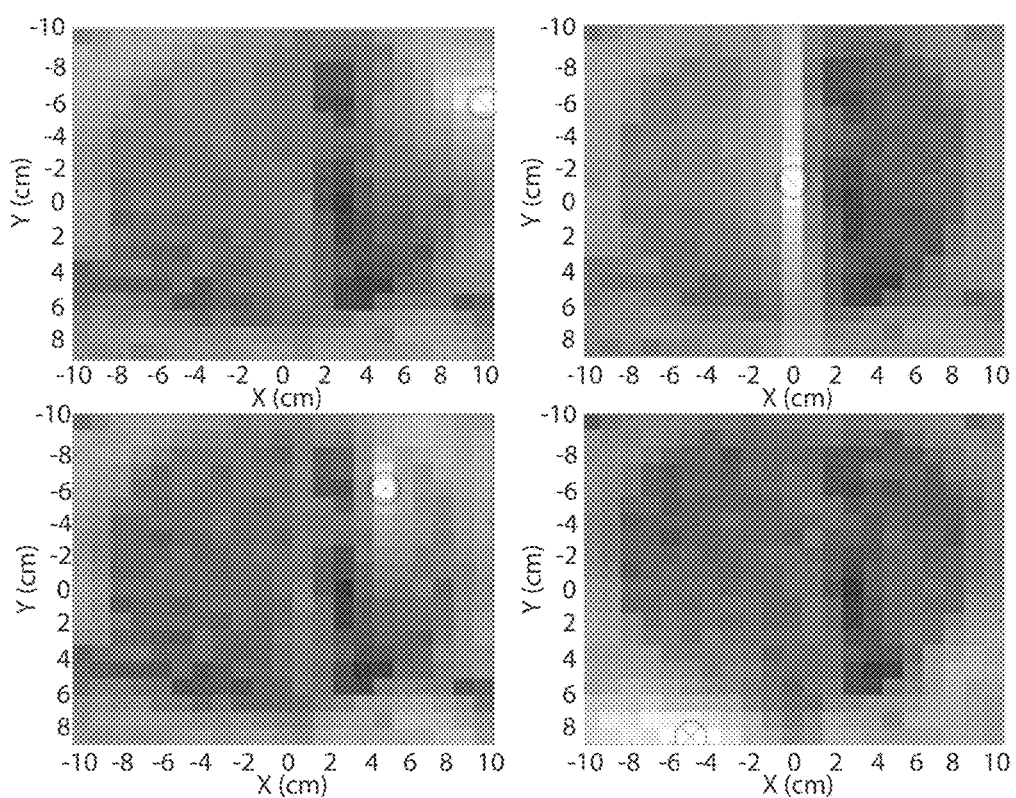
FIG. 18 is a set of plots showing standard deviations of the amplitudes of FOD sensor measurements at different times.

FIG. 18 is a plot showing the standard deviations of the amplitudes of the FOD sensor measurements as a function of time. These were calculated from the square root of the reciprocals of the diagonal elements of the inverse covariance matrix. As is evident from the plot, the initial approximation to the inverse covariance matrix over-estimates the standard deviation for certain sensors, which is useful for preventing false-positive FOD detection at startup. After a number of measurements have been made, the standard deviations converge to accurate approximations, which also indicates convergence of the inverse covariance matrix.

The computation represented by Equation (19) can be implemented efficiently due to the symmetry of the inverse covariance matrix. The numerator $\Sigma_{t-1}^{-1} v_t v_t' \Sigma_{t-1}^{-1}$ involves three matrix multiplications and can be represented as B=Auu' A, where A is symmetric so $A_{ij}=A_{ji}$. Matrix multiplication can be expressed as $C_{ij}=\Sigma_{ik} A_{ij} B_{kj}$ and $(uu')_{ij}=u_i u_j$, and so the elements of matrix B can be calculated as:

$$B_{ij} = \left(\sum_k A_{ik} u_k\right)\left(\sum_l u_l A_{lj}\right) \quad [20]$$

Vectors a and b corresponding to the summation terms above can be defined as follows:

$$a_i = \left(\sum_k A_{ik} u_k\right) \quad [21]$$

$$b_i = \left(\sum_l u_l A_{lj}\right) \quad [22]$$

Due to the symmetry of A, $a_i=b_i$, and so the triple matrix product can be written as:

$$B_{ij}=a_i \cdot b_j = a_i \cdot a_j \quad [23]$$

Thus, the triple matrix product in the numerator of Equation (19) can be implemented very efficiently, keeping the computational load represented by updates to the inverse covariance matrix relatively low.

Also as part of step 412, to account for drift, the system updates principal components basis after the inverse covariance matrix has been updated. As discussed above, conventional eigenvector decomposition routines, such as Power Iteration (for small p/n ratios) or QR Factorization (which takes advantage of the symmetry of the inverse covariance matrix) can be used to derive a new set of principal components.

Such routines can be relatively costly (in time) computationally, however, particularly where the number of FOD sensors is relatively large. Thus, in some embodiments, the PC basis is not updated on every pass through the main execution loop in flow chart 400. Instead, on each pass through the loop, updated principal components can be partially calculated and stored in a temporary memory buffer of the system controller. When enough partial updates have occurred such that a full update to the PC basis is complete, the new basis vectors can be saved and used in subsequent iterations of the main loop, and on the next pass through the loop, a new partial update to the PC basis vectors can be initiated.

Further as part of step 412, the detection threshold ε is updated using an IIR filter in a manner analogous to Equation (3) to account for system drift. This update also allows the detection threshold to track the convergence of the mean vector and the inverse covariance matrix, and the overall reduction of noise in the system, reducing the FOD false-positive detection rate while preserving detection sensitivity to the extent possible.

Vehicle Alignment and Pre-Calibration FOD Detection

For vehicle charging applications, an important consideration is variation of the receiver resonator (mounted on the vehicle) position relative to the source resonator position, which is a simple consequence of the factor that the vehicle will not always be parked in exactly the same position relative to the source resonator. As one example, during both mode 2 and mode 3 operation, the receiver resonator can vary in lateral position (the x- and y-directions) by up to ±10 cm, in height (the z-direction) by up to ±3.5 cm, and in angular rotation by up to ±6 degrees. More generally, a variety of different specifications can be established for the allowable position and orientation variation of the receiver resonator relative to the source resonator.

The electromagnetic environment measured by the FOD sensors as induced voltages and phases, for example, relative to a reference voltage and phase, is strongly dependent on the position of the receiver resonator. As will be discussed in more detail later, the systems disclosed herein can use a "hardware-bucking" scheme such that, for example, 32 voltages and 32 phases are obtained from measuring across matched pairs of FOD sensors. The 64 individual sensor positions, sizes, and pairings are selected so that the field of the source resonator is essentially canceled, and nearly zero signal is measured when the vehicle is absent (i.e., mode 1).

However, with a vehicle present (i.e., mode 2 and mode 3), the field-induced response in the receiver resonator is detected by the FOD sensors; furthermore, because the source and receiver resonators can be strongly coupled, the response measured by the FOD sensors can be extremely sensitive to the vehicle (i.e., receiver resonator) position relative to the source resonator.

Analyzing and tracking the system's calibration state as the receiver resonator position varies is applicable to at least two important scenarios. The first of these is post-parking alignment verification. Before charging can occur, the system state can be checked to ensure the source and receiver resonators are within spatial alignment tolerances by localizing the receiver resonator relative to the source resonator. Localization can also be used to provide guidance signals to a vehicle operator during parking, to ensure that proper alignment is achieved. Real-time localization of the receiver resonator can also be used to provide guidance signals to automated parking systems, allowing the vehicle to guide itself into a spatial alignment with a source resonator that is within tolerances as the vehicle self-parks. These benefits can be achieved by leveraging the existing FOD sensors to detect the receiver resonator position, rather than installing a secondary, vehicle-mounted detection system for this purpose.

The second scenario is performing a pre-calibration FOD detection. As discussed above, before FOD detection occurs in flow chart 400, an initial system calibration is developed. However, before this calibration occurs, it can be advantageous to perform a check to ensure that FOD is not already present in proximity to the system. If it is, contributions from the FOD can conceivably be incorporated into the system calibration, and the FOD may not be detected during execution of the main loop in FIG. 4. Pre-calibration detection of FOD is a challenging problem because the system state changes significantly as the receiver resonator position varies, and the presence of small FOD can yield only a small perturbation to the system state.

To analyze and track the system state as the receiver resonator position varies, the system state can be represented in the eigenbasis (i.e., the PC basis) of the covariance matrix formed over all receiver resonator positions and orientations within an allowed set of parking positions that correspond to the spatial alignment tolerances specified for the system. Specifically, this position covariance matrix is calculated as:

$$\Sigma_{pos} = \sum_{k} (\overline{x}_k - \overline{\mu}_x)(\overline{x}_k - \overline{\mu}_x)^T \quad [24]$$

In Equation (24), $\Sigma_{pos}$ is the position covariance matrix. Vector $\overline{x}_k$ represents the system state (concatenated voltage amplitudes and phases derived from FOD sensor measurements) at a specific, unique location and orientation of the receiver resonator relative to the source resonator, parameterized by k. Vector $\overline{\mu}_x$ is the mean of all measurements over each unique position k. For a 32-sensor array of FOD sensors, the dimensions of both vectors are 64×1, with the first 32 elements corresponding to the voltage amplitudes and the second 32 elements corresponding to the phases measured, for example, using FOD sensors corresponding to hardware-bucked detection coils. The position covariance matrix encapsulates the correlations between every sensor's amplitude and phase as the receiver resonator is located in different positions.

By collecting amplitude and phase measurements at each of the k different relative positions of the receiver resonator, a set of training data is thus obtained and used to calculate the position covariance matrix according to Equation (24). Then, a lower dimensional vector space is formed to represent the system state using two different set of eigenvectors of the position covariance matrix. The two separate basis sets are labeled $\vec{\alpha}$ and $\vec{\beta}$, and they are (in this example) 64×p matrices whose p columns are the eigenvectors of the position covariance matrix in Equation (24) and its inverse, respectively.

The p eigenvectors of the position covariance and inverse position covariance matrices are also recorded in vectors $\lambda^a$ and $\lambda^b$, respectively. The p eigenvectors are selected as those with maximal magnitude eigenvalues of either the position covariance matrix or the inverse position covariance matrix, respectively, sorted in descending order. The number of eigenvectors of the two bases need not be the same.

The system state can be projected into these basis sets (with eigenvectors indexed by p, and individual elements by i) and normalized according to:

$$\vec{a}_p = \frac{1}{\lambda_p^a} \sum_{i=1}^{64} (\overline{x}_i - \overline{\mu}_{x_i}) \cdot \vec{\alpha}_{ip} \quad [25]$$

$$\vec{b}_p = \lambda_p^b \sum_{i=1}^{64} (\overline{x}_i - \overline{\mu}_{x_i}) \cdot \vec{\beta}_{ip} \quad [26]$$

where the 1×p vectors $\vec{a}$ and $\vec{b}$ represent the system state in a lower dimensional projection. Note that the use of 64 elements in Equations (25) and (26) is merely an example.

In essence, $\vec{a}$ represents the system state in a space which varies maximally as a function of receiver resonator position. This space is very sensitive to the location of the receiver resonator, and therefore the projection of the system into that state can be used to very accurately determine the receiver resonator position. Furthermore, variation in the space is a smooth, continuous, and de-noised function of the receiver resonator position, facilitating the determination of position.

The projected system state $\vec{b}$ represents the system state in a space which varies minimally as a function of the receiver resonator position. This is a consequence of the fact that the eigenvectors of the inverse position covariance matrix with maximal eigenvalues are equivalent to the eigenvectors of the position covariance matrix with minimal eigenvalues. The system represented in this space is nearly agnostic to the position of the receiver resonator. Furthermore, the mean subtraction performed in the projection ensures that the projections lie very close to the p-dimensional origin. The introduction of FOD into the electromagnetic environment will generally not share the same correlation structure as moving the receiver resonator over the various training locations, and therefore the projection of the system state when FOD is present will scatter far away from the origin. The presence of FOD can then easily be detected by measuring the magnitude of $\vec{b}$.

To localize the receiver resonator, consider the basis $\vec{\alpha}$ formed from the eigenvectors of maximum magnitude eigenvalues of the position covariance matrix of Equation (24). The training data (i.e., the amplitudes and phases of FOD sensor measurements for the receiver resonator positioned at different locations relative to the source resonator) can be projected into this basis. The projection of the k-th training measurement $\overline{x}_k$ into the basis $\vec{\alpha}$ is defined as $\vec{c}_k$ according to:

$$\vec{c}_k = \lambda_p^a \sum_{i=1}^{64} (\overline{x}_{k_i} - \overline{\mu}_{x_i}) \cdot \vec{\alpha}_{i,p} \quad [27]$$

The set of all $\vec{c}_k$ constructs a p-dimensional surface or manifold in this vector space, which varies smoothly as a function of the receiver resonator position. When a set of FOD sensor measurements $\overline{x}$ is obtained, localization of the receiver resonator can be performed simply by determining which point $c_k$ is closest to the projection of $\overline{x}$ into the basis $\vec{\alpha}$. The projection of $\overline{x}$ can be calculated according to:

$$\vec{a}_p = \frac{1}{\lambda_p^a} \sum_{i=1}^{64} (\overline{x}_i - \overline{\mu}_{x_i}) \cdot \vec{\alpha}_{i,p} \quad [28]$$

Then, the L1-Norm distance from the projection to each manifold point $c_k$ can be calculated as:

$$\delta_k = |\vec{a} - \vec{c}_k| \quad [29]$$

The closest point in the manifold to a is labeled with the index k*, and is given by:

$$k^* = \arg\min_k(\delta_k) \quad [30]$$

Since the location and orientation of the receiver resonator at each training point (and therefore each $\delta_k$) is known, the device position is determined once k* is determined—it is the training position that corresponds most closely with k*.

FIG. 18 shows a set of four plots in which the values of $\delta_k$ are plotted as a function of two-dimensional position for a total offset of ±10 cm in both x- and y-directions. A distinct minimum value occurs in each plot, corresponding to the location of the receiver resonator in each plot. The crosses show the position of k* and the circles show the actual position of the receiver resonator. It has been observed that localization of the receiver resonator to within 1 cm is reproducibly achieved.

To perform the pre-calibration FOD detection, the basis $\vec{\beta}$ is used. This basis was formed of vectors which describe minimal variation even as the receiver resonator is positioned in different locations. In this space, changes in the system state due to the presence of FOD can be identified even in the presence of large system state changes caused by repositioning of the receiver resonator.

The detection of FOD can be achieved by measuring the magnitude of the system state projected into $\vec{\beta}$. The p-dimensional projection of the system state $\bar{x}$ can be calculated as follows:

$$\vec{b}_p = \lambda_p^b \sum_{i=1}^{64} (\bar{x}_i - \bar{\mu}_{x_i}) \cdot \vec{\beta}_{i,p} \quad [31]$$

A normalized FOD detection signal can then be calculated as:

$$f = \frac{|\vec{b}|}{\kappa} \quad [32]$$

with κ chosen so that when f>1, FOD is detected.

Figure 19:
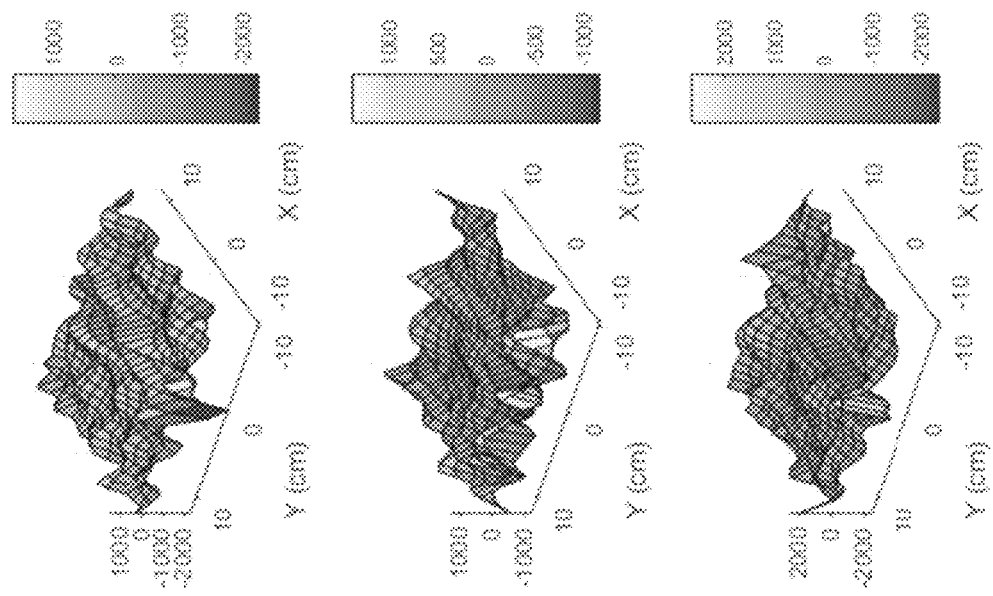
FIG. 19 is a set of plots showing normalized magnitudes of the eigenvectors corresponding to the three lowest-magnitude eigenvalues of a position-covariance matrix.

FIG. 19 is a set of plots showing the normalized magnitudes of the first three elements of $\vec{b}_p$ which is equivalent to the eigenvectors corresponding to the three lowest-magnitude eigenvalues of the position covariance matrix. As shown in the plots, there is no apparent correlation of the projection values as the receiver resonator position varies, facilitating FOD detection in this basis independent of the receiver resonator position.

Figure 20:
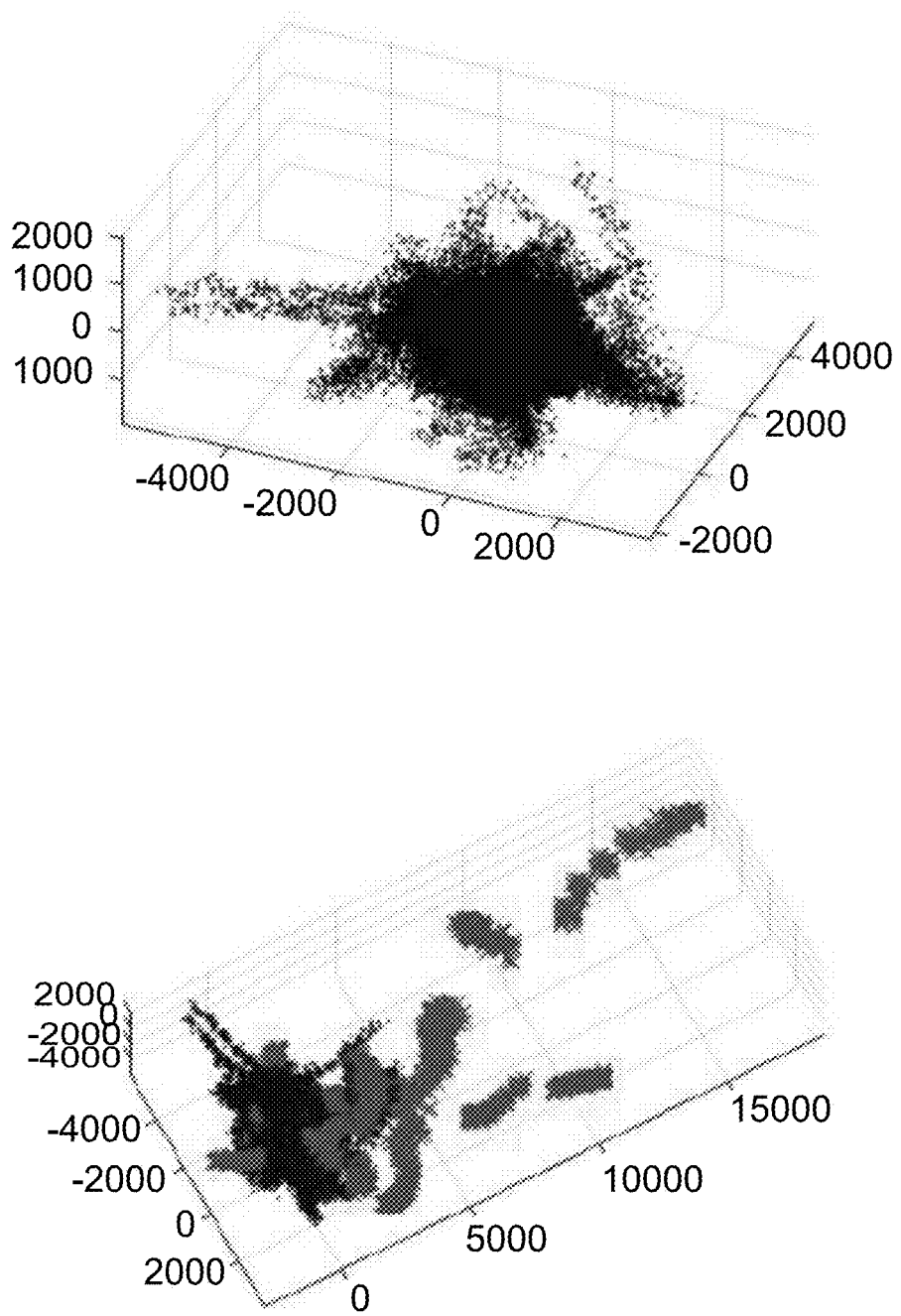
FIG. 20 is a set of plots showing projections of amplitudes and phases of FOD sensor training measurements projected into a reduced basis derived from a position-covariance matrix, and amplitudes and phases of FOD sensor measurements with FOD present projected into the same basis.

The upper plot in FIG. 20 shows a projection of the training amplitudes and phases of the FOD sensor measurements projected into $\vec{\beta}$, as in Equation (31). The lower plot shows the same projections, represented by dots, and also the projections of FOD sensor measurements into the same basis when FOD is present (as crosses). In general, as shown in the lower plot, the projection in the presence of FOD scatters far from the origin, independent of where the receiver resonator is located. Detection of FOD can be performed, for example, by measuring the radius of the projected points; if the radius is small then no FOD is present, but if the radius is larger than a threshold value, then FOD is present.

Figure 21:
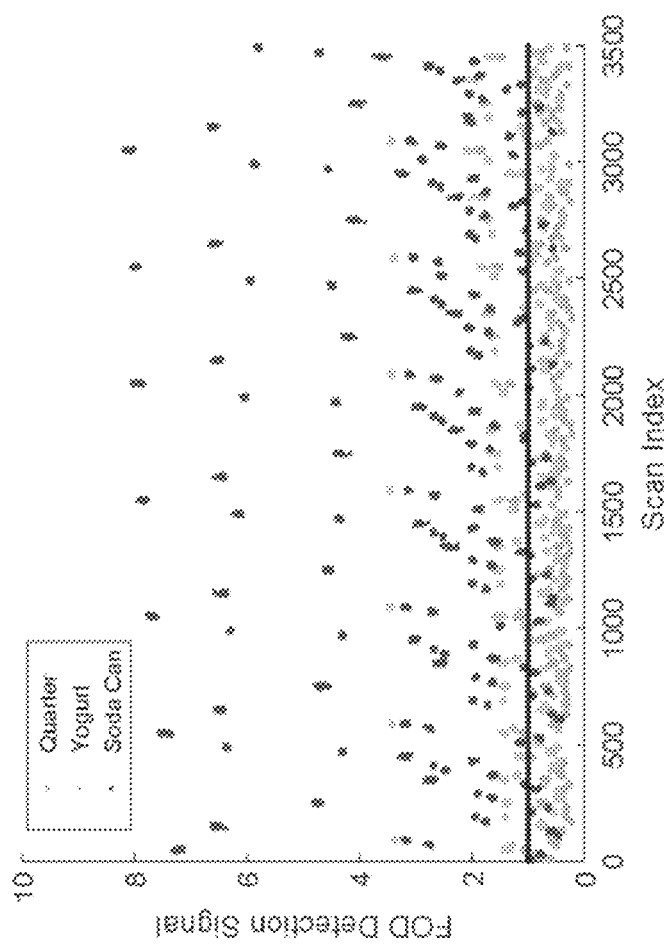
FIG. 21 is a plot showing the FOD detection signal as a function of receiver resonator position for three different FOD objects.

FIG. 21 is a plot showing the FOD detection signal (calculated as in Equation (32) as a function of receiver resonator position for three different FOD objects: a quarter, a yogurt container, and a soda can. The soda can and yogurt container can be readily detected, as can the quarter under certain circumstances.

The detection signal calculated in Equation (32) depends on the choice of a suitable value for κ. To determine κ, the projections $\vec{b}_k$, can be calculated for all training data at positions k (with no FOD present) used to generate the basis. Then, the magnitudes of all of the projections are calculated. The standard deviation σ of the projection magnitudes provides a natural measurement of system noise around the origin in this basis. It has been determined experimentally that a choice of κ=5σ, for example, provides a suitable threshold that maintains a tolerably low FOD false-positive detection rate.

FOD Detection Reporting and Alerts

Returning to FIG. 4, when FOD is detected, the system controller can take a number of actions to report FOD detection and/or modify operation of the wireless energy transfer system. In general, the system controller can issue a warning message and/or generate a warning signal that is displayed/broadcast by a display unit connected to the system. Alternatively, or in addition, the system controller can generate a warning message or signal (e.g., flashing warning lights, audible warning signals) that is transmitted to a vehicle on which the receiver resonator is mounted, so that the user of the vehicle is alerted to the presence of FOD in proximity to the system.

The system controller can also modify operation of the wireless energy transfer system. For example, the controller can reduce the amount of energy that is transferred, or even discontinue energy transfer altogether. The controller can also delay the onset of energy transfer, initiate only low power energy transfer, and/or reconfigure the spatial distribution of the energy transfer field generated by the source resonator to avoid the FOD.

In some embodiments, the various actions depend upon the mode of operation of the system. For example, when the system is operating in mode 1 (vehicle not yet parked), the system controller can transmit a warning message or signal to a user interface to warn the user of the system (who may also be driving the vehicle). The user interface can include, for example, a mobile phone, an in-vehicle interface, and/or a display unit positioned external to the system (e.g., at an entrance to a garage in which the system is located). The user can manually clear the FOD before the vehicle is parked or, alternatively, the system controller can activate a mechanical cleaning apparatus (e.g., such as wipers, a water jet) to eliminate the FOD. Aspects and features of mechanical apparatus for removing FOD are disclosed, for example, in U.S. Patent Application Publication No. 2011/0074346, the entire contents of which are incorporated herein by reference.

In mode 2 (vehicle parked, no energy transfer), in addition to providing any of the foregoing alerts to the user (e.g., flashing lights, audible warning signals, messages), the system controller can prevent wireless energy transfer from occurring until the FOD is no longer present. FOD detection according to FIG. 4 can continue automatically until the FOD is no longer detected, at which point the system controller initiates energy transfer. Alternatively, or in addition, the system controller may require a confirmation signal from the user (by way of a user interface) indicating that the FOD has been cleared.

In mode 3 (vehicle parked, energy transfer occurring), the system controller can reduce or discontinue energy transfer, and/or provide any of the foregoing alerts and messages to system users. Because the user may be away from the system, if the FOD is not cleared, energy transfer may not resume and vehicle charging may not be completed.

In some embodiments, in step 408, the system may incorporate more than one detection threshold to rank the severity of the hazard posed by FOD. For example, the system can have a high detection threshold. When FOD is detected above this threshold, energy transfer may be discontinued immediately, as the danger represented by the FOD is inferred to be high. The system may require manual user intervention before energy transfer can be resumed. In addition to the actions discussed above, the system controller can also optionally take additional actions such as shutting down power to the user's residence to avoid significant damage.

The system can also include a low detection threshold. When FOD is detected against this threshold, there is a high likelihood that FOD is indeed present, but the danger due to FOD may be inferred to be not so extreme that energy transfer is discontinued by the system controller. Instead, the controller may issue any of the warning signals or messages to system users, alerting them that FOD has been detected.

In general, the system can allow for a variety of different user inputs in response to a warning signal or message that FOD has been detected. The system can allow a user to override the FOD detection warning and continue energy transfer. For purposes of calibration, the system can also allow the user to designate FOD detection signals as training data (as discussed in the previous section). Depending upon the nature of the interface through which the user responds, the controller may not allow the user to override the system completely. For example, the system may not allow a user override through a remote interface such as a mobile phone, and may require that a user override instruction be entered only through a local display interface directly connected to the system.

In general, the system controller can also take additional actions, particularly when FOD is detected against a high detection threshold. These can include communicating with/notifying a local fire station, communicating with the electrical distribution system of the user's residence or the building housing the wireless energy transfer system to discontinue the electrical power supply to the wireless energy transfer system, and communication with/activation of a sprinkler system to cool heated FOD and/or eliminate possible fires.

In addition to the alerting/reporting and system modification actions above, when FOD is detected, the system controller can also discontinue the system calibration update in step 412 until the FOD is no longer detected. Thus, following step 408 and optional step 410 in flow chart 400, control passes to decision step 414, skipping step 412. If the system calibration update is not discontinued, the contributions to the FOD sensor measurement signals from the FOD may be incorporated into the calibration, resulting in the system having reduced ability to detect FOD in subsequent cycles. Cycling through the main loop of flow chart 400 continues in this manner until FOD is no longer detected, at which time step 412 is executed again on each pass through the loop.

Anomaly Detection Methods

It should be noted that while the preceding discussion has focused on the detection of FOD in proximity to a wireless energy transfer system, the methods disclosed herein can also be used for detection of a variety of different anomalies and changes to operating conditions, such as changes in energy transfer efficiency, changes in source-resonator coupling, and changes in environmental conditions that are not well correlated with system drift and noise. In general, anomalies that perturb the electromagnetic environment of the system in a manner that is not well correlated with other correlated perturbations (that are incorporated into the system calibration) can be detected using the methods disclosed herein.

FOD Sensors and Detection Systems

The methods disclosed in the preceding sections can generally use measurement signals obtained using a wide variety of different types of FOD sensors to detect FOD in proximity to wireless energy transfer systems. In this section, examples of suitable sensors for use with the previously described methods will be discussed. It should be appreciated, however, that the examples discussed herein are not the only FOD sensors that can be used with the foregoing methods, and are provided merely for illustrative purposes. Additional aspects of FOD sensors and detection systems are disclosed, for example, in commonly-owned U.S. Patent Application Publication No. 2015/0323694, the entire contents of which are incorporated herein by reference.

Simple FOD sensors suitable for use with the methods disclosed herein include loops of conductive material. As shown for example in FIG. 3, FOD sensors are typically positioned within the oscillating magnetic field generated by the source resonator of a wireless power transmitter. The oscillating field induces a voltage (or current) in the conductive loop. The magnitude of the induced voltage is proportional, among other factors, to the flux density passing through the loop, and the phase of the induced voltage is related to the phase of the oscillating magnetic field generated by the source resonator. The voltage signal (or more generally, the measurement signal) generated by the loop is transmitted to the system controller which analyzes the signal to determine its amplitude and phase. These amplitude and phase values can then be used in the FOD detection methods discussed previously. Single FOD sensors consisting of one or more loops of conductive material, and arrays of such sensors, can readily be used to detect FOD in wireless energy transfer systems. In FIG. 3, for example, each of FOD sensors 310 can be implemented as a loop of conducting material. FOD sensors 310 form an array of sensors which can be one-, two-, or three-dimensional with sensors positioned along any of the x-, y-, and z-directions in the spatial region in proximity to source resonator 302 and receiver resonator 304.

Figure 22:
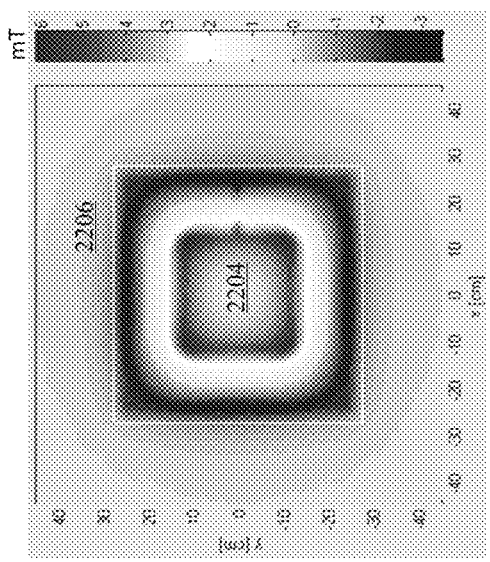
FIG. 22 is a plot showing a magnetic field generated by a source magnetic resonator.

A source resonator having a rounded rectangular resonator coil can produce a magnetic field 2202 that is approximately symmetric about a center of the coil as shown in FIG. 22, where the varying shades of gray correspond to different magnitudes (in the z-direction) of the magnetic field 2202. The field is largest just outside the center the center 2204 of the corresponding resonator coil (i.e., in the dark rectangular ring adjacent to the central region) and decays toward zero in a region 2206 outside of the boundary of the resonator coil.

Figure 23:
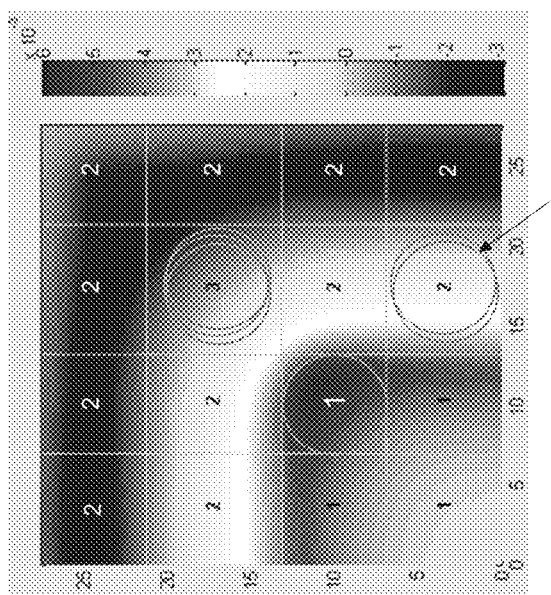
FIG. 23 is a plot showing an enlarged portion of the magnetic field of FIG. 22.

FIG. 23 shows a plot of a quadrant of the magnetic field 2202 of FIG. 22. In FIG. 23, an array of similarly sized FOD sensors 2302 with different number of loops are positioned within the magnetic field. As discussed above, sensors 2302 each develop a voltage proportional to the magnitude of magnetic flux through their loops (and also the flux frequency).

To reduce the dynamic range of magnetic flux through the loops of the sensors, the sensors can include different number of loops. For example, sensors positioned in a high flux region can include a smaller number of loops than sensors positioned in a lower flux region. The numbers superimposed on the sensors 2302 in FIG. 23 indicate the number of loops of conductive material forming each sensor. In the example shown in FIG. 23, 16 sensors are positioned in each quadrant of the magnetic field. Accordingly, the entire FOD sensor array contains at least 64 sensors.

To reduce the measurements and processing load imposed by individually interrogating at least 64 different FOD sensors, the sensors can be coupled to one another in some embodiments. Information derived from coupled sensors can be measured and processed together. For example, if a sensor A is coupled to a sensor B and the information from these sensors is measured together, and a sensor C is coupled to a sensor D and the information from these sensors is measured together, and so on, the reduction achieved in the measurement and processing load can be approximately 50%. Depending upon the manner in which FOD sensors are coupled together, the overall reduction in the number of individual sensor measurements that are analyzed can be between 25% and 75% of the number of measurements that would occur in the absence of sensor coupling. Accordingly, sensor coupling can relax requirements for complex, costly signal processing devices (such as multiplexers) in the system controller, and can increase the rate at which sensor measurements are obtained and analyzed.

Figure 24B:
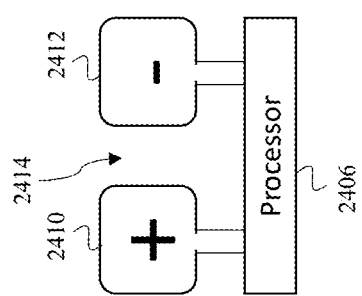
FIGS. 24A and 24B are schematic diagrams of examples of FOD sensors.
Figure 24A:
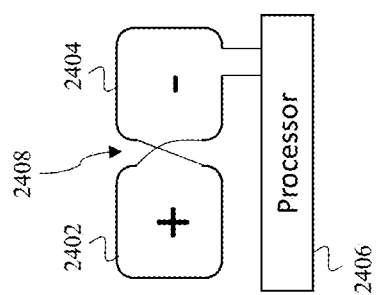

FIG. 24A shows a schematic diagram of an example of a first sensor 2402 coupled to an adjacent second sensor 2404 via routed conductor traces to create a "figure-8" shape. This composite sensor is coupled to a hardware or software processor 2406 (e.g., the system controller). If sensors 2402 and 2404 are positioned over a region of substantially uniform magnetic field, the difference between the magnitudes of voltages developed by the two loops is typically relatively small (e.g., less than about 0.1 V), and in many circumstances, is approximately zero.

When FOD is positioned in proximity to the system, however, the FOD perturbs the portion of the magnetic field that passes through that sensor. The effect of this perturbation is that a larger difference between the magnitudes of the voltages induced in opposite loops of the "figure-8" sensor is observed. Thus, FOD can readily be detected by calculating the difference between the magnitudes of the voltages induced in the loops of the sensor.

However, FOD positioned at the midpoint 2408 of the two loops (at the overlapped conductor traces) may not be detected because the perturbation induced by the FOD can create an approximately equal difference in induced voltages on both sides 2402 and 2404 of the sensor, establishing a "null position" at midpoint 2408 where the figure-8 sensor may not reliably detect FOD.

To address the formation of null positions, the "figure-8" sensor can be implemented by connecting two sensor loops in non-neighboring locations, where substantially similar magnitudes of magnetic flux extend through the two sensor loops. FIG. 24B is a schematic diagram that shows two FOD sensors formed from loops 2410 and 2412 of conductive material, each of which is coupled to a hardware or software processor 2406. In this configuration, the sensor loops 2410 and 2412 are not directly coupled to one another but are coupled to a processor 2406 that inverts the voltage measurements from sensor 2412 compared to sensor 2410 to achieve induced voltages of approximately equal magnitude but opposite sign. In other words, the voltage measurement at sensor 2410 is approximately +V1 while the voltage measurement at sensor 2412 is approximately −V1. Note that there is a region of space 2414 of non-zero dimensions between sensor loops 2410 and 2412.

It should be noted that processor 2406 (and other processors, discussed subsequently, to which sensor loops are coupled) can be a hardware processor (e.g., an integrated circuit or assembly of circuit elements, or a similar hardware-based connection or apparatus) or a software processor (e.g., an electronic processor or microcontroller executing programmed instructions). In general, any device which performs the inversion discussed above can function as a processor in this context.

Figure 25:
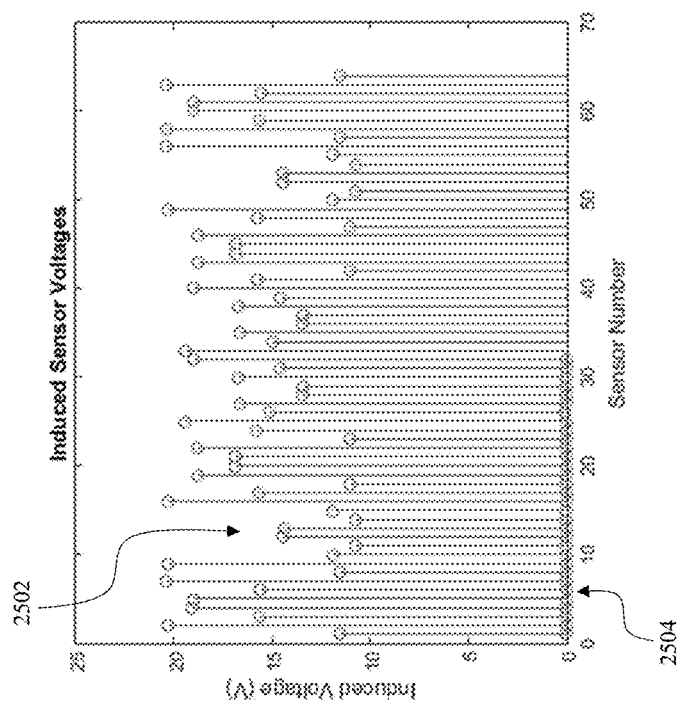
FIG. 25 is a plot showing induced voltage measurements for individual sensor loops and pairs of coupled sensor loops.

FIG. 25 is a plot showing induced voltage measurements for individual sensor loops 2502, and induced voltage measurements for "figure-8" sensor loops 2504. The amplitudes of voltage measurements for the "figure-8" sensor loops 2504 is significantly less than the amplitudes of the voltage measurements for individual sensor loops 2502. As shown in FIG. 25, in some embodiments, voltage measurements for "figure-8" sensor loops can be less than 5 V (e.g., less than 1 V, less than 0.5 V, less than 0.1 V).

Figure 26:
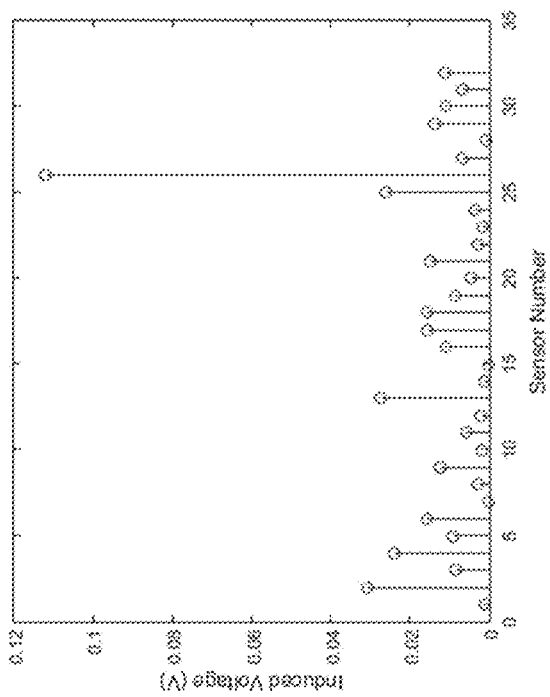
FIG. 26 is a plot showing an expanded view of a portion of the plot of FIG. 25.

An expanded view of the voltage measurements for the figure-8 sensor loops 2504 is shown in the plot of FIG. 26. With one exception, each of the induced voltages is less than 0.04 V.

Figure 27:
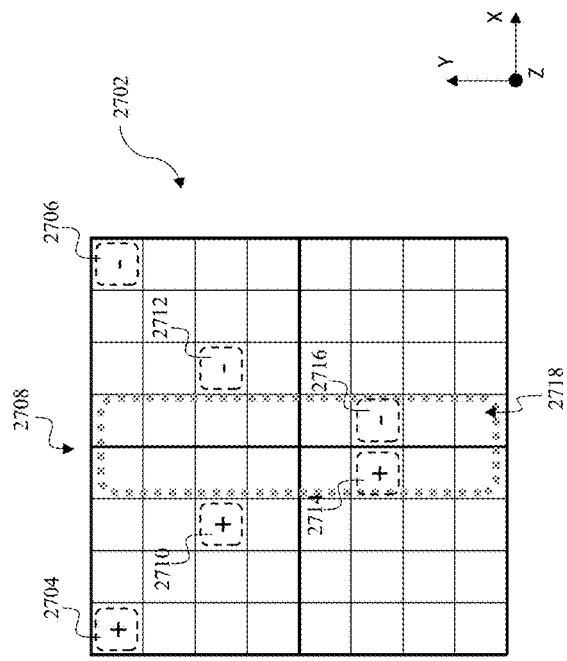

FIG. 27 is a schematic diagram showing an array 2702 of FOD sensors that can be used to measure signals for FOD detection. Sensors 2704 and 2706 are coupled by a processor, as shown in FIG. 24B, and are positioned in regions such that the magnitude of magnetic flux through each sensor is approximately the same. Similar couplings can be realized between sensors at complementary locations on opposite sides of y-axis 2408 of the array 2702. For example, sensors 2710 and 2712 can be coupled to each other and sensors 2714 and 2716 can be coupled to each via a processor.

As explained above, sensors located directly adjacent to y-axis 2708, if coupled, create a null position along the y-axis, making FOD more difficult to detect at that position as explained above in connection with FIG. 24A. Thus, in some embodiments, sensors positioned in region 2718 along the y-axis 2708 can be treated as stand-alone sensors, from which individual amplitude and phase measurements are obtained and processed.

Figure 28:
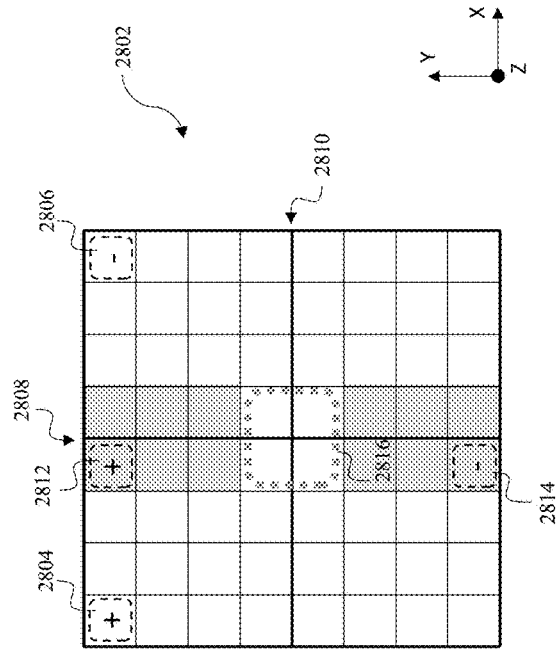
FIGS. 27-31 are schematic diagrams showing examples of arrays of FOD sensors.

FIG. 28 shows a schematic diagram of another array 2802 of FOD sensors. As in FIG. 27, sensor 2804 is coupled to sensor 2806 via a processor. Similarly, sensors in the unshaded regions are coupled to their complementary counterparts on opposite sides of the y-axis 2808.

To avoid creating null detection positions, sensors in the shaded regions are coupled to complementary sensors on the other side of the x-axis 2810. For example, sensor 2812 is coupled to sensor 2814 via a processor (e.g., any of the different types of processors discussed above). Due to their position relative to both the x- and y-axes, sensors positioned within region 2816 at the center of the sensor array can be treated as stand-alone sensors, from which with individual amplitude and phase measurements are obtained and processed.

Figure 29:
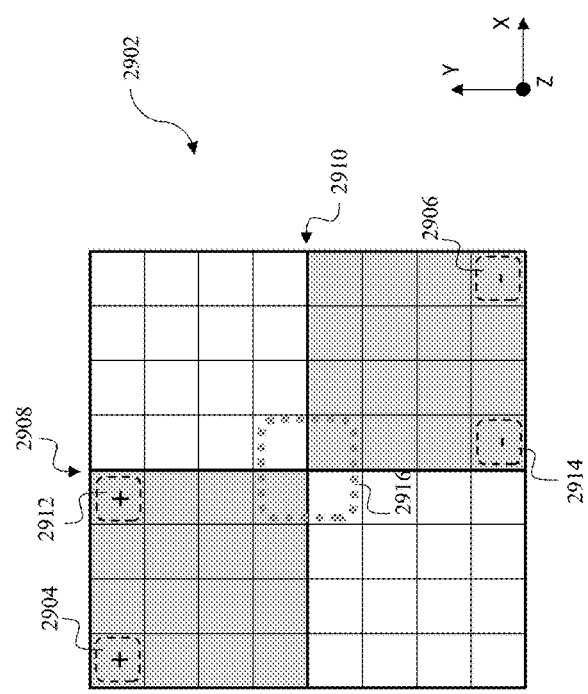

FIG. 29 shows a schematic diagram of another example of a sensor array 2902 for FOD detection. Sensor 2904 is coupled to diagonally located sensor 2906 via a processor. Similarly, other sensors the shaded regions are coupled to their complementary counterparts located at diagonally symmetric positions, and sensors in the unshaded regions are coupled to their complementary counterparts located at diagonally symmetric positions. Sensors in the central region 2916 of the array can be treated as stand-alone sensors, from which with individual amplitude and phase measurements are obtained and processed.

Figure 30:
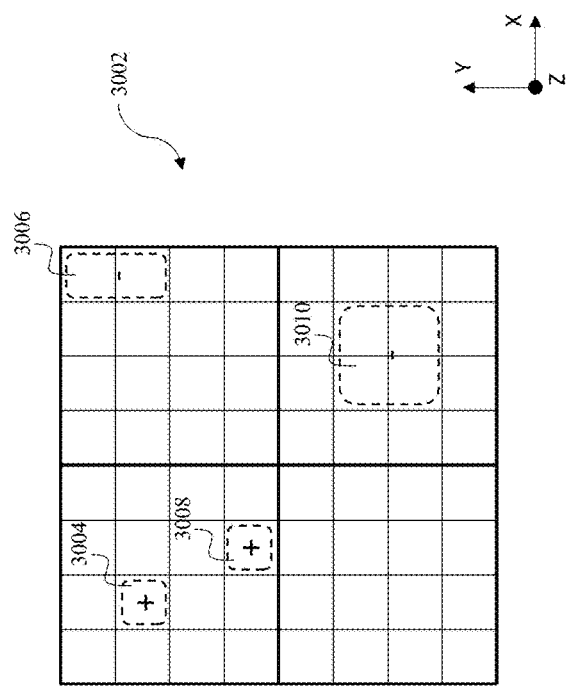

FIG. 30 shows a schematic diagram of yet another example of a sensor array 3002 for FOD detection. Sensor 3004, which generates a voltage of magnitude V1, is coupled to sensor group 3006, which generates a voltage of magnitude V2+V3.

When $V2+V3 \approx V1$, the difference between the magnitudes of the voltages of sensor 3004 and sensor group 3006 are small. Similar couplings between individual sensors and sensor groups, and between two different sensor groups, can be formed, with any number of sensors in the coupled sensor groups, provided that the signal-to-noise ratio of the voltage signals generated by the group is maintained above a reasonable threshold voltage. For example, in some embodiments, sensor 3008 generates a voltage of magnitude V4 and is coupled to a sensor group 3010 that generates a voltage of magnitude $V5+V6+V7+V8 \approx V4$.

Figures 31, 32:
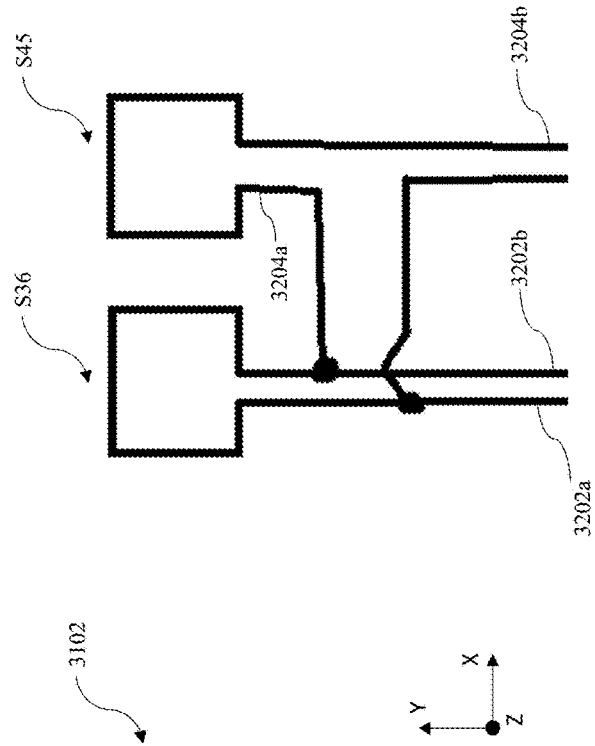
FIG. 32 is a schematic diagram showing FOD sensor loops coupled through a switch.

FIG. 31 is a schematic diagram showing an example of a FOD sensor array 3102 featuring 64 sensors $S_n$, each of which generates a voltage of magnitude $V_n$ when positioned in a magnetic field generated by a source resonator. Table 3 shows an example of couplings between pairs of the 64 sensors that are positioned in regions of similar magnetic flux, and therefore generate voltages of similar magnitude. For example, sensors S1 and S8 are coupled, and the magnitudes of their induced voltages are approximately equal; when subtracted (or added with opposite sign), their voltages cancel to approximately zero.

TABLE 3

Sensor couplings in a 64-sensor array for FOD detection.

| Sensor | Pairwise Coupled Sensor |
|---|---|
| S1 | S8 |
| S2 | S7 |
| S3 | S6 |
| S4 | S13 |
| S5 | S11 |
| S9 | S16 |
| S10 | S15 |
| S12 | S14 |
| S17 | S24 |
| S18 | S23 |
| S19 | S29 |
| S20 | S22 |
| S21 | S28 |
| S25 | S32 |
| S26 | S31 |
| S27 | S30 |
| S33 | S40 |
| S34 | S39 |
| S35 | S38 |
| S36* | S45* |
| S37 | S43 |
| S41 | S48 |
| S42 | S47 |
| S43 | S37 |
| S44 | S46 |
| S49 | S56 |
| S50 | S55 |
| S51 | S53 |
| S52 | S54 |
| S57 | S64 |
| S58 | S63 |
| S59 | S61 |
| S60 | S62 |

In the coupling scheme shown in Table 3, sensor S36 is used as a reference sensor to provide a reference signal for the other sensor measurements. Thus, the amplitude and phase of the induced voltage in S36 is processed and analyzed without any coupling. As a result, sensor S45 is unpaired, and individual amplitude and phase measurements are obtained and processed from sensor S45.

In some embodiments, sensors S36 and S45 can be coupled to allow measurement of the coupled amplitude and phase of these two sensors, while at the same time allowing sensor S36 to still be used as a reference sensor. FIG. 32 shows a schematic diagram of sensors S36 and S45 (implemented as loops of conductive material). Sensor S36 has first and second terminals 3202a and 3202b, respectively, and sensor S45 has first and second terminals 3204a and 3204b, respectively. Terminals 3202b and 3204a are directly connected, while terminal 3404b is not connected to any of the other terminals.

The system controller can use sensors S36 and S45 to measure both reference electrical signals and FOD sensor signals. In particular, by measuring the electrical signal between terminals 3202a and 3202b, the controller obtains an electrical signal with contributions from only sensor S36, i.e., a reference electrical signal. By measuring the electrical signal between terminals 3202a and 3402b, the controller obtains an electrical signal with contributions from both sensors S36 and S45, i.e., a FOD measurement signal. The amplitude and phase of both types of signals can be obtained by the controller.

As discussed in connection with other sensors above, when the magnetic flux through sensors S36 and S45 is approximately the same, the difference between their induced voltage magnitudes is approximately zero. In the presence of FOD perturbing the flux through one of the two sensors, however, their induced voltage magnitudes no longer cancel, and the difference between the voltage signals of coupled sensors S36 and S45 allows for sensitive FOD detection.

In general, FOD sensors with any number of loops can be used individually and in sensor arrays to provide FOD measurement signals. For example, FOD sensors with one or more loops (e.g., two or more loops, three or more loops, four or more loops, six or more loops, eight or more loops, ten or more loops) can be used. Sensor arrays can include combinations of FOD sensors with different numbers of loops. Within the arrays, sensors can be evenly or differently spaced, and can have the same or different cross-sectional areas, depending upon factors such as the geometry of the source resonator and the nature of the FOD detection to be performed. Individual sensors within arrays can be spaced from other sensors in any of the x-, y-, and z-directions.

Further, arrays with any number of sensors can be used for FOD detection. Although certain examples discussed herein refer to arrays of 16, 32, and/or 64 sensors, more generally, the methods disclosed herein can be applied to any number of FOD sensors. In addition, the FOD sensors can be organized into any number of arrays, with the same or different numbers of sensors in different arrays.

In some embodiments—particularly where the source resonator is not actively transferring power to the vehicle—methods that do not rely on an active source resonator can be used to detect the presence of FOD. Such methods can be particularly useful, for example, in modes 1 and 2 of the operation of the wireless power transfer system.

Figure 33:
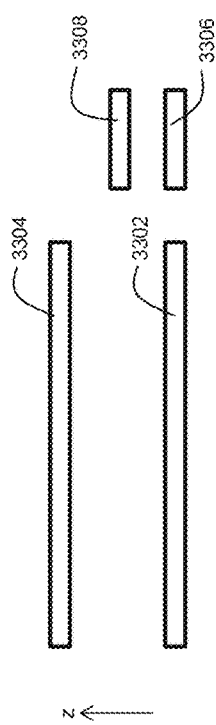
FIG. 33 is a schematic diagram showing a wireless energy transfer system that includes an auxiliary coil.

In certain embodiments, an auxiliary coil can be used to generate a magnetic field which induces a voltage in a detector array. When FOD is introduced, the FOD perturbs the induced voltage in the detector array; these perturbations are measured by the system to detect the presence of the FOD. FIG. 33 shows a receiver resonator 3304 positioned in proximity to a source resonator 3302. An auxiliary coil 3306 is positioned adjacent to source resonator 3302 and can be connected to the same controller as source resonator 3302 (not shown in FIG. 33). Auxiliary coil 3306 generates a magnetic field which induces a voltage in detector array 3308. Based on the signals generated by detector array 3308, the system can determine whether FOD is present in the vicinity of the system using the methods discussed herein.

An important advantage that arises from using an auxiliary coil is that the frequency of the magnetic field generated by the auxiliary coil can differ from the frequency of the field generated by source resonator 3302. By using a measurement frequency that is different from the frequency at which power is transferred from source resonator 3302 to receiver resonator 3304, contributions to the measurement signal that might otherwise arise from dynamic variations during power transfer are eliminated. Moreover, perturbations to the sensor signals due to currents induced in the source resonator or receiver resonator are eliminated if the power transfer and measurement frequencies are sufficiently different from one another. As an example, if power is transferred between source resonator 3302 and receiver resonator 3304 at a frequency of 85 kHz or 145 kHz, auxiliary source 3306 can generate a measurement magnetic field at a significantly higher frequency, such as 6.78 MHz, and/or at a significantly lower frequency, such as 21 kHz or less.

Using a different frequency for FOD detection can be an advantage due to the significant difference in magnetic flux during active power transfer and when power transfer is inactive (and the only field present is used for FOD detection). Using a lower frequency field in the latter scenario allows for frequency dependent passive filtering and/or active amplification to reduce the dynamic range of voltages in the FOD sensors that would otherwise occur.

In some embodiments, to further ensure that magnetic fields generated by the auxiliary coil 3306 and the induced voltages in detector array 3308 do not perturb source resonator 3302, the fields generated by source resonator 3302 and auxiliary coil 3306 can have different phases. For example, in some embodiments, the phases of the fields can differ by 30 degrees or more (e.g., 60 degrees or more, 90 degrees or more, 120 degrees or more, 150 degrees or more, 180 degrees or more).

In certain embodiments, an auxiliary amplifier can be coupled in to the source resonator to generate magnetic fields for detection of FOD when the source resonator is not being used to transfer power to the receiver resonator. Using the source resonator (e.g., the coil of source resonator 3302 in FIG. 33) to generate the measurement magnetic field can have a number of advantages. For example, the same detector array can be used for FOD sensing in modes 1, 2, and 3.

When coupling an auxiliary amplifier into the existing source resonator, two significant outcomes should be avoided. First, the auxiliary amplifier should be prevented from back-driving the power amplifier that normally drives the source resonator to generate magnetic fields for wireless power transfer. Second, the auxiliary amplifier should be prevented from inducing currents in the receiver resonator mounted on the vehicle.

In general, using a relay to disconnect the source's power amplifier can introduce unacceptable power losses into a wireless power transfer system. Thus, it can be preferable to introduce the auxiliary amplifier in a manner that does not require decoupling of the power amplifier. Accordingly, in some embodiments, the auxiliary amplifier is positioned after inductor $L_3$ and capacitor $C_3$ in the source impedance matching network, and a switchable tank is used across $L_3$ to avoid back-driving the source's power amplifier.

Figure 34:
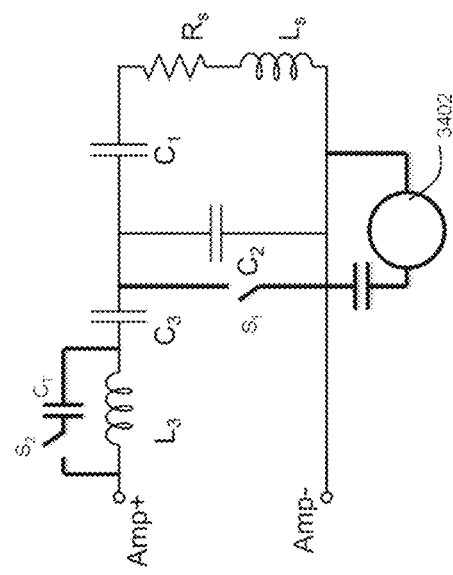
FIG. 34 is a schematic circuit diagram of a portion of wireless energy transfer system that includes a switchable auxiliary amplifier.

FIG. 34 shows a schematic circuit diagram of one embodiment of a wireless power transfer system with a switchable auxiliary amplifier 3402. During wireless power transfer to a receiver resonator, switches $S_1$ and $S_2$ are open, so that auxiliary amplifier 3402 is decoupled from the system. The system's power amplifier drives coil $L_S$, which generates the magnetic field for wireless power transfer.

To detect FOD, auxiliary amplifier 3402 is coupled into the system by closing switch $S_1$. At the same time, switch $S_2$ is also closed, creating a blocking tank circuit using capacitor $C_T$. The blocking tank circuit prevents auxiliary amplifier 3402 from driving the system's power amplifier. Instead, auxiliary amplifier 3402 drives coil $L_S$, which generates a measurement magnetic field for detecting FOD. To ensure that the measurement field does not induce a current in the vehicle resonator, auxiliary amplifier 3402 drives coil $L_S$ at a frequency that differs substantially from the power transfer frequency, as discussed above. In certain embodiments, the frequency at which auxiliary amplifier 3402 drives coil $L_S$ can be selected to minimize the current induced in the receiver resonator.

In some embodiments, the source's impedance matching network does not include an inductor $L_3$. In such embodiments, a blocking tank circuit can be implemented by introducing a switchable inductor $L_T$ across capacitor $C_3$, in a manner analogous to the introduction of switchable capacitor $C_T$ in FIG. 34.

In certain embodiments, FOD detection can be performed by measuring inductance changes in one or more detectors. As discussed above, the FOD sensors disclosed herein typically include one or more loops of conductive material. The presence of metallic FOD near the sensor can affect the inductance of the FOD sensor loop since it can affect the magnetic fields produced by currents flowing in the sensor loop. Accordingly, measurement of the inductance of the FOD sensors can be used to detect the presence of FOD in proximity to the wireless energy transfer system.

Figure 35:
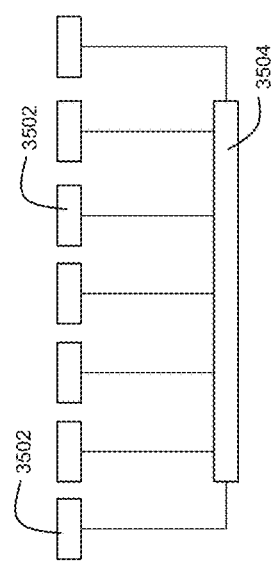
FIG. 35 is a schematic diagram showing an array of FOD sensors.

FIG. 35 is a schematic diagram showing an array of FOD sensors 3502 connected to an inductance-measuring controller 3504 (e.g., as part of the system controller). In general, detectors 3502 are positioned between or around the source resonator and receiver resonator of a wireless energy transfer system. To obtain FOD sensor measurements, controller 3504 measures the inductance of each of detectors 3502. FOD can then detected based on changes or deviations of the inductance measurements from an initial system calibration, as discussed above. Suitable controllers for measuring changes in the inductance of detectors 3502 include, for example, the LDC1000 controller, available from Texas Instruments (Dallas, Tex.).

In systems that measure changes in inductance of sensors, as shown for example in FIG. 35, each sensor functions as a resonant LC circuit. Accordingly, where the sensors are integrated onto a sensor PCB (see the discussion of FIGS. 36A and 36B below), the PCB consists of an array of coupled resonators. When FOD perturbs the inductance of a particular sensor (i.e., resonator) in the array, nearby sensors (i.e., resonators) are also affected due to their mutual coupling. Thus, measured changes in inductance and/or resistance of a particular sensor are affected not only by FOD positioned close to the sensor, but also by FOD positioned close to neighboring sensors. This "amplification" or "distribution" effect resulting from resonant coupling between sensors in an array can significantly improve the overall array's sensitivity to FOD, thereby increasing the accuracy with which FOD can be detected.

It should be understood that the FOD sensors disclosed herein can each be used in various modes of operation of wireless energy transfer systems. For example, magnetic field sensing, i.e., detecting perturbations in the induced voltage of FOD sensors arising from the magnetic field generated by the source resonator can be used in all three modes of operation, and is particularly useful in the third mode of operation in which the power is actively being transferred from the source to the receiver resonator. FOD detection via an auxiliary coil can be used for all three modes of operation, and is particularly useful for modes 1 and 2, where magnetic fields are not actively being generated by the source resonator. Similarly, inductance measurements for FOD detection can be used in all three modes of operation, and are particularly useful in modes 1 and 2 when the source resonator is not actively generating magnetic fields. Wireless power transfer sources that include a switchable auxiliary amplifier, as shown in FIG. 34, typically use the auxiliary amplifier to generate measurement magnetic fields in modes 1 and 2 of system operation, and detect FOD using any of the other methods described herein when the system operates in mode 3.

Figure 36A:
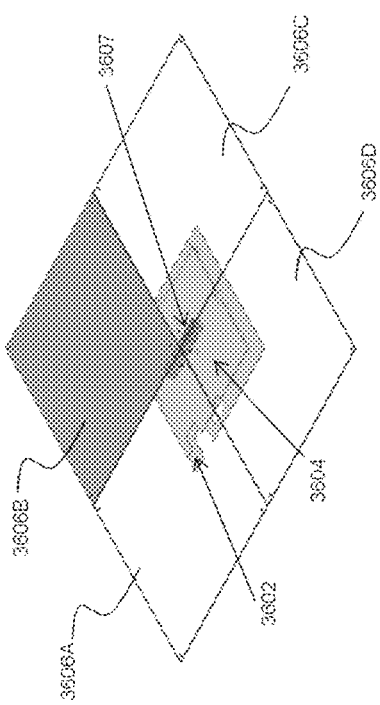
FIGS. 36A and 36B are schematic diagrams showing examples of FOD sensor systems.

FIG. 36A shows an exemplary embodiment of a FOD sensor system. In some embodiments, the FOD detection sensor board may be made of several circuit boards 3606A-D. This may be beneficial for mechanical assembly with the interchange board 3604 and electronics board 3602. Furthermore, by breaking up the FOD detection sensor board into several boards, costs may be reduced. For example, one large printed circuit board may be more costly than four smaller printed circuit boards. Interchange board 3604 provides connectors 3607 such that signals from the FOD detection sensor boards 3606A-D have a path to the electronics board 3602. The electronics board 3602 may include power and control circuitry, communication, and signal processing capability.

Figure 36B:
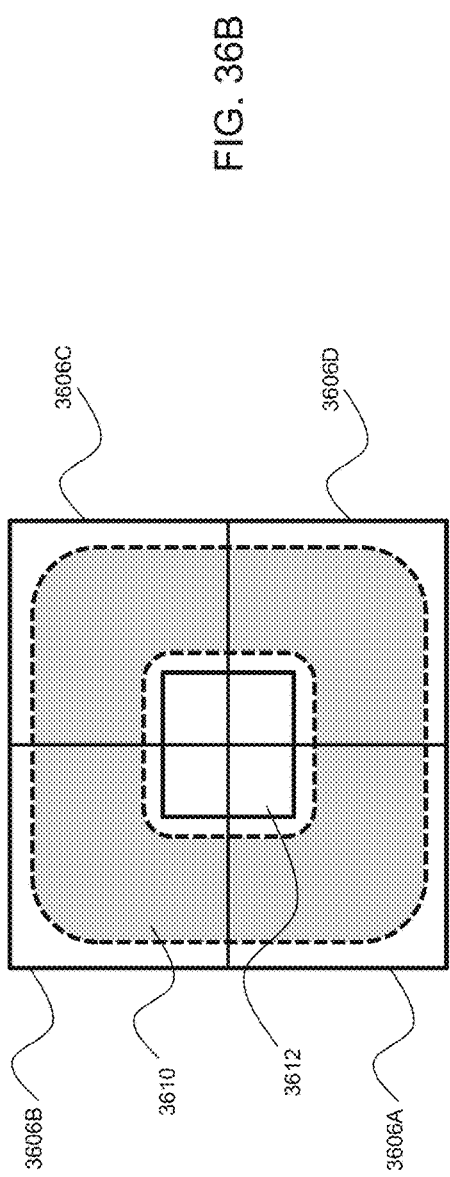

FIG. 36B shows a top-view of an exemplary embodiment of a FOD sensor system. In certain embodiments, the interchange board 3604 and electronics board 3602 may be sized and or shaped to fit into the space 3612 in the middle of the source resonator coil 3610. The FOD detection sensor boards 3606A-D may then be connected above the source resonator 3610 to the interchange board 3604 and electronics board 3602 in the middle of the source resonator 3610. In some embodiments, shielding may be used on or around the interchange board 3604 and the electronics board 3602 to reduce losses in the magnetic field used to transfer power. Shielding can be formed from copper, aluminum, magnetic material, and similar materials.

As discussed above, in some embodiments, an auxiliary coil can be used to provide an auxiliary magnetic field for the FOD sensors at times when the source resonator coil is not providing a magnetic field. This allows the FOD sensors to function during times when the source resonator is not transferring power to a receiver resonator on the vehicle, such as when the vehicle is not present or before the charging operation begins. In certain embodiments, an auxiliary field can be beneficial when the source is providing low power.

Figure 37B:
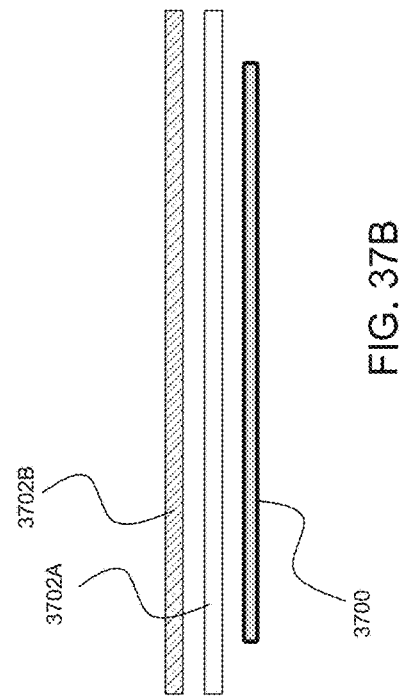
FIGS. 37A and 37B are schematic diagrams showing examples of a source resonator coil.
Figure 37A:
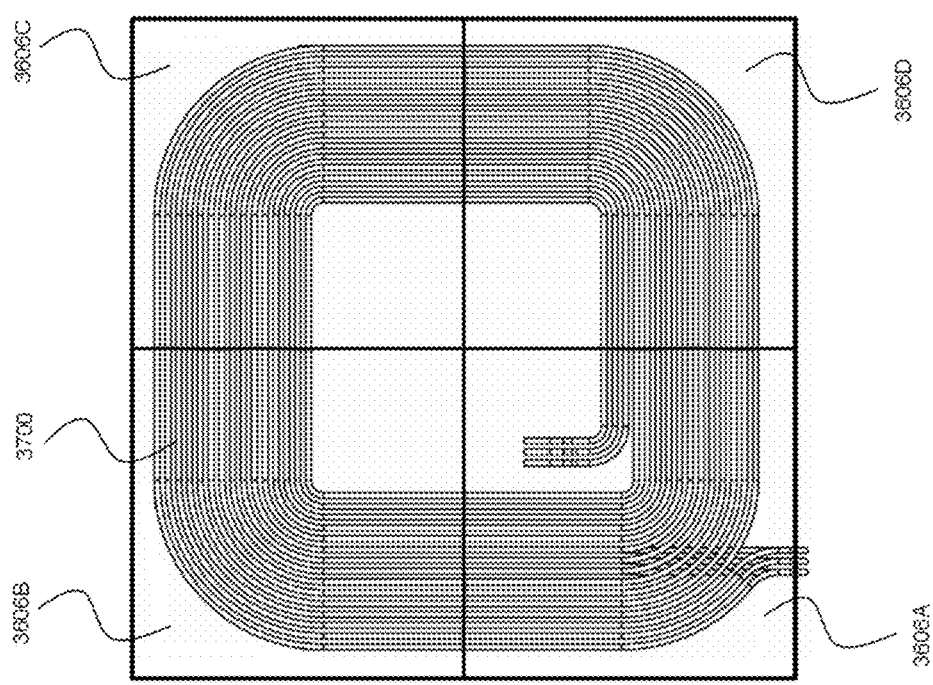

FIG. 37A shows a top-view of an embodiment of a source resonator coil 3700 and circuit board(s) 3606A-D that are positioned above the source resonator coil 3700. The circuit board(s) 3606A-D can include the FOD sensors and one or more auxiliary coils. FIG. 37B shows a side-view of an embodiment of a source resonator coil 3700, a first circuit board 3702A, and a second circuit board 3702B. The auxiliary coil can be printed or wound on the first circuit board 3702A and the FOD sensors can be printed or wound on the second circuit board 3702B. Alternatively, the auxiliary coil can be printed or wound on the second circuit board 3702B and the FOD sensors can be printed or wound on the first circuit board 3702A. It may be advantageous for the FOD sensors to be printed or wound on the second circuit board 3702B so that they are closer to foreign objects likely to be positioned near the top surface of the second circuit board. In some embodiments, the sensors and auxiliary coil 3702A and 3702B can occupy different layers of a printed circuit board (PCB). A printed circuit board can provide reproducibility in the manufacturing process of an auxiliary coil.

In certain embodiments, the sensor board(s) may be physically separate from the auxiliary coil board(s). The auxiliary coil can generally be formed from a wound conductor such as solid-core copper, copper-clad aluminum, Litz wire, and similar materials. The auxiliary coil can be made from a wound conductor that is adhered to a surface of a printed circuit board having the FOD sensors. In exemplary embodiments, it can be beneficial to ensure that the traces of the FOD sensors and the auxiliary coil are not directly on top of one another. If the traces of FOD sensors and the auxiliary coil are directly on top of one another, the auxiliary coil may strongly couple to the FOD sensor(s) and can induce a greater voltage on the sensors than expected.

In certain embodiments, it can be advantageous for the auxiliary coil to induce voltages on each FOD sensor on the sensor board(s) 3606A-D similar to that which is produced by a source resonator coil. This allows the FOD sensor board to expect and be calibrated to a similar "dynamic range" of voltages on its sensors without the source generating a magnetic field. In certain embodiments, it can be advantageous for the auxiliary coil to induce a smaller dynamic range of voltages on the FOD sensor board because sensor signals can be closer in magnitude to one another. In some embodiments, an auxiliary coil can be driven by a linear amplifier, such as the LM675 (Texas Instruments, Dallas, Tex.). A linear amplifier can be beneficial in driving an auxiliary coil due to lower cost and/or less harmonic content produced. Less harmonic content in the driving signal reduces noise in the system.

In some embodiments, an auxiliary coil can be driven at the same frequency that the source resonator is driven. For example, a source resonator and an auxiliary coil can each be driven at approximately 85 kHz (within ±5 kHz, ±10 kHz, or more). This may provide greater signal strength on the FOD sensors. In certain embodiments, a higher driving frequency for the auxiliary coil can induce a larger signal as compared to a lower frequency signal. This is because the induced voltage on the FOD sensors is directly proportional to driving frequency, magnetic field, and area of the auxiliary coil. Driving the auxiliary coil at the same frequency as the source can cause the auxiliary coil to induce currents in the source resonator coil and/or the receiver resonator coil.

This effect can occur even at higher frequencies than the source resonator's resonant frequency. For example, for an auxiliary coil frequency above the resonant frequency of the source resonator coil ($\omega_{aux} \gg \omega_{source}$), the induced current $I_{source}$ in the source resonator coil is approximately:

$$I_{source} = \frac{j\omega_{aux} M I_{aux}}{j\omega_{aux} L_{source}\left(1 - \frac{\omega_{source}^2}{\omega_{aux}^2}\right) + R_{source}} \approx k\sqrt{\frac{L_{aux}}{L_{source}}} I_{aux}$$

where M is mutual inductance, $I_{aux}$ is the current in the auxiliary coil, $L_{source}$ is the inductance of the source resonator coil, $R_{source}$ is the resistance in the source resonator, k is the coupling factor, and $L_{aux}$ is the inductance of the auxiliary coil. However, due to the proximity and shape of possible auxiliary coils, the coupling factor k between the source resonator and auxiliary coils can be large. Thus, the induced current $I_{source}$ can be large independent of the frequency. A similar approximation can be made for the induced current in the device resonator coil.

Alternatively, the auxiliary coil can be driven at a frequency lower than the source resonator frequency $\omega_{source} \gg \omega_{aux}$). In this case, the induced current $I_{source}$ in the source resonator coil is approximately:

$$I_{source} \approx \frac{j\omega_{aux} MI_{aux}}{-j\omega_{aux} L_{source} \frac{\omega_{source}^2}{\omega_{aux}^2}} = \frac{\omega_{aux}^2}{\omega_{source}^2} k \sqrt{\frac{L_{aux}}{L_{source}}} I_{aux}$$

For $$\frac{\omega_{aux}^2}{\omega_{source}^2} \ll 1$$

such as when auxiliary coil frequency is lower than the source resonator coil), the induced current $I_{source}$ can be small. In some embodiments, one effect of using a lower auxiliary coil frequency can be that the amplitude of FOD sensor signals can be lower. When the FOD sensor signals are lower, the signal-to-noise ratio (SNR) of the FOD sensors may be worsened, and FOD detection may be compromised to some extent. In certain embodiments, for a source resonator driven at approximately 85 kHz (within ±5 kHz, ±10 kHz, or more), an auxiliary coil can be driven below approximately 85 kHz (within ±5 kHz, ±10 kHz, or more), such as approximately 50 kHz, 30 kHz, or lower.

FIG. 38A shows a top view of an embodiment of an auxiliary coil 5902 for use in FOD detection. The auxiliary coil 3802 is shown as part of one or more circuit boards 3804A-D. In some embodiments, the auxiliary coil 3802 can be wound to approximately follow the windings of a source resonator coil. An advantage to closely following the windings of a source resonator coil is that the auxiliary coil will approximate the strength and phase of the magnetic field from the source resonator coil when the source resonator is turned off. Another advantage of the auxiliary coil closely following the windings of a source resonator coil is that the dynamic range of voltages induced on the FOD sensors by the magnetic field of the auxiliary coil is similar to that induced by the magnetic field of the source resonator.

In the embodiment shown in FIG. 38A, the auxiliary coil 3802 includes four sets of coils (each having approximately four turns), each on a petal 3804A-D made of PCB substrate. Each set of coils have return traces, e.g., traces 3806 and 3808, connected in the center 3810 to an interchange 3804 and/or electronics board 3802. Either of these boards can include driving electronics (including the amplifier) for the auxiliary coil 3802.

FIG. 38B shows a model of the effective coil having accounted for cancelling magnetic fields of the auxiliary coil boards shown in FIG. 38A. For example, the magnetic field produced at the return traces at 3806 and 3808 will cancel and the effective shape of the coil can be similar to the four loops in coil 3812. The terminals 3814 of each of the loops can be connected such that the loops are in series with one another.

FIG. 38C shows a model of a portion 3816 of the source resonator coil and a portion 3818 of the auxiliary coil 3802.

As discussed above, the auxiliary coil 3802 follows the traces of the source resonator coil. In some embodiments, the traces 3818 of the auxiliary coil may be evenly distributed over the traces 3816 of the source resonator coil such that the auxiliary field is of a similar shape to that of the source resonator.

Figure 38D:
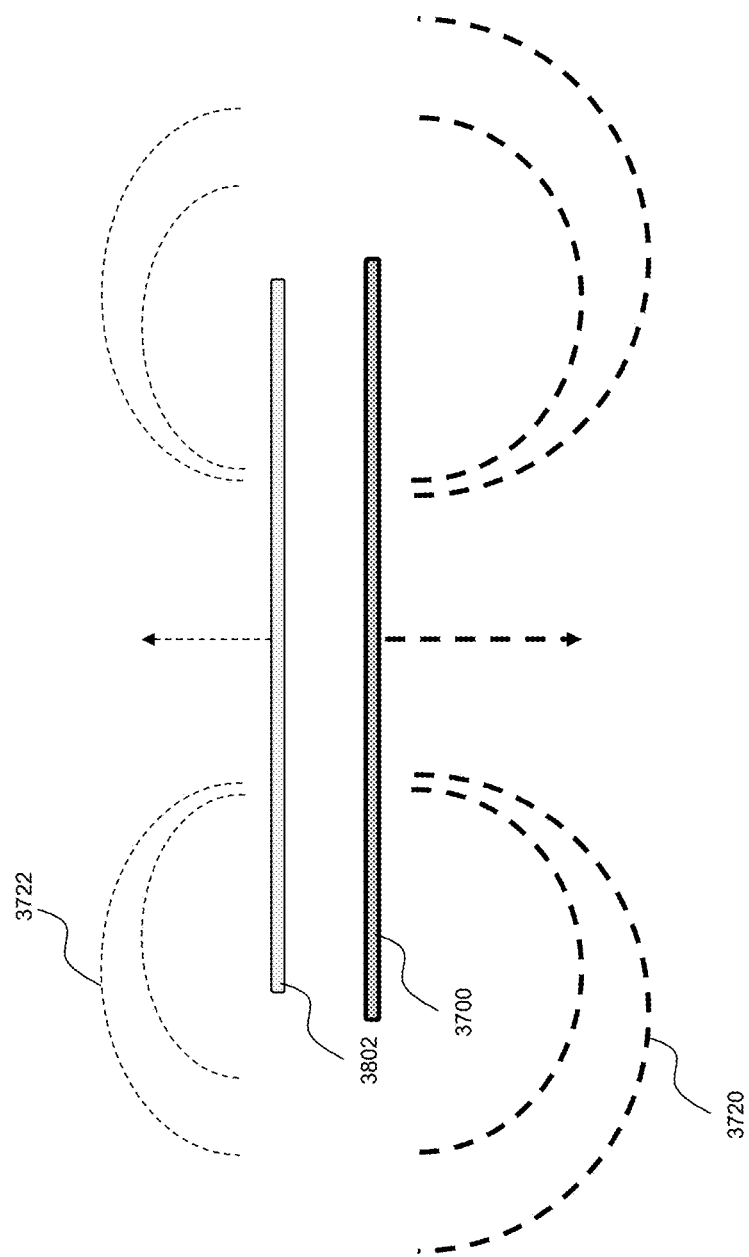
FIG. 38D is a schematic diagram showing an auxiliary coil and a source resonator.

FIG. 38D shows a side-view of an exemplary embodiment of auxiliary coil 3802 and source resonator coil 3700. The current in the auxiliary coil 3802 can have an amplitude of approximately 500 mA and the induced current in the source resonator coil 3700 can have an amplitude of approximately 3 A. This results in a stronger magnetic field 3720 produced by the source resonator coil 3700 as compared to the auxiliary field 3722 produced by the auxiliary coil 3802. Note that the source resonator coil is not being driven at the same time; the stronger magnetic field 3920 is due to the induced currents in the source resonator coil. The net magnetic field, after taking into account the field cancellation between the two magnetic fields, results in a useful magnetic field for the FOD sensors. Utilizing such a field allows for a similar dynamic range of voltages on the FOD sensors as the range of voltages that occurs when the source resonator's magnetic field is used.

FIG. 39A shows a schematic diagram of an embodiment of an auxiliary coil 3902 for use in FOD detection. The auxiliary coil is printed or wound on four circuit boards 3904A-D. Each of the circuit boards has an outer loop 3906 of wire and an inner loop 3908 of wire. Much of the magnetic field produced at the traces on the inner edges of the circuit board, such as at 3910 and 3912, is cancelled.

The effective coil results in the model shown schematically in FIG. 39B. The smaller outer loops 3906A-D form a larger outer loop 3916 and the smaller inner loops 3908A-D form a larger inner loop 3918. An advantage to having a larger effective inner loop 3918 is that it can compensate for the weaker magnetic field in the center of the outer loop 3916. Another advantage of this configuration is that it utilizes a lower amount of conductive material (e.g., copper), lowering the weight of the auxiliary coil as well as the cost. Each of these sets of loops is connected electrically in series near the center 3914 and may be coupled to the interchange and/or electronics boards. In some embodiments, the auxiliary coil 3902 can be driven at approximately 30 kHz by a linear amplifier on at least one of the interchange and/or electronics boards.

FIG. 40 shows a schematic diagram of example auxiliary coils for use in FOD detection. The auxiliary coils 4002A-D are printed or wound on circuit boards 4004A-D. Each of the auxiliary coils 4002A-D is driven by an independent amplifier, resulting in four amplifiers for the four auxiliary coils. An advantage of this configuration is that the magnetic field does not cancel at the inner traces, such as at 4008 and 4010. Another advantage to using multiple auxiliary coils is that they will couple less to the source and receiver resonators, allowing the effectiveness of the auxiliary coils to be independent of the position of the receiver resonator. In some embodiments, the auxiliary coils 4002A-D can be connected to an independent amplifier on at least one of the interchange and/or electronics boards. The auxiliary coils can be driven at approximately 30 kHz by the multiple linear amplifiers. In certain embodiments, the auxiliary coils 4002A-D can be driven by less than four amplifiers. For example, a single amplifier can be used with switches (such as relays) to couple to the four auxiliary coils.

Figure 41:
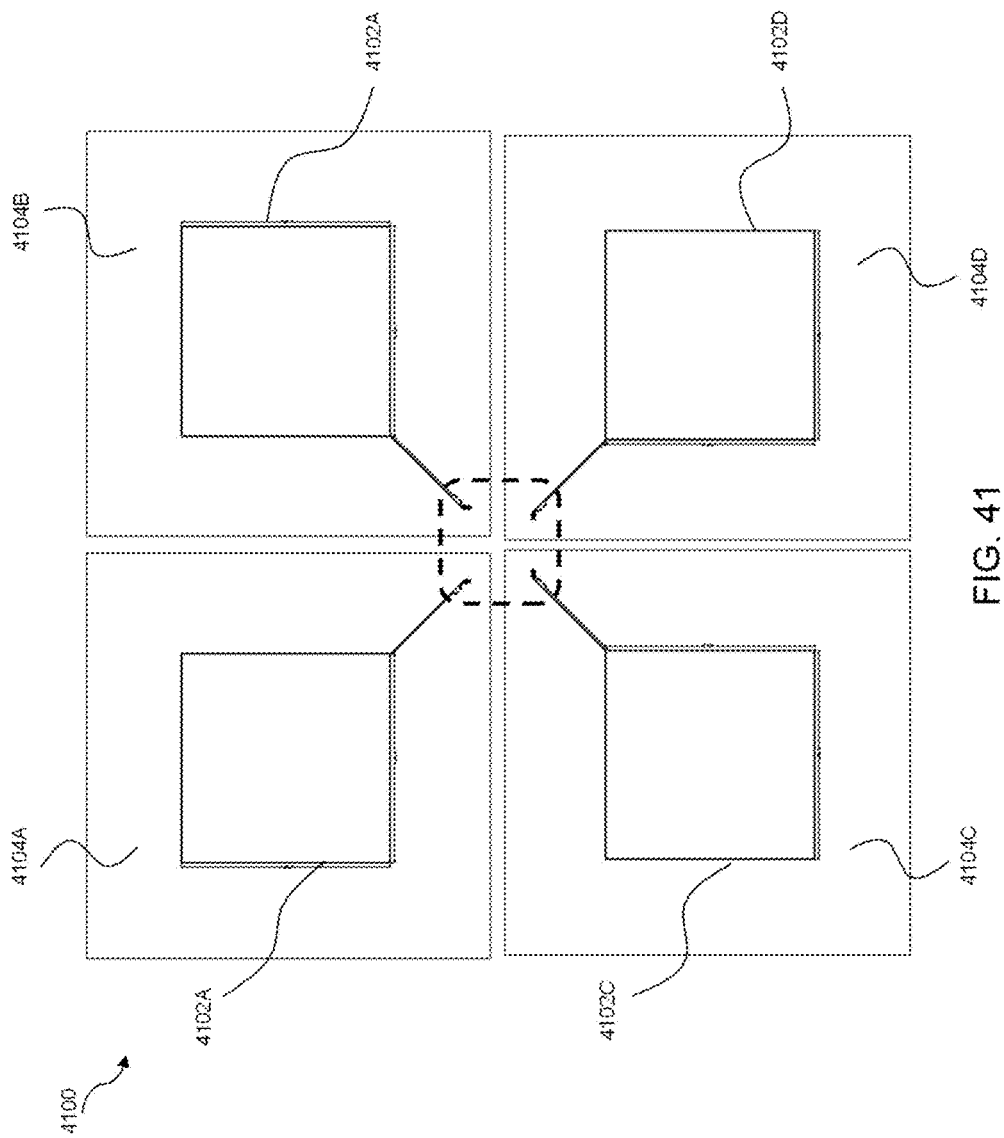
FIGS. 41, 42A, and 42B are schematic diagrams showing examples of auxiliary coils for FOD detection.

FIG. 41 shows a schematic diagram of an embodiment of an auxiliary coil 4100 for use in FOD detection. The auxiliary coil 4100 can include 4 smaller coils 4102A-D printed or wound on circuit boards 4104A-D. The smaller coils 4102A-D can be driven by a single amplifier and are positioned away from the edges of the circuit boards 4104A-D and thus their magnetic fields do not cancel.

In certain embodiments, an auxiliary coil positioned on or near a source resonator may cause the quality factor of the source resonator to be negatively affected. One way to overcome this issue can be to reduce the amount of conductive material and/or the number of turns used in the construction of the auxiliary coil(s). Another way can be decrease the amount of conductive material over the area of the source. For example, by increasing the amount of copper used, which effectively increases the vertical thickness of the conductor, one can reduce the horizontal thickness of the conductor and thus reduce the area of conductor directly over a source resonator coil.

Figure 42B:
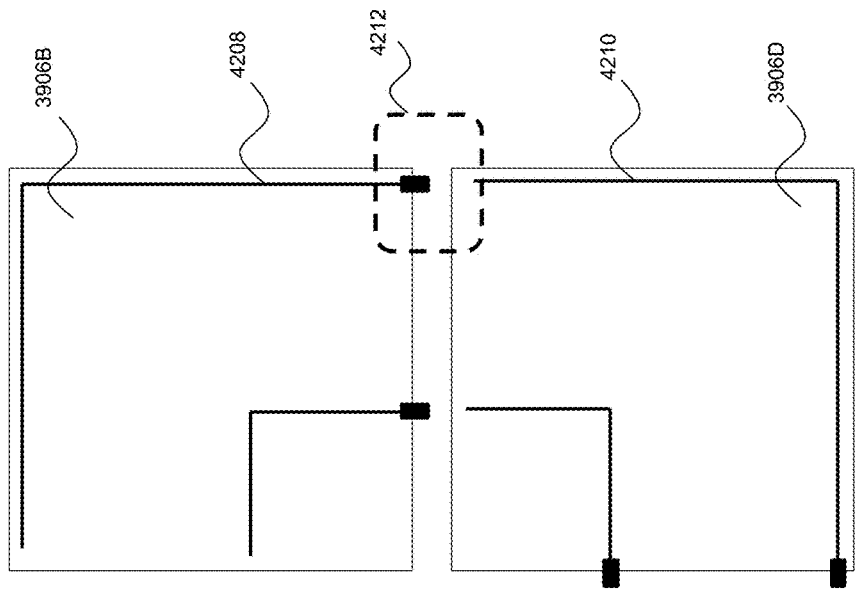
Figure 42A:
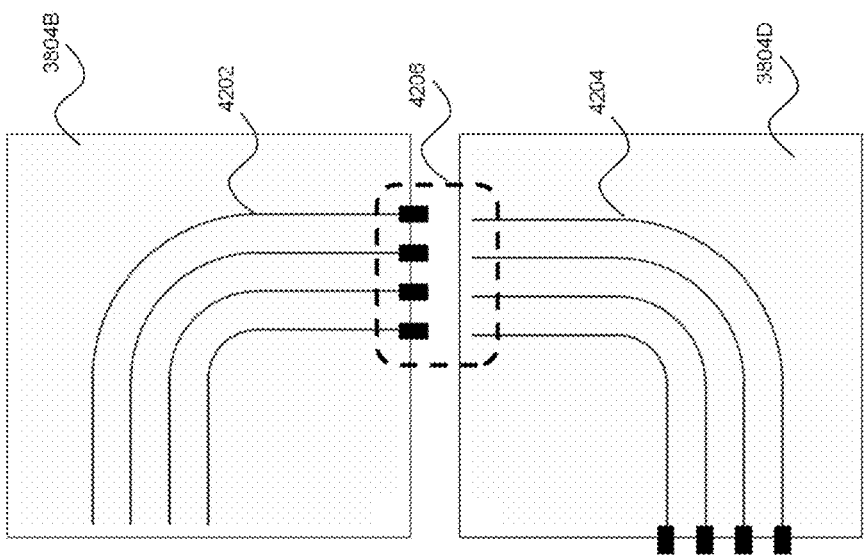

FIGS. 42A-42B show schematic diagrams of embodiments of auxiliary coils for use in FOD detection. Instead of the traces of each set of coils leading to the center of the circuit boards as shown in FIG. 38A and FIG. 39A, the traces are individually connected to their counterparts on the adjacent board. FIG. 42A shows, for an auxiliary coil similar to that shown in FIG. 38A, the traces 4202 on circuit board 3804B can be connected via connectors 4206 to traces 4204 on circuit board 3804D to create an effective auxiliary coil similar to that shown in FIG. 38B. In some embodiments, a connector can include soldering a wire across the circuit boards, board-to-board connectors, and the like. FIG. 42B shows, for an auxiliary coil similar to that shown in FIG. 39A, the traces 4208 on circuit board 3906B can be connected via connectors 6312 to traces 4210 on circuit board 3906D to create an effective auxiliary coil similar to that shown in FIG. 39B.

Hardware and Software Implementation

Figure 43:
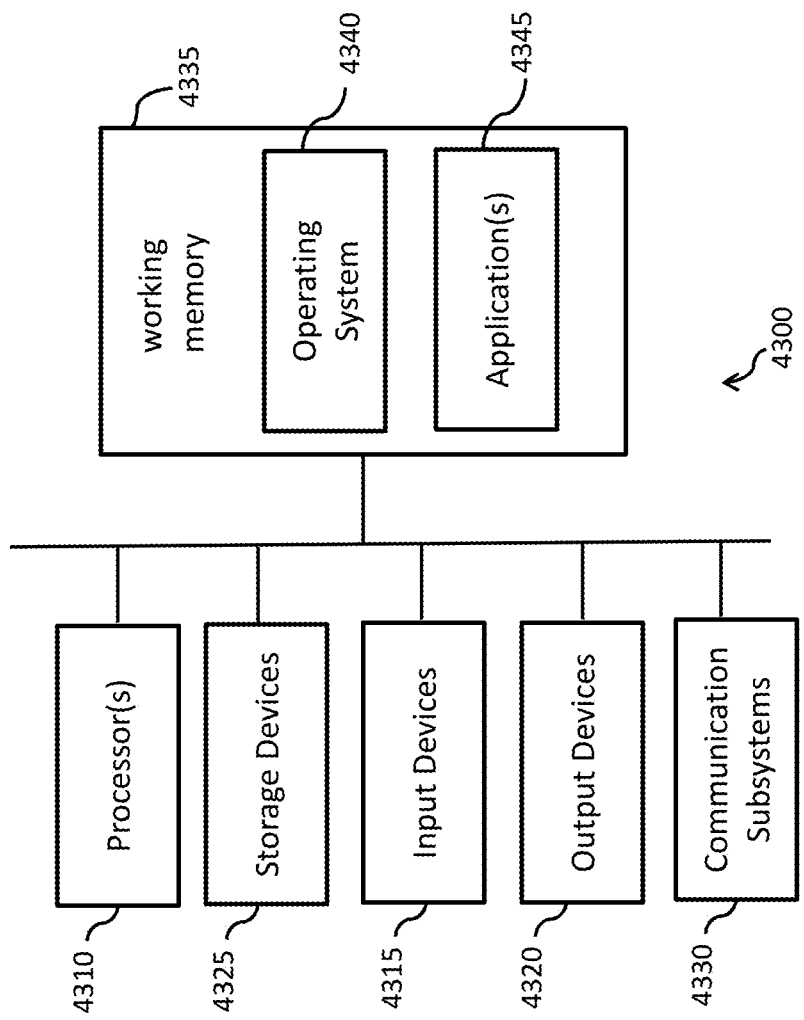
FIG. 43 is a schematic diagram showing a portion of a system controller for a wireless energy transfer system.

It is understood that the methods and steps described herein can be implemented in control electronics (i.e., a system controller) including a variety of processing hardware components such as one or more electronic processors and/or dedicated electronic circuits. FIG. 43 is a schematic diagram showing an embodiment of a computer system 4300 that may be incorporated as part of the control electronics/system controller. It should be noted that FIG. 43 is meant only to provide a generalized illustration of various system components, any or all of which may be utilized as appropriate. FIG. 43, therefore, broadly illustrates how individual elements of the control electronics/system controller may be implemented in a relatively separated or relatively more integrated manner.

System 4300 may include hardware elements that can be electrically coupled via a bus 4305 (or may otherwise be in communication, as appropriate). The hardware elements may include one or more processors 4310, including without limitation one or more general-purpose processors and/or one or more special-purpose processors (such as digital signal processing chips, graphics acceleration processors, video decoders, and/or the like); one or more input devices 4315, which can include without limitation a remote control, and/or the like; and one or more output devices 4320, which can include without limitation a display device, audio device, and/or the like.

Computer system 4300 may further comprise (and/or be in communication with) one or more non-transitory storage devices 4325, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

Computer system 4300 may also comprise a communications subsystem 4330, which can include without limitation a modem, a network card (wireless or wired), an infrared communication device, a wireless communication device, and/or a chipset (such as a Bluetooth device, an 802.11 device, a WiFi device, a WiMax device, cellular communication device, etc.), and/or the like. The communications subsystem 4330 may permit data to be exchanged with a network (such as the network described below, to name one example), other computer systems, and/or any other devices described herein. In many embodiments, the computer system 4300 will further include a working memory 4335, which can include a RAM or ROM device, as described above.

Computer system 4300 also may comprise software elements, shown as being currently located within the working memory 4335, including an operating system 4340, device drivers, executable libraries, and/or other code, such as one or more application programs 4345, which may include computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 4325 described above. In some cases, the storage medium might be incorporated within a computer system, such as computer system 4300. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 4300 and/or might take the form of source and/or installable code, which, upon compilation and/or installation on the computer system 4300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 4300) to perform methods in accordance with various embodiments of the disclosed techniques. Some or all of the procedures of such methods are performed by the computer system 4300 in response to processor 4310 executing one or more sequences of one or more instructions (which might be incorporated into the operating system 4340 and/or other code, such as an application program 4345) contained in the working memory 4335. Such instructions may be read into the working memory 4335 from another computer-readable medium, such as one or more of the non-transitory storage device(s) 4325. Merely by way of example, execution of the sequences of instructions contained in the working memory 4335 might cause the processor(s) 4310 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 4300, various computer-readable media might be involved in providing instructions/code to processor(s) 4310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 4325. Volatile media include, without limitation, dynamic memory, such as the working memory 4335.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 4310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 4300.

The communications subsystem 4330 (and/or components thereof) generally will receive signals, and the bus 4305 then might carry the signals (and/or the data, instructions, etc. carried by the signals) to the working memory 4335, from which the processor(s) 4310 retrieves and executes the instructions. The instructions received by the working memory 4335 may optionally be stored on a non-transitory storage device 4325 either before or after execution by the processor(s) 4310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

OTHER EMBODIMENTS

A number of embodiments have been described. Nevertheless, it will be understood that various modifications may be made without departing from the spirit and scope of the disclosure. Accordingly, other embodiments are within the scope of the following claims.

What is claimed is:

1. A wireless energy transfer system, comprising:
   a source resonator configured to generate an oscillating magnetic field to transfer energy to a receiver resonator;
   a plurality of sensors, wherein each of the sensors is configured to generate an electrical signal in response to a magnetic field; and
   a controller coupled to each of the sensors,
   wherein during operation of the system, the controller is configured to:
      obtain a system calibration state comprising a set of basis vectors derived from a first set of electrical signals generated by the plurality of sensors with no foreign object debris in proximity to the system;
      measure a second set of electrical signals generated by the plurality of sensors;
      calculate a projection of the second set of electrical signals onto the set of basis vectors;
      calculate a detection signal based on the projection of the second set of electrical signals;
      determine whether foreign object debris is present in proximity to the system by comparing the calculated detection signal to a detection threshold value; and
      adjust the system calibration state based on the presence or absence of foreign object debris in proximity to the system to generate an updated system calibration state.

2. The system of claim 1, wherein the controller is configured to obtain the system calibration state by:
   determining an inverse covariance matrix for the first set of electrical signals; and determining the set of basis vectors by determining a set of eigenvectors of the inverse covariance matrix.

3. The system of claim 2, wherein the controller is configured to determine the inverse covariance matrix based on mean-subtracted values derived from the first set of electrical signals.

4. The system of claim 3, wherein values comprise at least one of amplitudes of the first set of electrical signals and phases of the first set of electrical signals.

5. The system of claim 1, wherein the plurality of sensors comprises n sensors, and wherein each of the basis vectors comprises n elements.

6. The system of claim 5, wherein for each basis vector, each of the n elements corresponds to a contribution from a different one of the n sensors.

7. The system of claim 5, wherein the projection comprises a vector of length p<n, and wherein each element of the projection corresponds to a contribution of a different one of the basis vectors to a representation of the second set of electrical signals.

8. The system of claim 7, wherein the controller is configured to calculate the detection signal as a norm of the projection.

9. The system of claim 7, wherein the controller is configured to calculate the detection signal as a scaled norm of the projection in which each element of the projection is scaled according an eigenvalue associated with a corresponding one of the basis vectors.

10. The system of claim 2, wherein the controller is configured to adjust the system calibration state when foreign object debris is not in proximity to the system.

11. The system of claim 10, wherein the controller is configured to adjust the system calibration state by generating an updated inverse covariance matrix based on the second set of electrical signals.

12. The system of claim 11, wherein the controller is configured to generate the updated inverse covariance matrix using an infinite impulse response filter.

13. The system of claim 1, wherein prior to obtaining the system calibration state, the controller is configured to determine whether foreign object debris is present in proximity to the system.

14. The system of claim 13, wherein the controller is configured to determine whether foreign object debris is present in proximity to the system prior to obtaining the system calibration state by:
measuring a plurality of sets of electrical signals generated by the plurality of sensors, wherein each set of electrical signals corresponds to a different relative position of the source and receiver resonators;
generating a position covariance matrix based on the plurality of sets of electrical signals;
determining a set of position basis vectors corresponding to eigenvectors of an inverse of the position covariance matrix;
measuring a third set of electrical signals generated by the plurality of sensors;
calculating a projection of the third set of electrical signals onto the set of position basis vectors; and
determining whether foreign object debris is present in proximity to the system based on a magnitude of the projection of the third set of electrical signals.

15. The system of claim 14, wherein the set of position basis vectors corresponds to a set of m eigenvectors of the inverse of the position covariance matrix that correspond to m largest eigenvalues of the inverse of the position covariance matrix.

16. The system of claim 1, wherein obtaining the system calibration state comprises retrieving the system calibration state from an electronic storage medium.

17. The system of claim 1, wherein obtaining the system calibration state comprises:
determining an inverse covariance matrix for the first set of electrical signals;
determining a set of eigenvectors of the inverse covariance matrix; and
determining the set of basis vectors from the eigenvectors of the inverse covariance matrix.

18. A method, comprising:
determining a system calibration state comprising an inverse covariance matrix for a first set of electrical signals generated by a plurality of sensors in proximity to a wireless energy transfer system when no foreign object debris is in proximity to the wireless energy transfer system;
determining a set of basis vectors from eigenvectors of the inverse covariance matrix;
measuring a second set of electrical signals generated by the plurality of sensors;
calculating a detection signal based on a projection of the second set of electrical signals onto the set of basis vectors;
determining whether foreign object debris is present in proximity to the wireless energy transfer system by comparing the calculated detection signal to a detection threshold value; and
adjusting the system calibration state based on the presence or absence of foreign object debris in proximity to the system to generate an updated system calibration state.

19. The method of claim 18, further comprising determining the inverse covariance matrix based on values derived from the first set of electrical signals, wherein the values comprise at least one of amplitudes of the first set of electrical signals and phases of the first set of electrical signals.

20. The method of claim 18, wherein:
the plurality of sensors comprises n sensors;
each of the basis vectors comprises n elements each corresponding to a contribution from a different one of the n sensors;
the projection comprises a vector of length p<n;
each element of the projection corresponds to a contribution of a different one of the basis vectors to a representation of the second set of electrical signals.

* * * * *